(12) United States Patent
Sherman

(10) Patent No.: US 9,613,086 B1
(45) Date of Patent: Apr. 4, 2017

(54) GRAPHICAL USER INTERFACE FOR GENERATING AND DISPLAYING DATA VISUALIZATIONS THAT USE RELATIONSHIPS

(71) Applicant: Tableau Software, Inc., Seattle, WA (US)

(72) Inventor: Scott Sherman, Seattle, WA (US)

(73) Assignee: TABLEAU SOFTWARE, INC., Seattle, WA (US)

(*) Notice: Subject to any disclaimer, the term of this patent is extended or adjusted under 35 U.S.C. 154(b) by 265 days.

(21) Appl. No.: 14/461,345

(22) Filed: Aug. 15, 2014

(51) Int. Cl.
*G06F 17/30* (2006.01)

(52) U.S. Cl.
CPC .. *G06F 17/30389* (2013.01); *G06F 17/30554* (2013.01)

(58) Field of Classification Search
CPC ......... G06F 17/30554; G06F 17/30389; G06F 3/0481
See application file for complete search history.

(56) References Cited

U.S. PATENT DOCUMENTS

| | | | | |
|---|---|---|---|---|
| 2007/0211056 A1* | 9/2007 | Chakraborty | ......... | G06T 11/206 345/440 |
| 2011/0302110 A1* | 12/2011 | Beers | ................ | G06F 17/30554 706/11 |
| 2012/0233151 A1* | 9/2012 | Vanderwende | ... | G06F 17/30873 707/722 |

OTHER PUBLICATIONS

Aris, "Designing Semantic Substrates for Visual Network Exploration," Information Visualization (2007), © 2007 Palgrave Macmillan Ltd., 20 pgs.
He, "Graphs-at-a-time: Query Language and Access Methods for Graph Databases," SIGMOD'08, Jun. 9-12, 2008, Vancouver, BC, Canada, 13 pgs.
Heer, "Orion: A System for Modeling, Transformation and Visualization of Multidimensional Heterogeneous Networks," Information Visualization 2014, vol. 13(2) 111-133, 23 pgs., downloaded from http://ivi.sagepub.com on Oct. 17, 2014.
Lee, "TreePlus: Interactive Exploration of Networks with Enchanced Tree Layouts," IEEE Transactions on Visualization and Computer Graphics, vol. 12, No. 6, Nov./Dec. 2006, 13 pgs.

(Continued)

*Primary Examiner* — Li Sun
(74) *Attorney, Agent, or Firm* — Morgan, Lewis & Bockius LLP

(57) ABSTRACT

A method generates a graphical user interface, which includes a schema information region and a data visualization region. The schema information region includes field names, each associated with a data field from a data source, and relationship names, each associated with a relation between rows of the data source. The data visualization region includes a row shelf, a column shelf, and a connector shelf. The method detects user selection of field names and a request to associate those field names with respective shelves in the data visualization region. The method also detects user selection of relationship names and a request to associate those relationship names with respective shelves in the data visualization region. The method generates a visual graphic in the data visualization region according to the associations between the user-selected field names and corresponding shelves and the associations between the user-selected relationship names and corresponding shelves.

25 Claims, 60 Drawing Sheets

(56) References Cited

OTHER PUBLICATIONS

Liu, "Network-Based Visual Analysis of Tabular Data," IEEE Symposium on Visual Analytics Science and Technology, Oct. 23-28, 2011, Providence, RI, 10 pgs.

Shneiderman, "Network Visualization by Semantic Substrates," IEEE Transactions on Visualization and Computer Graphics, vol. 12, No. 5, Sep./Oct. 2006, 8 pgs.

Stolte, Polaris: A System for Query, Analysis, and Visualization of Multidimensional Relational Databases, Jan. 2002, 14 pgs.

Stolte, "Query Analysis, and Visualization of Multidimensional Databases," A dissertation submitted to the Department of Computer Science and the Committee on Graduate Studies of Stanford University in partial fulfillment of the requirements for the degree of Doctor of Philosophy, Jun. 2003, 157 pgs.

Wattenberg, "Visual Exploration of Multivariate Graphs," CHI 2006 Proceedings, Visualization 1, Apr. 22-27, 2006, Montreal, Quebec, Canada, 9 pgs.

Sherman, Office Action, U.S. Appl. No. 14/461,357, Oct. 13, 2016, 9 pgs.

* cited by examiner

Examples of Relationships that can be used in Data Visualizations

| | | |
|---|---|---|
| 410 | $R_1$ | *define*: first-order relationship, e.g. {*fid = father*} or {{*facility-id=from*} = {*facility-id=to*}} |
| 412 | $R_2, ...$ | *define*: second-order relationship and higher, e.g. {{*fid = father | mother*}, {*fid = father | mother*}} |
| 414 | $R_{1^*}$ | *define*: chaining n-order relationships together, e.g. {*fid = father | mother*}* |
| 416 | $R_E$ | *define*: equivalence relationship, e.g. {*last name*}, {{*field1*} & {*field2*}}, {{*field1*} | {*field2*}} |
| 418 | $R_A$ | *define*: tuples are related if the values of a Q field are within a given tolerance |
| 420 | $R_C$ | *define*: clustering relationship |
| 422 | $R_D$ | *classify*: directed relationship |
| 424 | $R_U$ | *classify*: undirected relationship |
| 426 | $R_T$ | *classify*: tree (hierarchy with no loops) |
| 428 | $R_G$ | *classify*: arbitrary graph |

Figure 4B

Family Tree Data 438

| ID | first_name | last_name | father_id | mother_id | spouse_id | gender | birth_date | birth_place | death_date | death_place |
|---|---|---|---|---|---|---|---|---|---|---|
| 1 | Abe | Doe | | | | M | Jan 7, 1920 | MA | Nov. 3, 1981 | NY |
| 2 | Bob | Doe | 1 | | 3 | M | Mar. 23, 1939 | NY | May 31, 2007 | NV |
| 3 | Cathy | Smith | | | 2 | F | Dec. 17, 1937 | PA | | |
| 4 | Dave | Doe | 2 | 3 | | M | June 30, 1964 | CA | | |
| 5 | Edith | Doe | 2 | 3 | 8 | F | Feb. 13, 1969 | CA | | |
| 6 | Francis | Jones | | | | F | Sep. 22, 1953 | WA | | |
| 7 | George | Thomas | | | 6 | M | Sep. 10, 1947 | KS | | |
| 8 | Henry | Doe | 1 | | | M | Aug. 5, 1952 | OR | | |

Figure 4C

Facilities Table 470

| facility_id | city | capacity |
|---|---|---|
| 56 | Seattle | 2000 |
| 22 | Fargo | 5000 |
| 43 | San Diego | 3000 |
| 17 | Atlanta | 1500 |

Shipment Table 480

| shipment_id | ship_date | receive_date | from | to | amount | item | cost | carrier |
|---|---|---|---|---|---|---|---|---|
| CY327819 | May 1, 2015 | May 5, 2015 | 22 | 56 | 500 | corn | 1000 | ABC Railway |
| CY329108 | May 8, 2015 | May 15, 2015 | 22 | 43 | 1200 | corn | 2000 | ABC Railway |
| CZ329772 | May 13, 2015 | May 18, 2015 | 56 | 22 | 1000 | mocha | 1500 | BCD Trucking |
| DA331004 | June 2, 2015 | June 6, 2015 | 56 | 43 | 1500 | mocha | 2500 | HMX Trucking |
| DA331955 | June 3, 2015 | June 9, 2015 | 22 | 43 | 1000 | corn | 1800 | ABC Railway |
| DA332081 | June 6, 2015 | June 9, 2015 | 22 | 56 | 700 | corn | 1500 | BCD Trucking |

Figure 4D

Figure 7A
Quantitative data fields may be spatially displayed along an axis (e.g., *Profit*):
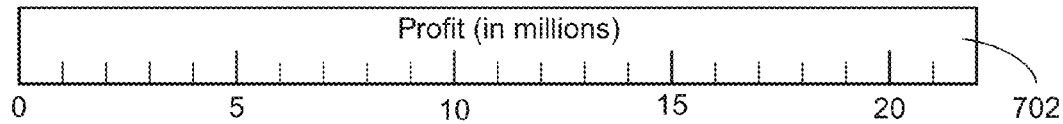
Ordinal data fields partition an axis into discrete portions, such as rows or columns (e.g., *Quarter* or *Region*):
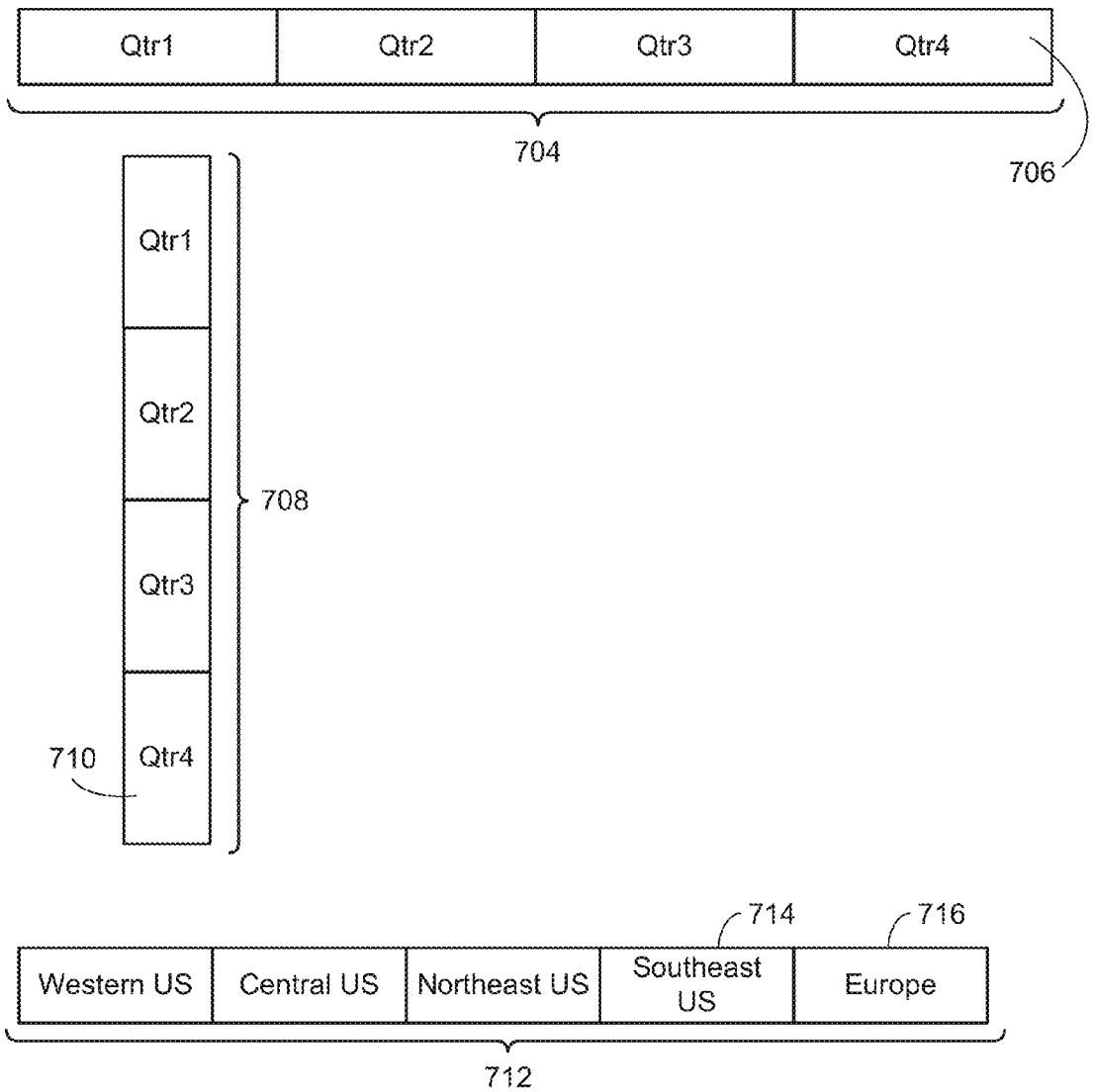

| pane type 716 \ layout type 714 | Packed | Network |
|---|---|---|
| OO | 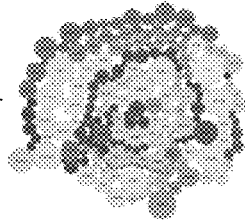 740A 740B 740C 740 |  742 |
| OQ | Packed/bubble layout with additional forces introduced by underlying coordinate system. Squares turn into the same algorithm as circles. 744 | Force-directed or Constraint-based layout with additional forces introduced by underlying coordinate system. 746 |
| QO | Packed/bubble layout with additional forces introduced by underlying coordinate system. Squares turn into the same algorithm as circles. 748 | Force-directed or Constraint-based layout with additional forces introduced by underlying coordinate system. 750 |
| QQ | 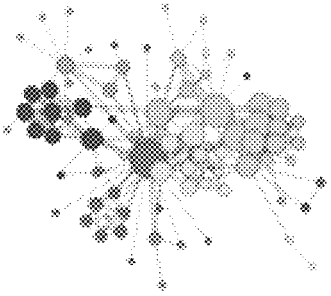 752 | Force-directed or Constraint-based layout with additional forces introduced by underlying coordinate system. 754 |

Figure 7C

Using a Relationship to Define a Quantitative Field →

| Defined Quantitative Field | How the quantitative field is computed for each tuple |
|---|---|
| Q(R$_E$, overall) | The tuple's overall position in the traversal. |
| Q(R$_E$, group) | The index of the group the tuple is a member of. |
| Q(R$_E$, local) | The index of the tuple within the group it belongs to. |
| Q(R$_T$, overall) | The tuple's overall position in the traversal. |
| Q(R$_T$, depth) | The depth of the tuple within the traversal. |
| Q(R$_T$, local) | The index of the tuple within its group of siblings. |
| Q(R$_T$, child-count) | The number of children a tuple has. |
| Q(R$_T$, desc-count) | The number of descendants a tuple has. |
| Q(R$_T$, desc-depth) | The maximum depth of any descendant of the tuple. |

Figure 7E

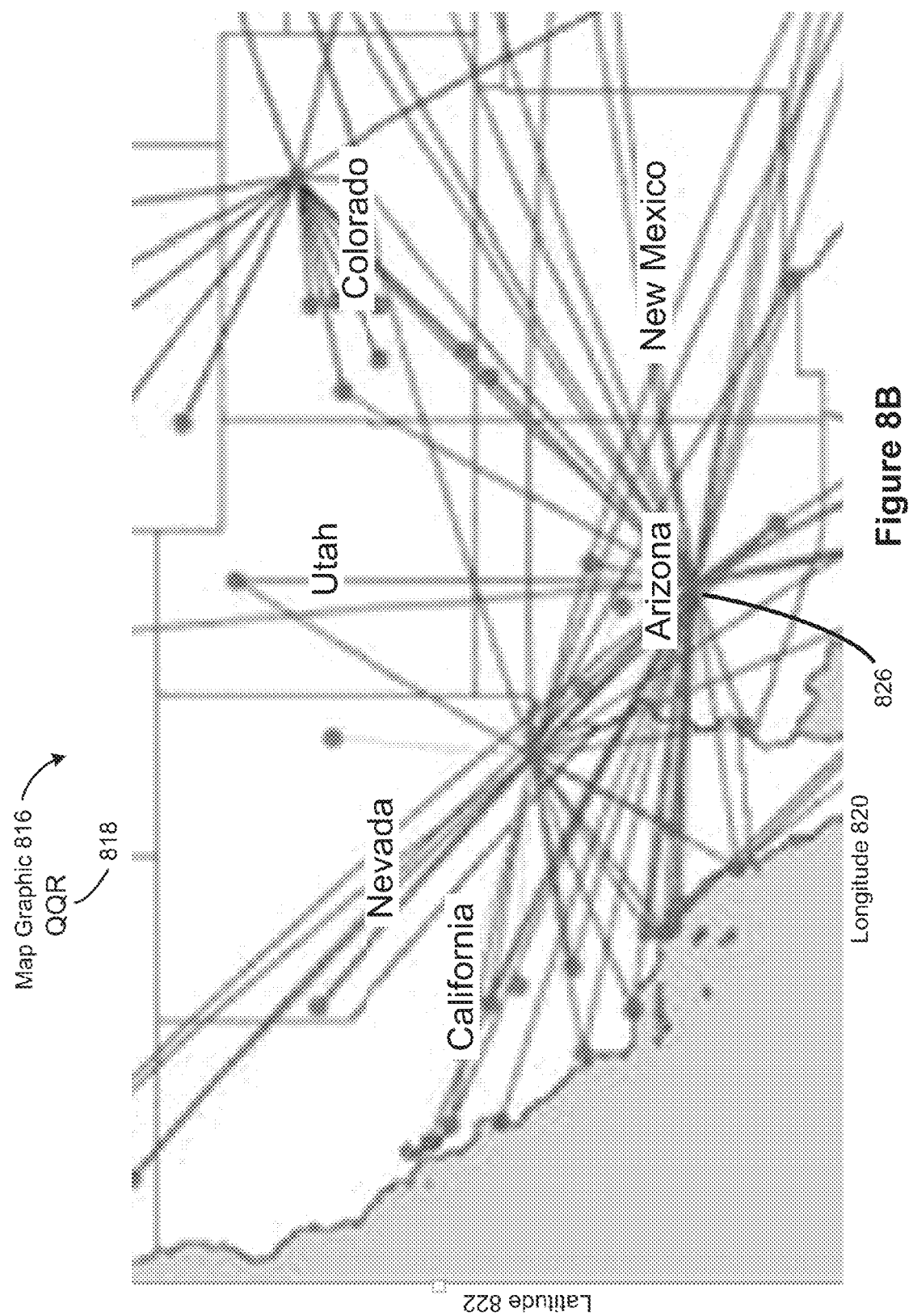

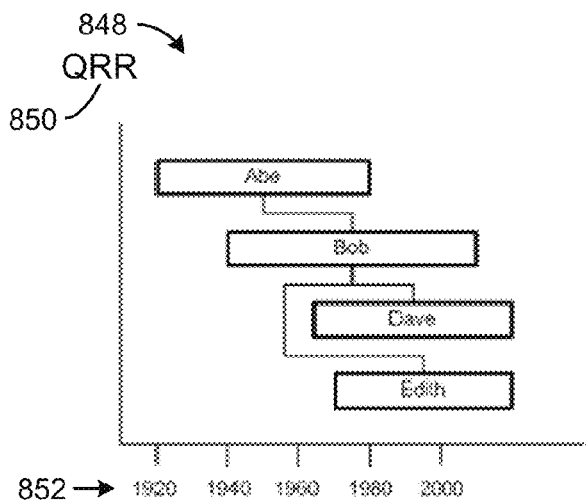
Figure 8H
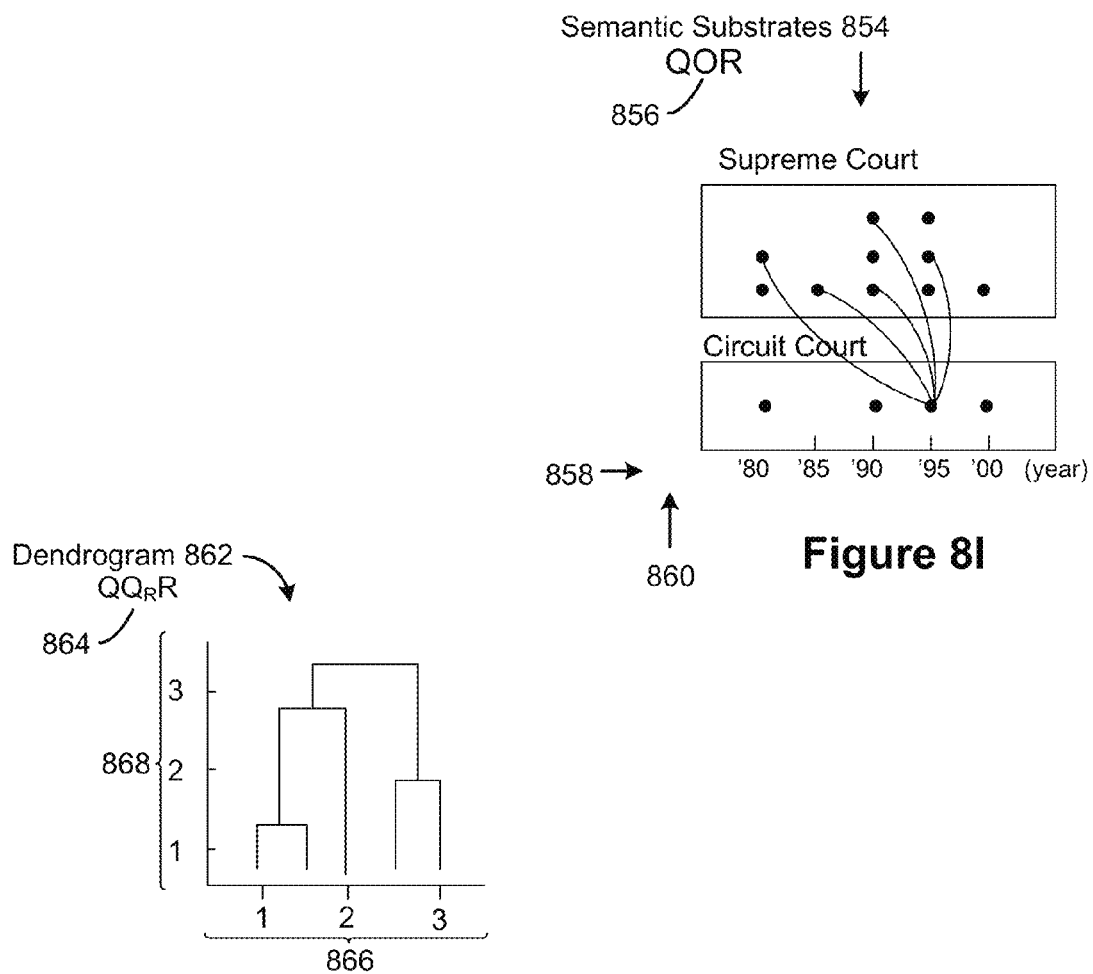
Figure 8I
Figure 8J

Batteries Camcorder Camera Coffee Maker Laptop Mouse RC Helicopter Television USB Drive Xbox

Figure 11A

Batteries Camcorder Camera Coffee Maker Desktop Laptop Mouse RC Helicopter Television USB Drive Xbox

Figure 11B

Batteries Camcorder Camera Coffee Maker Laptop Mouse RC Helicopter Television USB Drive Xbox

Figure 11C

Mouse  RC Helicopter

Laptop     TV

Coffee maker     USB Drive

Camcorder     Xbox

Camera   Batteries

Figure 11D

Team Table 562

| Team | Division | Subdivision | Rank | Conf W |
|---|---|---|---|---|
| Boston College | Atlantic Coast | Atlantic | 10 | |
| Clemson | Atlantic Coast | Atlantic | 21 | 5 |
| Wake Forest | Atlantic Coast | Atlantic | | 5 |
| Florida State | Atlantic Coast | Atlantic | | 4 |
| Maryland | Atlantic Coast | Atlantic | | 3 |
| N.C. State | Atlantic Coast | Atlantic | | 3 |
| Virginia Tech | Atlantic Coast | Coastal | 9 | 7 |
| Virginia | Atlantic Coast | Coastal | | 6 |
| Georgia Tech | Atlantic Coast | Coastal | | |
| North Carolina | Atlantic Coast | Coastal | | |
| Miami (Fla.) | Atlantic Coast | Coastal | | 2 |
| Duke | Atlantic Coast | Coastal | | |
| West Virginia | Big East | | 6 | 5 |

Game Table 1302

| date | home team | home score | away team | away score | location |
|---|---|---|---|---|---|
| 9/1/2007 | Wake Forest | 28 | Boston College | 38 | |
| 9/1/2007 | Washington State | 21 | Wisconsin | 42 | |
| 9/1/2007 | Western Carolina | 6 | Alabama | 52 | |
| 9/1/2007 | Western Kentucky | 3 | Florida | 49 | |
| 9/1/2007 | Western Michigan | 24 | West Virginia | 62 | |
| 9/1/2007 | Youngstown State | 6 | Ohio State | 38 | |
| 9/3/2007 | Florida State | 18 | Clemson | 24 | |

| Date | Order ID | LineItem | Product | Price | Quantity |
|---|---|---|---|---|---|
| Jan 13, 2012 | 1 | 1 | Coffee | $5 | 2 |
| Jan 13, 2012 | 1 | 2 | Eggs | $2 | 1 |
| Jan 13, 2012 | 2 | 1 | Tea | $3 | 3 |
| Jan 13, 2012 | 2 | 2 | Eggs | $2 | 4 |
| Jan 14, 2012 | 3 | 1 | Tea | $4 | 3 |
| Jan 14, 2012 | 3 | 2 | Bread | $1 | 1 |
| Jan 15, 2012 | 4 | 1 | Coffee | $5 | 1 |
| Jan 16, 2012 | 5 | 1 | Tea | $4 | 1 |
| Jan 16, 2012 | 5 | 2 | Bread | $1 | 5 |

| Product1 | Product2 | Number of records |
|---|---|---|
| Coffee | Eggs | 1 |
| Tea | Eggs | 1 |
| Tea | Bread | 2 |

| Timestamp | SessionID | URL | TypeOfPage | SizeOfPage |
|---|---|---|---|---|
| 1 | 1 | Index | Main | 156 |
| 2 | 1 | SearchForm | Search | 237 |
| 3 | 1 | SearchResult | Search | 4001 |
| 4 | 1 | SearchForm | Search | 206 |
| 5 | 1 | SearchResult | Search | 5406 |
| 6 | 1 | LaptopProduct | Product | 6056 |
| 1 | 2 | DesktopProduct | Product | 5403 |
| 2 | 2 | ViewShoppingCart | ShoppingCart | 3042 |
| 3 | 2 | OrderComplete | Order | 4050 |
| 1 | 3 | Index | Main | 145 |
| 2 | 3 | SearchForm | Search | 202 |
| 3 | 3 | Help | Help | 23039 |

1602 — Timestamp; 1604 — SessionID; 1606 — URL; 1608 — TypeOfPage; 1610 — SizeOfPage

| SessionID1 | Timestamp1 | URL1 | Timestamp2 | URL2 | Number of Records |
|---|---|---|---|---|---|
| 1 | 1 | Index | 2 | SearchForm | 1 |
| 1 | 2 | SearchForm | 3 | SearchResult | 1 |
| 1 | 3 | SearchResult | 4 | SearchForm | 1 |
| 1 | 4 | SearchForm | 5 | SearchResult | 1 |
| 1 | 5 | SearchResult | 6 | LaptopProduct | 1 |
| 2 | 1 | DesktopProduct | 2 | ViewShoppingCart | 1 |
| 2 | 2 | ViewShoppingCart | 3 | OrderComplete | 1 |
| 3 | 1 | Index | 2 | SearchForm | 1 |
| 3 | 2 | SearchForm | 3 | Help | 1 |

1622 — SessionID1; 1624 — Timestamp1; 1626 — URL1; 1628 — Timestamp2; 1630 — URL2; 1632 — Number of Records

1700

| 1702 | 1704 | 1706 | 1708 | 1710 |
|---|---|---|---|---|
| Person | Gender | DatePlayed | Opponent | DurationMinutes |
| Tim | Male | Dec 31, 2011 | Sally | 20 |
| Susan | Female | Jan 2, 2012 | Aaron | 10 |
| Aaron | Male | Jan 5, 2012 | Tim | 14 |

| Person |
|---|
| Tim |
| Susan |
| Aaron |
| Sally |

| Person | Gender |
|---|---|
| Tim | Male |
| Susan | Female |
| Aaron | Male |
| Sally | NULL |

| 1702 | 1704 | 1706 | 1708 | 1710 |
|---|---|---|---|---|
| Person | Gender | DatePlayed | Opponent | DurationMinutes |
| Tim | Male | Dec 31, 2011 | Sally | 20 |
| Susan | Female | Jan 2, 2012 | Aaron | 10 |
| Aaron | Male | Jan 5, 2012 | Tim | 14 |
| Sally | Female | Null | Null | Null |

| 1702 | 1704 | 1706 | 1708 | 1762 | 1710 |
|---|---|---|---|---|---|
| Person | Gender | DatePlayed | Opponent | OpponentGender | DurationMinutes |
| Tim | Male | Dec 31, 2011 | Sally | Female | 20 |
| Susan | Female | Jan 2, 2012 | Aaron | Male | 10 |
| Aaron | Male | Jan 5, 2012 | Tim | Male | 14 |

Figure 17E

GRAPHICAL USER INTERFACE FOR GENERATING AND DISPLAYING DATA VISUALIZATIONS THAT USE RELATIONSHIPS

RELATED APPLICATIONS

This application is related to U.S. Patent Application "Systems and Methods to Query and Visualize Data and Relationships," filed Aug. 15, 2014, U.S. Patent Application "Systems and Methods for Filtering Data Used in Data Visualizations that use Relationships," filed Aug. 15, 2014, and U.S. Patent Application "Systems and Methods of Arranging Displayed Elements in Data Visualizations that use Relationships," filed Aug. 15, 2014.

TECHNICAL FIELD

The disclosed implementations relate generally to data visualizations and more specifically to querying and visualizing both data and data relationships.

BACKGROUND

Databases are used to track a large amount of data collected during the regular course of business operations and events. Businesses typically store data regarding sales and sales projections, profit, inventory, payroll, human resources, and much more. Sports leagues create and maintain large data warehouses to record scores, standings, and statistics for every team and every player. As the amount of data increases, there is an increasing challenge to extract meaning from the data. For example, it becomes more difficult to identify hierarchical structures, logic patterns, and complicated relationships hidden amongst the data.

Graphical data visualizations can be effective to convey information and to enable a person to analyze the data. In particular, data visualizations can aid in human understanding of relationships and patterns in the data. Many people construct data visualizations manually, which is both difficult and time consuming. Data visualization applications assist in visualizing data, but many do not support visualizing relationships. Some data visualization applications can create simple node-link diagrams, are not designed to present complex data relationships, such as manager reporting structures, product categories, a social network, family relationships, paper citations, a programming class hierarchy, or hyperlinks. Furthermore, data visualizations with relationships are particularly difficult to present when the amount of data increases.

SUMMARY

Disclosed implementations provide a data visualization engine for visualizing both data fields and relationships between those data fields. As used herein, the term "relation" may be used interchangeably with "relationship." The data visualization engine retrieves a set of tuples from a database according to user selection. Each tuple includes a set of data fields, and in some instances all of the tuples have the same structure, including number of data fields, order of the data fields, the data types of the data fields, and the data field names. The data fields may come directly from fields in the database (e.g., columns in a database table), or may be computed or derived from one or more data fields. Each tuple is displayed as a visual mark.

The data visualization engine also displays relationships among the retrieved tuples, using connectors or other visual cues, such as positioning. In some implementations, a data visualization is further modified by other operations, such as filtering, sorting, aggregation of marks, or aggregation of connectors.

Although data fields are typically used for the graphical marks, and a relationship is used to create connectors between the marks, some implementations support using a relationship as a data field or using a data field as a relationship. This flexible architecture enables users to create data visualizations more quickly and more easily.

A relationship can be encoded in the position of a mark, as a connector drawn between two marks, or as a property of a mark (e.g. color). The direction of the relationship can be encoded by the relative positions of two marks, by placing an arrowhead on the end of the connector, or by drawing a connector in a specific way (e.g. using a particular curve).

A relationship can be used to specify the x position or y position of graphical marks (e.g., using the row or column shelf, as described below) or for other positional encodings (e.g., radius r or angle θ in a polar layout). A relationship can be combined with a sort order to determine the location of marks or labels.

A relationship can be used to specify connectors between graphical marks (e.g., edges between nodes), which are drawn as lines or curves between the marks that share the relationship. The type of relationship can be encoded in various properties of the connectors, such as line type or color. Properties of a relationship itself can also be encoded as graphical properties of the connector. For example, the direction of the relationship may be encoded as an arrow head on one side of the connector or determine how the connector is drawn (e.g. using a particular curve). A single connector can have multiple encodings (e.g., size and color). Some implementations support using two or more relationships simultaneously, and distinct connectors may be displayed using the multiple relationships. For example, connectors corresponding to different relationships may use different colors.

A connector encoding can work in conjunction with existing data visualizations that specify the x and y positions of graphical marks. A user simply adds connectors to the visualization. Connectors can also be used in graphics that do not specify the x and/or y positions of the graphical marks. In particular, the relationship can be used to determine positions (e.g., to spread out the nodes in a node-link diagram, where the location of the nodes is somewhat arbitrary). It is common for a single relationship to be used in multiple ways in a single data visualization.

When data is aggregated, a pair of tuples may end up having more than one instance of a relationship because each tuple in the aggregation could have a different relationship. The number of connections can be encoded in the width or transparency of the connector.

The values of the field(s) used to determine a relationship can be used for displaying an associated label. As illustrated in FIG. 4B below, in an equivalence relationship, tuples that share the same value for a certain field are related. That shared value can be used to display an appropriate label. For a first order relationship, the value of a first field in one tuple is the same as the value of a second field in a second tuple. The shared value can be used to display an appropriate label for the relationship. In some implementations, labels may be assigned to connectors based on non-shared values (e.g., if connectors represent marriages between people, the connectors could use the first names of both people).

Connectors are encoded separately from the marks they are connecting. This means that the connectors keep track of the tuples they are connecting. A data visualization application looks up the location of the graphical marks by their associated tuples in order to connect the dots.

In some implementations, a connector has two or three tuples associated with it: the source and destination tuples and an optional relationship tuple if the relationship is based on two tables. As used herein, the term "tuple" generally refers to the tuples for the graphical marks, and not to relationship tuples. Fields in any of these tuples can be used to encode the starting, ending, or overall properties of the connectors. Typically, the source and destination tuples are used to encode start and end properties of each connector, and the relationship tuple encodes the overall properties of each connector (e.g., color or width of each entire connector). A relationship tuple is of the form (tuple1, tuple2, [properties]), where tuple1 and tuple2 are tuples for marks that are related by the relationship.

An equivalence relationship is slightly different. In general, properties of the connectors may be specified using the properties of the two tuples sharing the connection. However, an equivalence relationship does not have a direction, so there can be ambiguity about which endpoint tuple to use. Some implementations disallow using endpoint tuple properties to define graphical properties of connectors when the ambiguity is unavoidable. In some implementations, use of such properties is allowed, but when there is ambiguity, the encoding does not occur. Because an equivalence relationship defines groups rather than a direction, some implementations allow connector properties to be based on the group as a whole (e.g., aggregated properties, such as the number of tuples in the group, or the sum or average of some field in the tuples).

In some implementations, a value of a field for a tuple is used to determine which point on the mark is used as the connection point.

An alternative to drawing a connector between two marks, especially in a dense layout or when the marks are far apart, is to connect to a placeholder mark that contains information that identifies the other mark it connects to.

As explained in more detail below, a relationship can be used as an ordinal field when a sort order has been defined. In some instances, a user defines a relationship, then uses the structure of that relationship to define a sort order. This enables a data visualization application to provide more types of sorts. When a relationship has been defined, a depth-first or breadth-first traversal may creates a specific order, even though it may include some arbitrary traversal decisions. In some instances, a secondary sort is used to order the children of a node, including the top-level nodes (children of an implicit root). Sorting using a relationship that is not a strict hierarchy may involve deciding whether or not to allow duplicates in the resulting list.

A connector is drawn between two marks. Marks can get their positions from the row and column selections or from a set of layout algorithms that use the row and columns selections as arguments. For example, layouts include radial trees, hyperbolic trees, tree maps, and clustering graph layouts.

When the positions of marks are not the result of specific row and column selection in the user interface, the user may want to move the marks around after they are rendered in a data visualization. For example, if a layout algorithm attempts to cluster the marks based on the various relationships, the user may want to drag some marks to new locations to help understand the structure.

With connectors, the layout algorithms attempt to limit the amount of overlap. However, a user may want to change their routing in various ways to make the connections more obvious, avoid overlap, or emphasize a certain set of relationships. Therefore, a user is generally allowed to alter the location of connectors in a data visualization after it is rendered.

Some implementations provide a group-by shelf, which gives the user the opportunity to provide hints to the layout algorithm for clustering (which affects overall layout). For example, using scores for a sports league during a season, a user may suggest grouping by how many time teams played each other. In the NFL, this would cluster the teams by divisions, where the teams play each other twice.

The connectors can be drawn in various ways: straight lines, a sequence of connected orthogonal line segments routed around obstacles, arcs, or other curves. To show the direction of a connector, some implementations draw a shape at one or both ends (such as an arrowhead). In some implementations, direction is indicated by varying properties such as size or color, or by changing the curvature of the arc. Some implementations allow the user to select how the direction is conveyed in a data visualization.

Relationships are typically binary, tying together two pieces of data. This lends itself well to drawing a connector between two points that represent the two pieces of data. In contrast, an equivalence relationship is an example of an n-ary relationship ("hypergraph"), tying together an arbitrary number of points. Sometimes this information is better suited for encoding in the points themselves (e.g., color, shape, or size) than for drawing a connector between every pair of related points. When there are large groups of nodes tied together by an equivalence relationship, the number of connectors grows rapidly (for a group of n nodes, there are $n(n-1)/2$ connectors). In this case, one option is to draw a single connector from every point in the group to a common point (which may not be a node). The choice of a common point could even add extra information, encoding an average or some other computed value.

In a data visualization that includes relationships, there are many ways to filter the data. In one example, a user selects a designated set of tuples, then filters the entire set of tuples to those that have a particular relationship to one or more of the tuples in the designated set. For example, limit the set of tuples to those in the designated set plus those tuples that are directly related to one or more of the designated tuples. If the tuples represent people, and the relationship is blood relation, then the filter just described would include a person's parents and children.

The filtering example just described may be extended by letting the user specify the number of degrees of separation. In the above example, the number of degrees was one. Consider the example of people and their blood relatives again, and use 2 as the number of degrees of separation (typically this would include 1 degree of separation as well). Two degree would include grandparents and grandchildren, but would also include the person's siblings (children of the person's parents) as well as other parents of the person's children (generally the person's spouse).

Filtering of connectors can also be based on aggregation, such as the number of connections between two nodes.

Note that filters applied to connectors do not inherently filter the nodes. See, e.g., FIG. 8I below.

Consider a scenario where a relationship has been defined that uses fields in one or more source tables. When the tuple data is aggregated, the specific field values used by the relationship are no longer present in the result set. Therefore, in order to aggregate relationship data, implementations typically retrieve the entire unaggregated data set. That is, the aggregation is typically performed within the data visualization application.

For example, consider sports data where one table defines the teams and a second table defines the games the teams have played. See, e.g., FIG. 13A. A data visualization may include a mark per team, with connectors encoding the games they played and connector encodings showing the scores. See, e.g., FIG. 13B. If the teams are aggregated by division, the connector data is typically aggregated as well. See, e.g., FIG. 13C. The connector property aggregation might be total score, average score, etc.

As noted above, data can be aggregated, and marks or connectors displayed based on the aggregated data. A similar process is aggregation of visual marks. Based on the encodings in use, especially discrete encodings, multiple marks could end up mapping to the same location. Likewise, multiple connectors could map to the same location if both end points map to the same location. Some implementations support an additional encoding based on the number of objects that map to the same location, which is applied during a consolidation phase after the data have been retrieved, manipulated, and arranged according to a layout algorithm. For example, the size of a consolidated mark may be determined by how many marks map to the same location, or the width of a consolidated connector may be based on how many connectors have end points at the same locations. In some implementations, a consolidated mark or consolidated connector may use the sum of a quantitative property. This feature not only adds useful functionality but speeds up rendering time in some cases.

When there are a limited number of connectors that may connect any pair of nodes, some implementations draw each connector using a different curve so that each connector is independently visible.

In accordance with some implementations, a process of generating a graphical representation of a data source is performed at a computer having one or more processors and memory. The process generates and displays a graphical user interface on a computer display.

In some implementations, "generating" and "displaying" a data visualization are integrated operations that take raw data from a data source and a visual specification, and produce visual output on a display device. In some implementations, "generating" and "displaying" are separate steps. The generating step takes the raw data and the visual specification and generates an intermediate output, such as a TIFF, JPEG, PNG, or PDF file, or graphic data formatted in a memory structure. The display step uses the intermediate output from the generating step and displays the data visualization on a display device. In some instances, the term "rendering" is used to identify the generating step. When generating and displaying are integrated, one of skill in the art may use the term "generating" or the term "rendering" to refer to both generating and displaying.

The graphical user interface includes a schema information region and a data visualization region. These may be parts of a single window or in separate windows. The schema information region includes multiple field names, where each field name is associated with a data field from the data source. The schema information region also includes one or more relationship names, where each relationship name is associated with a relationship between rows of the data source. The data visualization region includes a plurality of shelves including a row shelf, a column shelf, and a connector shelf. The process detects a user selection of one or more of the field names and a user request to associate each user-selected field name with a respective shelf in the data visualization region. The process also detects a user selection of one or more of the relationship names and a user request to associate each user-selected relationship name with a respective shelf in the data visualization region. The process generates a visual graphic in accordance with the respective associations between the user-selected field names and corresponding shelves and in accordance with the respective associations between the user-selected relationship names and corresponding shelves, and displays the visual graphic in the data visualization region.

In some implementations, the visual graphic includes visual marks corresponding to retrieved tuples from the data source. The vertical and horizontal placement of the visual marks are respectively based on items associated with the row shelf or column shelf respectively by the user. Each item of the items is a field name or a relationship name.

In some implementations, the visual graphic further includes edges that visually connect the visual marks, where the edges correspond to a relationship name associated with the connector shelf by the user.

In some implementations, the visual graphic further includes edges that visually connect the visual marks, where the edges correspond to a first field name associated with the connector shelf by the user. Each edge connects two visual marks whose corresponding tuples share a same field value for the first field name.

In some implementations, a first relationship name is associated with the column shelf by the user. The horizontal placement of visual marks is determined by a user-selected function of the tuples based on a traversal of a graph corresponding to the tuples and the first relationship.

In some implementations, a first field name (of the multiple field names) identifies a computed field whose value for each tuple is computed based on an associated data field from the data source and a first relationship. The first field name is associated with the row shelf or the column shelf.

In some implementations, the computed value of the computed field for each tuple is based on a traversal of a graph corresponding to the tuples and the first relationship.

In some implementations, the data visualization region includes one or more connector property shelves. The connector property shelves may specify the color of the connectors or the width of the connectors, as illustrated in FIG. 5A. The connector property shelves may also be used to specify tapering (e.g., where the width of connectors is wider at one end point than the other endpoint). In some implementations, one or more connector property shelves are used to specify shapes that appear on each connector (e.g., an arrow at the end of the connector showing the destination of the relationship).

When the data visualization region includes connector property shelves, in some instances the process detects a user selection of a relationship name or a field name and a user request to associate the user-selected relationship name or field name with a first connector property shelf. In this case, generating the visual graphic includes visually formatting the connectors in accordance with the user selected relationship name or field name for the first connector property shelf.

In accordance with some implementations, a process of constructing data visualizations is performed at a computer having one or more processors and memory. The process receives a visual specification, which includes a plurality of properties and corresponding user-selected property values. The properties and property values define the layout of a data visualization. A first property value of the user-selected property values identifies one or more source databases for the data visualization. The process determines one or more node queries from the visual specification corresponding to one or more data fields in the source databases. The process also determines one or more link queries from the visual specification corresponding to a first relationship between rows of the source databases. The process retrieves a plurality of node tuples from the database, where each node tuple satisfies at least one of the node queries. The process also retrieves a plurality of link tuples from the database, where each link tuple satisfies at least one of the link queries. The process generates and displays visual marks in the data visualization corresponding to the retrieved node tuples. The process generates and displays edge marks in the data visualization corresponding to the retrieved link tuples. Each edge mark visually connects a pair of visual marks corresponding to the node tuples.

In some implementations, the data visualization is subdivided into a plurality of panes based on the visual specification, where each pane includes a plurality of visual marks and a plurality of edge marks.

In some implementations, each edge mark connects a pair of visual marks within a single pane.

In some implementations, at least one edge mark connects a pair of visual marks that are in distinct panes.

In some implementations, the first relationship is user-selected from a predefined set of relationships and the one or more link queries are constructed from the first relationship.

In some implementations, the first relationship corresponds to a data field f in rows of the source database. Two rows of the source database are related by the relationship when the two rows have a same field value for the data field f.

In some implementations, the first relationship corresponds to a first field f and a second field g, both of which are data fields in the source database. A first row of the source database is related to a second row of the source database when a field value for field f in the first row equals a field value for the field g in the second row.

In some implementations, the one or more link queries are constructed from a user selected field in the source database. The link tuples comprise pairs of rows in the database that have a common value for the user selected field.

In some implementations, horizontal placement of visual marks is determined by a user-selected function of the node tuples based on a traversal of a graph corresponding to the node tuples and a second relationship specified by a property in the visual specification.

In accordance with some implementations, a process of filtering data in data visualizations is performed at a computing device having one or more processors and memory. The process retrieves a set of tuples from a database according to user selection, where each tuple includes the same set of fields. In some implementations, all of the tuples have the same structure, including number of fields, order of fields, field data types, and field names. The process identifies a relationship between tuples. The relationship is a non-empty set of ordered pairs of tuples from the set of tuples. The process receives selection of one or more filter conditions for the tuples, where at least one of the filter conditions uses the relationship. The process receives a selection of an aggregation level, which includes one or more fields from the set of tuples. The process generates and displays a data visualization based on aggregating the set of tuples at the selected aggregation level to form a set of aggregated tuples. Each aggregated tuple is displayed as a visible mark. Each tuple that satisfies all of the filter conditions is included in an aggregated tuple, and each tuple that fails one or more of the filter conditions is not included in an aggregated tuple. In some instances, the process thus uses a relationship between tuples to filter the displayed set of aggregated tuples without displaying a representation of the relationship itself.

In some implementations, the one or more filter conditions include a filter condition that limits the set of tuples to those tuples that are connected to a selected base tuple. A respective tuple is connected to the selected base tuple when there is a non-negative integer n and a sequence of tuples $t_0$, $t_1, \ldots, t_n$ with $t_0$=the respective tuple, $t_n$=the selected base tuple, and $(t_{i-1}, t_i)$ is in the relationship for $i=1, 2, \ldots, n$. The special case of n=0 means that a base tuple is considered connected to itself.

In accordance with some implementations, a process of sorting data in data visualizations is performed at a computing device having one or more processors and memory. The process retrieves a set of tuples from a database according to user selection, where each tuple includes a set of fields. In some implementations, all of the tuples have the same structure, including number of fields, order of fields, field data types, and field names. The process identifies a relationship between tuples. The relationship is a non-empty set of ordered pairs of tuples from the set of tuples. The process receives user selection of the relation to specify the x-position or y-position of visual marks corresponding to the tuples. The process generates and displays a data visualization with each tuple represented by a visible mark. The position of each displayed visual mark (x-position or y-position, based on the user selection) is based on a network traversal of the tuples using the relation.

In some implementations, the network traversal uses a depth first search of the tuples using the relationship.

In some implementations, the network traversal uses a breadth first search of the tuples using the relationship.

In some implementations, the relationship corresponds to a field f in the set of fields. The relationship consists of ordered pairs of distinct tuples $(t_1, t_2)$ for which $t_1$ and $t_2$ have a same field value for the field f.

In some implementations, the relationship corresponds to a first field f and a second field g, both in the set of fields. The relationship consists of ordered pairs of distinct tuples $(t_1, t_2)$ for which the f field value for $t_i$ equals the g field value for $t_2$.

BRIEF DESCRIPTION OF THE DRAWINGS

FIG. 4B illustrates various types of relationships in accordance with some implementations.

FIG. 4C illustrates a table of data used to create family tree diagrams in accordance with some implementations.

FIG. 4D illustrates a pair of tables that illustrates a shipment relationship between facilities in different cities in accordance with some implementations.

FIG. 7A illustrates Quantitative data fields (Q) and Ordinal data fields (O) in accordance with some implementations.

FIGS. 7B and 7C illustrate some types of data visualizations that may be constructed according to the type of layout selected by the user and the types of data fields selected by the user.

FIG. 7E illustrates various ways that a relationship can be used as a Quantitative data field in accordance with some implementations.

FIGS. 8B-8M illustrate data visualizations that may be generated and displayed based on various user selections for the x-position and y-position of marks in conjunction with user selection of a relationship, in accordance with some implementations.

FIGS. 11A-11J provide a sequence of data visualizations corresponding to market basket analysis of store sales in accordance with some implementations.

FIGS. 13A-13D illustrate some post-rendering interactive data visualization features that are provided in some implementations.

FIGS. 15A and 15B illustrate using an alternative user interface to create group edges in accordance with some implementations.

FIGS. 16A and 16B illustrate using an alternative user interface to create path edges in accordance with some implementations.

FIGS. 17A-17E illustrate using an alternative user interface to create edges and nodes based on a relationship in accordance with some implementations.

Like reference numerals refer to corresponding parts throughout the drawings.

Reference will now be made in detail to implementations, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details.

DESCRIPTION OF IMPLEMENTATIONS

Figure 1:
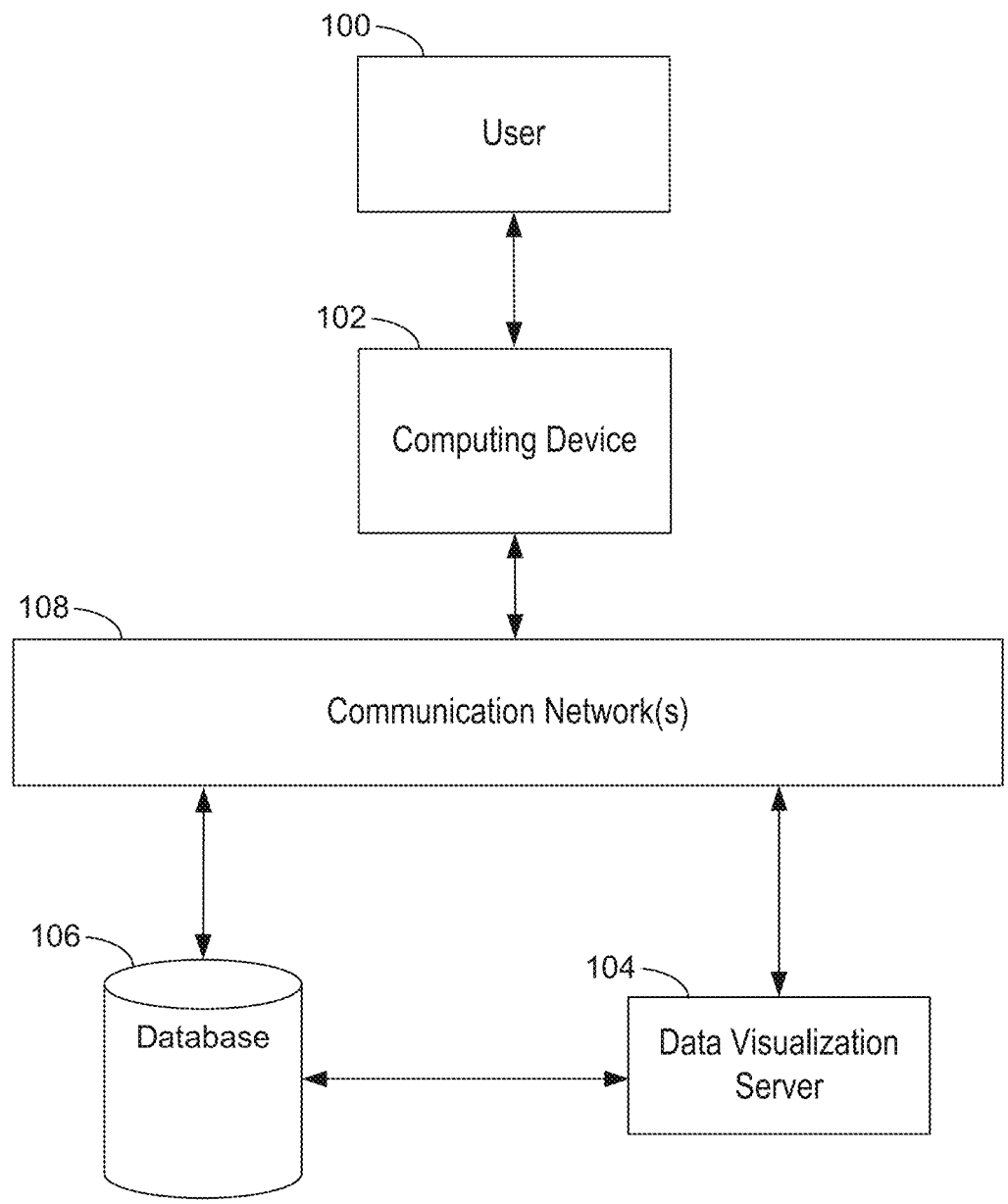
FIG. 1 illustrates a context for a data visualization process in accordance with some implementations.

FIG. 1 illustrates a context for a data visualization process in accordance with some implementations. A user 100 interacts with a computing device 102, such as a desktop computer, a laptop computer, a tablet computer, or a mobile computing device. An example computing device 102 is described below with respect to FIG. 2, including various software programs or modules that execute on the device 102. In some implementations, the computing device 102 includes one or more data sources 236 and a data visualization application 222 that the user 100 uses to create data visualizations from the data sources 236. That is, some implementations can provide data visualizations to a user without connecting to external data sources or programs over a network.

However, in some cases, the computing device 102 connects over one or more communication networks 108 to external databases 106 and/or a data visualization server 104. The communication networks 108 may include local area networks and/or wide area networks, such as the Internet. A data visualization server 104 is described in more detail with respect to FIG. 3. In particular, some implementations provide a data visualization web application 322 that runs within a web browser 220 on the computing device 102. In some implementations, data visualization functionality is provided by both a local application 222 and the server 104. For example, the server 104 may be used for resource intensive operations while most other operations are performed by the data visualization application 222 on the device 102.

Figure 2:
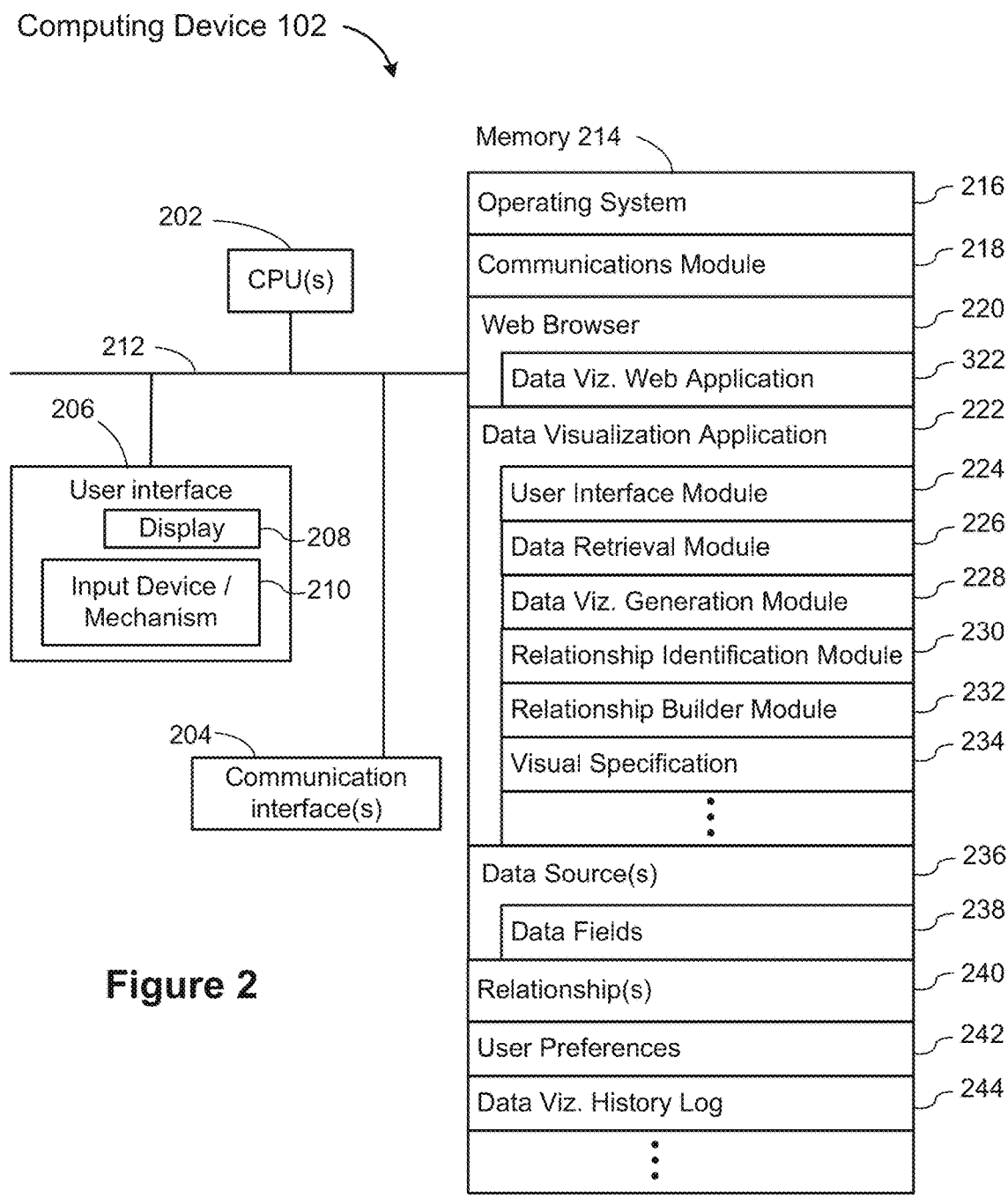
FIG. 2 is a block diagram of a computing device that a user uses to create and display data visualizations in accordance with some implementations.

FIG. 2 is a block diagram of a computing device 102 that a user uses to create and display data visualizations in accordance with some implementations. A computing device 102 typically includes one or more processing units/cores (CPUs) 202 for executing modules, programs, and/or instructions stored in memory 214 and thereby performing processing operations; a user interface 206; one or more network or other communications interfaces 204; memory 214; and one or more communication buses 212 for interconnecting these components.

The user interface 206 includes a display 208 and one or more input devices or mechanisms 210. In some implementations, the input device/mechanism 210 includes a keyboard; in some implementations, the input device/mechanism includes a "soft" keyboard, which is displayed as needed on the display device 208, enabling a user to "press keys" that appear on the display 208. In some implementations, the display 208 and input device/mechanism 210 comprise a touch screen display (also called a touch sensitive display).

In some implementations, the communication buses 212 include circuitry (sometimes called a chipset) that interconnects and controls communications between system components.

In some implementations, memory 214 includes high-speed random access memory, such as DRAM, SRAM, DDR RAM, or other random access solid state memory devices. In some implementations, memory 214 includes non-volatile memory, such as one or more magnetic disk storage devices, optical disk storage devices, flash memory devices, or other non-volatile solid state storage devices. Optionally, memory 214 includes one or more storage devices remotely located from the CPU(s) 202. Memory 214, or alternatively the non-volatile memory device(s) within memory 214, comprises a non-transitory computer readable storage medium.

Memory 214, or the computer readable storage medium of memory 214, stores the following programs, modules, and data structures, or a subset thereof:
- an operating system 216, which includes procedures for handling various basic system services and for performing hardware dependent tasks;
- a communications module 218, which is used for connecting the computing device 102 to other computers and devices via the one or more communication network interfaces 204 (wired or wireless) and one or more communication networks 108, such as the Internet, other wide area networks, local area networks, metropolitan area networks, and so on;
- a web browser 220 (or other client application), which enables a user 100 to communicate over a network with remote computers or devices. In some implementations, the web browser 220 executes a data visualization web application 322 downloaded from a data visualization server 104. In some implementations, a data visualization web application 322 is an alternative to storing a data visualization application 222 locally;
- a data visualization application 222, which provides a graphical user interface (GUI) and enables users to construct data visualizations from various data sources. In some instances, the data visualization application 222 retrieves data from a data source 236 and displays the retrieved data (including relationships) in one or more data visualizations. In some implementations, the data visualization application invokes other modules (either on the computing device 102 or at a data visualization server 104) to visualize the retrieved data or relationships. In some implementations, the data visualization application 222 is a standalone application that runs on the client device. In some instances, the standalone application 222 retrieves data from a local data source 236, but in other instances the application 222 retrieves data from a remote database 106. In some implementations, most of the processing occurs on the client device, but the data visualization application 222 hands off certain resource intensive operations to a data visualization server 104; and
- one or more data sources 236, which have data fields 238 that may be displayed by the data visualization application 222. Some data sources 236 store relationships 240 between other fields. In some implementations, the relationships 240 are stored separately from the data fields. Data sources 236 can be formatted in many different ways, such as spreadsheets, XML files, flat files, CSV files, text files, desktop database files, or relational databases. Typically the data sources 236 are used by other applications as well (e.g., a spreadsheet application).

In some implementations, the data visualization application 222 comprises a plurality of modules. The graphical user interface is provided by a user interface module 224, which provides the user interface for all aspects of the application 222. The user interface module 224 is described in more detail below with respect to FIG. 5A. Some implementations include a data retrieval module 226, which builds and executes queries to retrieve data from one or more data sources 236. The data sources 236 may be stored locally on the device 102 or stored in an external database 106. In some implementations, data from two or more data sources may be blended. In some implementations, the data retrieval module 226 uses a visual specification 234 to build the queries. Visual specifications are described in more detail below with respect to FIG. 5A.

In some implementations, the data visualization application 222 includes a data visualization generation module 228, which uses retrieved data from one or more data sources 236 to generate a data visualization according to the user's request (which may be specified in a visual specification). The user interface module 224 then displays the rendered data visualization on the display device 208.

Some implementations include one or more modules to handle relationships. In some implementations, a relationship identification module 230 automatically discovers some relationships within a data source 236 (or across data sources 236). For example, the relationship identification module may identify an equivalence relationship between tuples that have the same value for a data field 238 (e.g., for data representing items purchased, two tuples with the same Order ID have the relationship of being in the same order). In some cases, relationships are constructed by a user using the relationship builder module 232. Examples of relationships are described in more detail below with respect to FIG. 4B.

Some implementations use a visual specification 234 to build and describe a data visualization. A user builds a visual specification 234 implicitly using the user interface, and the visual specification 234 specifies what data fields 238 and relationships 240 are used, how they are encoded, and so on. This is described in more detail with respect to FIG. 5A. The data retrieval module 226 uses the visual specification 234 to retrieve the relevant data, and the data visualization generation module uses the retrieved data and the visual specification 234 to generate the data visualization.

In some implementations, the memory 214, or the computer readable storage medium of memory 214, further stores the following programs, modules, and data structures, or a subset thereof:
- a set of user preferences 242. The user preferences 242 may be specified explicitly by the user or inferred based on historical selections by the user; and
- a data visualization history log 244, which stores data (e.g., the data fields and the visual specification) for each data visualization created by the data visualization application 222. In some implementations the history log 244 is used to build the set of user preferences 242.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 214 may store a subset of the modules and data structures identified above. Furthermore, memory 214 may store additional modules or data structures not described above.

Although FIG. 2 shows a computing device 102, FIG. 2 is intended more as a functional description of the various features that may be present rather than as a structural schematic of the implementations described herein. In practice, and as recognized by those of ordinary skill in the art, items shown separately could be combined and some items could be separated.

Figure 3:
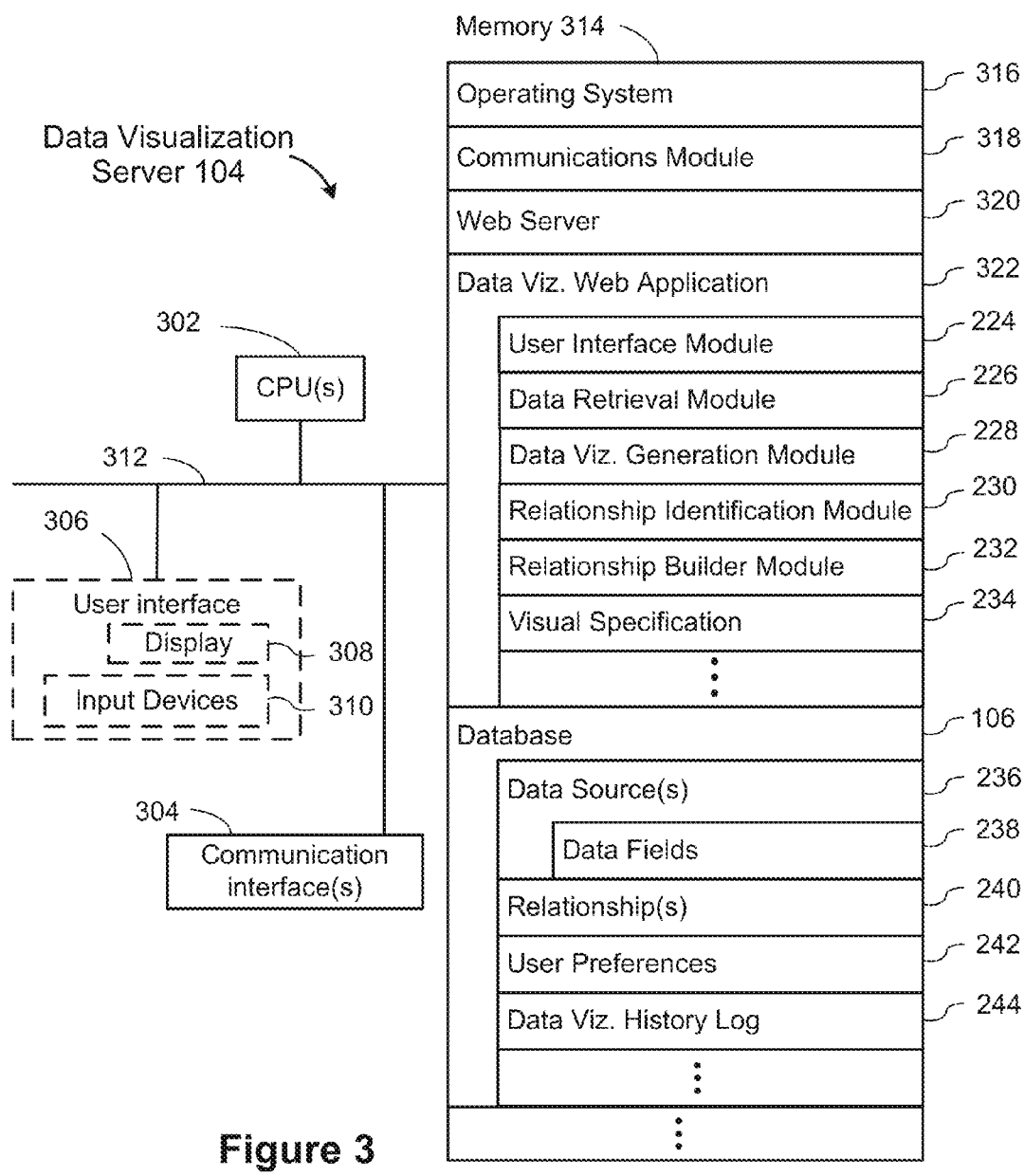
FIG. 3 is a block diagram of a data visualization server in accordance with some implementations.

FIG. 3 is a block diagram of a data visualization server 104 in accordance with some implementations. A data visualization server 104 may host one or more databases 106 or may provide various executable applications or modules. A server 104 typically includes one or more processing units/cores (CPUs) 302, one or more network interfaces 304, memory 314, and one or more communication buses 312 for interconnecting these components. In some implementations, the server 104 includes a user interface 306, which includes a display device 308 and one or more input devices 310, such as a keyboard and a mouse. In some implementations, the communication buses 312 may include circuitry (sometimes called a chipset) that interconnects and controls communications between system components.

In some implementations, memory 314 includes high-speed random access memory, such as DRAM, SRAM, DDR RAM, or other random access solid state memory devices, and may include non-volatile memory, such as one or more magnetic disk storage devices, optical disk storage devices, flash memory devices, or other non-volatile solid state storage devices. Memory 314 may optionally include one or more storage devices remotely located from the CPU(s) 302. Memory 314, or alternately the non-volatile memory device(s) within memory 314, comprises a non-transitory computer readable storage medium.

In some implementations, memory 314 or the computer readable storage medium of memory 314 further stores the following programs, modules, and data structures, or a subset thereof:
- an operating system 316, which includes procedures for handling various basic system services and for performing hardware dependent tasks;
- a network communication module 318, which is used for connecting the server 104 to other computers via the one or more communication network interfaces 304 (wired or wireless) and one or more communication networks 108, such as the Internet, other wide area networks, local area networks, metropolitan area networks, and so on;
- a web server 320 (such as an HTTP server), which receives web requests from users and responds by providing responsive web pages or other resources;
- a data visualization web application 322, which may be downloaded and executed by a web browser 220 on a user's computing device 102. In general, a data visualization web application 322 has the same functionality as a desktop data visualization application 222, but provides the flexibility of access from any device at any location with network connectivity, and does not require installation and maintenance. In some implementations, the data visualization web application 322 includes various software modules to perform certain tasks, including a user interface module 224, a data retrieval module 226, a data visualization generation module 228, a relationship identification module 230, and a relationship builder module 232. These software modules are described above with respect to FIG. 2, and are described in more detail below. In some implementations, the data visualization web application 322 uses a visual specification 234, as described above with respect to FIG. 2 and described below with respect to FIG. 5A; and
- one or more databases 106, which store data used or created by the data visualization web application 322 or data visualization application 222. The database 106 may store data sources 236, which provide the data used in the generated data visualizations. A data source 236 may store data in many different formats, and commonly includes many distinct tables, each with a plurality of data fields 238. Some data sources comprise a single table. The data fields 238 include both raw fields from the data source (e.g., a column from a database table or a column from a spreadsheet) as well as derived data fields, which may be computed or constructed from one or more other fields. For example, derived data fields include computing a month or quarter from a date field, computing a span of time between two date fields, computing cumulative totals for a quantitative field, computing percent growth, and so on. In some instances, derived data fields are accessed by stored procedures or views in the database. In some implementations, the definitions of derived data fields 238 are stored separately from the data source 236. In some implementations, the database 106 stores relationships 240 identified by relationship identification module 230 or constructed by the relationship builder module 232. For example, relationships built by one user 100 may be subsequently used by other users. In some implementations, the database 106 stores a set of user preferences 242 for each user. The user preferences may be used when the data visualization web application 322 (or application 222) makes recommendations about how to view a set of data fields 238. In some implementations, the database 106 stores a data visualization history log 244, which stores information about each data visualization selected by the user 100. In some implementations, the database stores other information, including other information used by the data visualization application 222 or data visualization web application 322. As illustrated in FIGS. 1 and 3, databases 106 may be separate from the data visualization server 104, or may be included with the data visualization server (or both).

In some implementations, the data visualization history log 244 stores the visual specifications selected by users, which may include a user identifier, a timestamp of when the data visualization was created, a list of the data fields used in the data visualization, the type of the data visualization (sometimes referred to as a "view type" or a "chart type"), data encodings (e.g., color and size of marks), the data relationships selected, and what connectors are used. In some implementations, one or more thumbnail images of each data visualization are also stored. Some implementations store additional information about created data visualizations, such as the name and location of the data source, the number of rows from the data source that were included in the data visualization, version of the data visualization software, and so on.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 314 may store a subset of the modules and data structures identified above. Furthermore, memory 314 may store additional modules or data structures not described above.

Although FIG. 3 shows a data visualization server 104, FIG. 3 is intended more as a functional description of the various features that may be present rather than as a structural schematic of the implementations described herein. In practice, and as recognized by those of ordinary skill in the art, items shown separately could be combined and some items could be separated. In addition, some of the programs, functions, procedures, or data shown above with respect to a server 104 may be stored on a computing device 102. In some implementations, the functionality and/or data may be allocated between a computing device 102 and one or more servers 104. Furthermore, one of skill in the art recognizes that FIG. 3 need not represent a single physical device. In some implementations, the server functionality is allocated across multiple physical devices that comprise a server system. As used herein, references to a "server" or "data visualization server" include various groups, collections, or arrays of servers that provide the described functionality, and the physical servers need not be physically colocated (e.g., the individual physical devices could be spread throughout the United States or throughout the world).

Figure 4A:
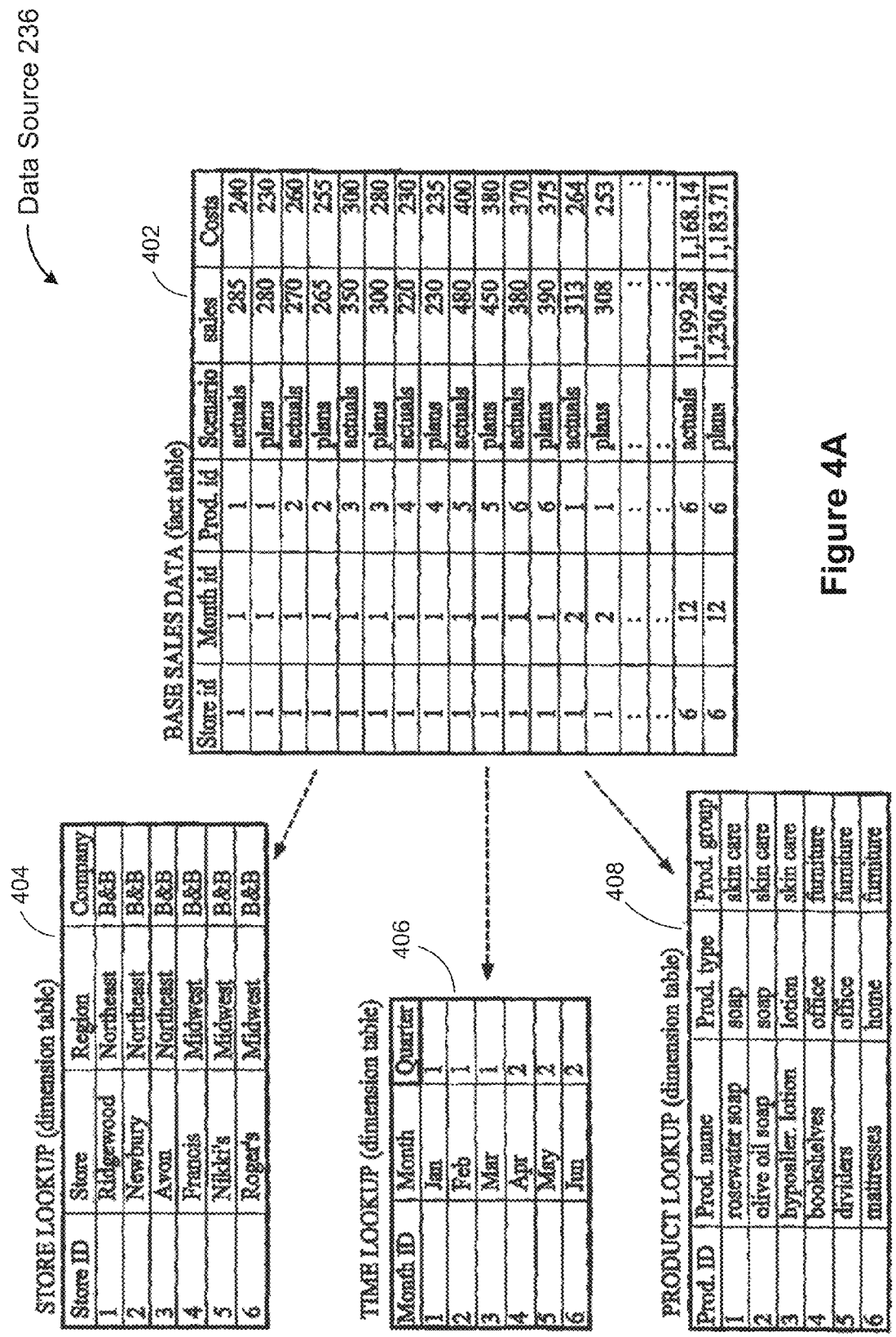
FIG. 4A illustrates tables in a data source in accordance with some implementations.

FIG. 4A illustrates a data source 236 with four tables, which may be stored in a database 106, such as a structured query language (SQL) database. The data source 236 organizes the data into tables where each row corresponds to a basic entity or fact and each column represents a property of that entity. For example, a table may represent transactions at a bank, where each row corresponds to a single transaction and each transaction has multiple attributes (data fields 238), such as the transaction amount, the account balance, the bank branch, and the customer. FIG. 4A illustrates an exemplary data source 236 that includes a base table 402 and a plurality of lookup tables 404, 406, and 408 in accordance with some implementations.

In this example, the base table 402 represents sales data for a business entity, where each row corresponds to certain sales information for a specific product. Each row of the base sales table 402 has multiple properties, including the store, the month, the product, the scenario, the sales, and the costs. As used herein, a row in a table is commonly referred to as a tuple or record, and a column in a table is referred to as a data field 238. The base table 402 and the plurality of lookup tables 404-408 together form a star schema in which the central fact table is surrounded by each of the dimension tables that describe each dimension (or attribute) of the central fact table. In this example, the base sales data table 402 is the fact table and each lookup table is a dimension table.

The data fields 238 within a table can be categorized in various ways. In some implementations, each data field 238 is classified as either a "dimension" or a "measure." Dimensions and measures are similar to independent and dependent variables in traditional analysis. In a banking example, the bank branch and account number are dimensions (they are independent), whereas the account balance is a measure (it depends on the branch and account selected). A single database will often describe many heterogeneous but interrelated entities. For example, a database designed for a coffee chain might maintain information about employees, products, and sales.

Some implementations also classify data fields 238 based on their data types. Although there are many different data types used by various data sources 236 (e.g., 16-bit integer, 32 bit integer, single precision floating point, double precision floating point, fixed size decimal, date/time, fixed length character string, variable length character string, Boolean, etc.), it is useful to classify these data types based on the structure of their values. In some implementations, each data field 238 is classified as ordinal (O) or quantitative (Q). The values of an ordinal data field 238 are discrete, typically corresponding to data values that are character strings (e.g., regions). The values of a quantitative data field 238 are continuous, such as sales or profit. The classification and use of ordinal and quantitative data fields is described in more detail below with respect to FIGS. 7A-7D.

Disclosed implementations visualize not only tuples of data fields 238, but also relationships between tuples. For example, visualizing a social network may include a node for each person (each person corresponding to a tuple) and connectors between nodes to depict relationships between people in the social network. FIG. 4B identifies some of the types of relationships that may be established and visualized. In some implementations, these relationships are identified by the relationship identification module 230 or constructed by a user 100 using the relationship builder module 232.

In some implementations, a first-order relationship 410 is identified when a value of a first data field 238 of a first tuple is equal to a value of a second data field 238 of a second tuple. One example of this is illustrated in FIG. 4C.

FIG. 4C illustrates a simplified family tree table 438, which includes data for various people. In this example, each person is uniquely identified by an ID 440. The table 438 also includes each person's first name 442 and last name 444. Some family tree tables 438 address the fact that some names change over time, but in this example the data represents a person's first and last name at birth. Even if two people share the same first and last names, they would have distinct ID values. The family tree table may include various data about the people, including gender 452, birth date 454, and birthplace 456. In this simplified example, the birthplace 456 may be limited to U.S. states or foreign countries. In some instances, the family tree table 438 includes data fields to track when a person dies (death_date 458) and the location where the person died (death_place 460). In some implementations, the death_date 458 and death_place 460 are NULL or blank while the person is still alive.

In addition to this basic data about each person, this sample family tree table 438 includes information that shows relationships with other people. When specified, the father_id 446 is the ID number of a person's father. For example, Bob's father_id is 1, which is the ID of Abe, so this information shows that Abe is Bob's father. Similarly, the mother_id field 448, when present, specifies the ID of a person's mother. For example, both Dave and Edith have mother_id=3, with specifies that their mother is Cathy Smith. Finally, for those people who are or were married, the table 438 includes a spouse_id 450, which specifies the ID of a person's spouse. In this example, Cathy (ID=3) is the spouse of Bob (ID=2), and vice versa. Note that the father_id and mother_id are permanent facts, whereas a person could remarry after divorce or the death of an earlier spouse. Some implementations of a family tree table support these more complex scenarios.

The "child-father" relationship created by this family tree table 438 is a first-order relationship 410. In this example, both the person and the person's father are tuples in the same table 438.

FIG. 4D illustrates another example of a first order relationship. FIG. 4D includes a facilities table 470 that defines facilities. This highly simplified table 470 includes a unique facility_id 472 for each facility and two pieces of information about the facility: the city 474 where the facility is located and its capacity 476, which is some relevant measure of volume (e.g., cubic feet, cubic yards, bushel boxes, or TEU (twenty-foot equivalent units, used in the container industry)). FIG. 4D also includes a shipment table 480, which identifies shipments between the facilities. Each shipment record is uniquely identified by a shipment_id 482. The shipment table 480 includes various information about each shipment, including the ship_date 484, the receive_date 486, the item shipped 494, the amount 492 of the item shipped, the cost 496 of the shipping, and the carrier 498. The amount 492 is typically specified using the same unit of measure as the capacity data field 476 in the facilities table 470. One of skill in the art will recognize that an actual shipment table 470 would contain much more information, such as the weight, the volume, the monetary value, the number of widgets, the number of boxes, the mileage, and so on.

The shipment table has a "from" field 488, which specifies a facility_id 472 for the starting point of the shipment and a "to" field 490, which specifies the ending point of the shipment. The shipment table 480 in this example creates a relationship between the facility tuples. In particular, the origin is the facility tuple where the value of the facility_id 472 matches the value of the "from" field 488 in the shipment table. The destination is the tuple where facility_id matches "to" field 490. The shipment table is the relationship table, which allows for properties on the relationship itself. Some implementations use the notation {{facility_id=from}={facility_id=to}} to represent this relationship. This is another example of a first order relationship 410.

Note that in these two first order relationships, the roles of the tuples is not symmetric. In the first example, Abe is the father of Bob, but Bob is not the father of Abe. Similarly, in the second example, a shipment going from Seattle to San Diego is quite different from a shipment in the opposite direction. In some implementations, once a relationship is defined, an inverse relationship may also be used. An inverse relationship uses the same tuples, but has the opposite "direction" (e.g., "received from" would be the inverse of "shipped to" in the second example above).

In some implementations, a second order relationship 412 is created by chaining together two first-order relationships (which may be the same relationship). For example, a "paternal grandfather" relationship could be defined as one in which the father field of one tuple matches the person id field of a second tuple and the father field of the second tuple matches the person id field of a third tuple. The third tuple specifies the paternal grandfather of the first tuple. In some implementations, this relationship uses the notation {{ID=father_id}, {ID=father_id}}. Higher order relationships 412 can be defined in a similar fashion.

Some implementations also allow n-order relationships to be combined into a more complex relationship 414. For example, consider a parent relationship, expressed as {id=father|mother}. That is, the person ID of the second tuple matches either the father or mother fields of the first tuple. The grandparent relationship can be expressed as {{id=father|mother}, {id=father|mother}}, and so on. A descendant relationship can be defined as the union of the first order parent relationship {id=father|mother}, the second order grandparent relationship {{id=father|mother}, {id=father|mother}}, the third order great-grandparent relationship, and so on. This chaining of one or more first order relationships in this way can be represented as {id=father|mother}*, where the asterisk * indicates one or more iterations of the first order relationship. This is an example of a relationship 414 defined as a union of chained first order relationships.

An equivalence relationship 416 is a relationship between tuples that share the same value for a specified data field. (Some more complex examples are described below.) For example, in a database of people, there is an equivalence relationship between people who share the same last name. Some implementations express this as {last name}. In some instances, the equivalence relationship requires two or more fields from the tuples to have matching field values. For example, suppose a large retailer collects sales data from many stores. Each store has a unique store ID, and each order at a store has a unique order ID. Each order may have multiple line items. Each store operates independently of the others, so the same order IDs may be used at different stores. On a weekly basis, all of the sales data is collected from all of the stores into a single data warehouse. Within this data warehouse, an equivalence relationship is created to group items that were purchased together in a single order. In this case, tuples must have the same store ID and the same order ID in order to be related. This equivalence relationship is expressed as {{store ID} & {order ID}} in some implementations. More generally, {{field1} & {field2}} may be used to denote an equivalence relationship that requires two matching fields. The same notation can be extended to three or more fields.

In some instances, tuples are related when either of two fields have matching values. For example, the tuples may include the data fields field1 and field2. If two tuples have matching data values for field1, then the tuples satisfy the equivalence relationship. On the other hand, if two tuples have matching data values for field2, the two tuples satisfy the equivalence relationship as well. Matching either one of the data fields field1 or field2 (or both) establishes the relationship. Some implementations use the notation {{field1}|{field2}} for this relationship. For example, in a table of people, a "sibling" relationship could be defined as those individuals who share a common mother or father (or both). This could be expressed as {{mother}|{father}}. The same relationship concept can be extended to three or more fields. In addition, "and" and "or" operations can be combined in many other ways to create more complex equivalence relations.

A delta-tolerance relationship 418 is defined using a quantitative data field 238 and a positive tolerance value $\Delta$. For example, suppose each tuple has the quantitative data field X, suppose a and b are two such tuples, and suppose a tolerance value $\Delta=0.35$ is specified. Then the pair of tuples (a, b) satisfies the relationship if $|a.X-b.X|<0.35$. Note that this delta-tolerance relationship 418 is not an equivalence relationship 416 because a delta-tolerance relationship 418 is not transitive. One of skill in the art recognizes that delta-tolerance relationships can be expanded in various ways by including two or more data fields 238 in the calculation or forming a Boolean combination of two or more delta-tolerance calculations.

Some implementations support clustering relationships 420. One of skill in the art recognizes that various clustering algorithms can be applied to one or more of the quantitative data fields in the retrieved tuples, which results in partitioning the tuples into a plurality of distinct clusters. For example, suppose there are two distinct quantitative data fields 238 in the tuples, and these two quantitative fields will be used to specify the x-position and y-position of marks in a scatter plot. In some instances, the data naturally subdivides into distinct clusters as seen in the scatter plot. In this case, a clustering relationship 420 can be defined based on the clusters. That is, every pair of tuples within a cluster is related, and no tuple is related to a tuple in a different cluster.

One of skill in the art will recognize that many other types of relationships can be identified or constructed, and these relationships may be either identified by the relationship identification module 230 or constructed using the relationship builder module 232. Once a relationship is constructed, some implementations classify the relationship. FIG. 4B illustrates some of the classifications.

Some relationships are classified as directed relationships 422. In the examples above, the first order relationships 410, the second order relationships 412, and higher order relationships 414 are all directed. For example, in a child-father relationship, the roles of the child and the father are not interchangeable. In the example above of shipments from one facility to another, the relationship is directed because the shipments take products from a source facility to a destination facility.

On the other hand, some relationships are classified as undirected relationships 424. For example, an equivalence relationship 416 is undirected. If tuple A is related to tuple B, then tuple B is related to tuple A. Clustering relationships 420 are similarly undirected. Whenever two tuples are in the same cluster, they are related. That is, if tuple A is in the same cluster as tuple B, then tuple B is in the same cluster as tuple A.

In some instances, an undirected relationship 424 can be converted into a directed relationship 422 by assigning a "direction" (potentially arbitrarily) to each relation between pairs of tuples. In other instances, a directed relationship 422 may be converted to an undirected relationship 424 by ignoring the direction of the original relations.

Some implementations identify whether a relationship has any loops (e.g., tuple A is related to tuple B, tuple B is related to tuple C, and tuple C related to tuple A). A relationship without any loops may be classified as a tree 426, whereas a relationship with one or more loops is typically classified as a graph 428. Although the term "tree" commonly refers to a graph that is fully connected (and acyclic), as used herein, a tree may consist of multiple disconnected portions, as long as there are no cycles.

Figure 4E:
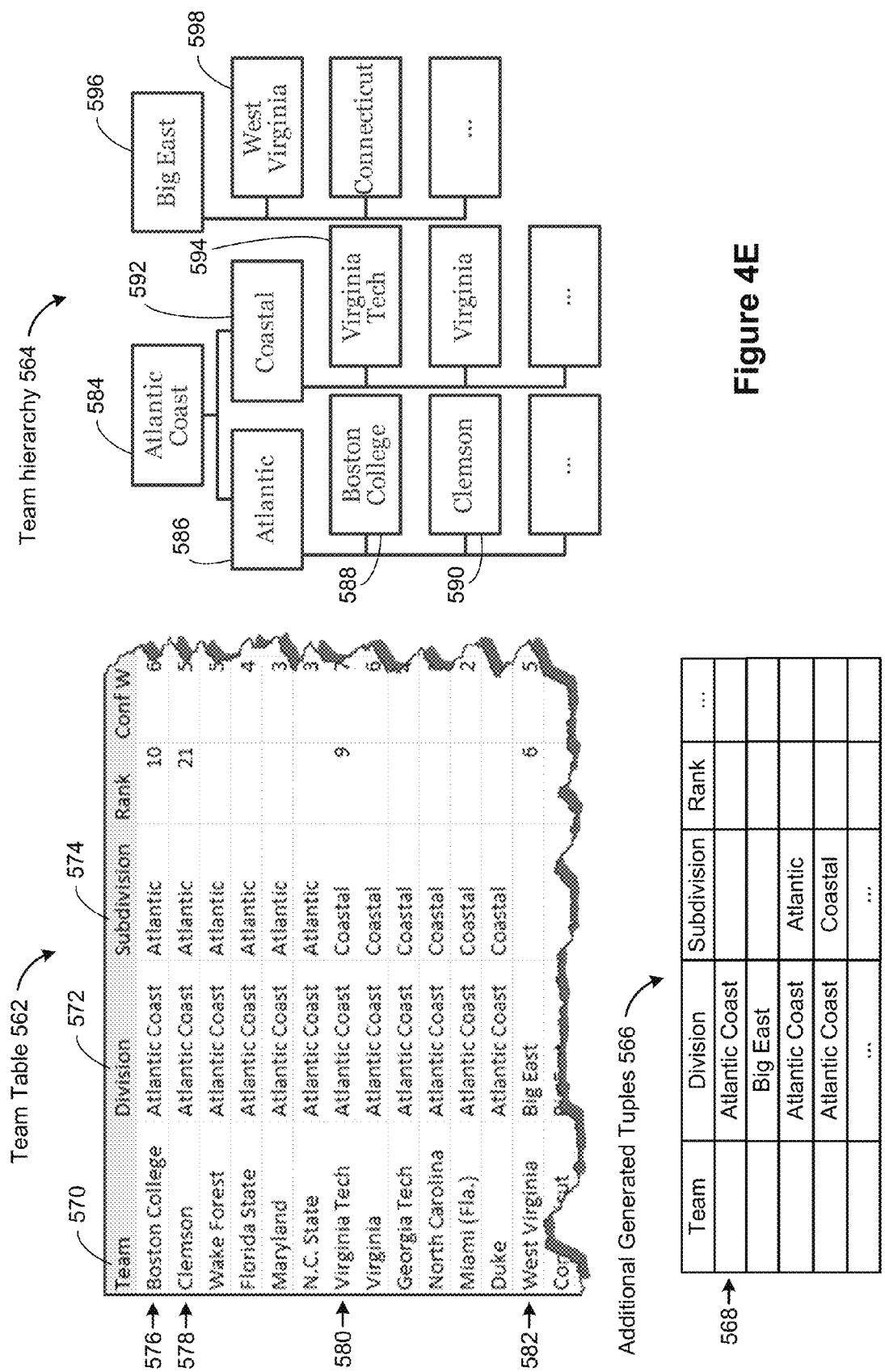
FIG. 4E illustrates a category tree hierarchical relation in accordance with some implementations.

FIG. 4E illustrates a relationship between tuples based on a data field hierarchy. This is sometimes referred to as a category tree. One aspect of these relationships that is different from those depicted in FIG. 4B is that additional tuples are automatically constructed as needed to fill out the hierarchy. The example in FIG. 4E is based on college football teams in the United States. Each team 570 is assigned to a specific division 572 and a specific subdivision 574 within the division 572. As illustrated in the team hierarchy 564, there is a hierarchy relationship between divisions, subdivisions, and teams. However, each of the tuples in the team table 562 (e.g., tuples corresponding to rows 576, 578, 580, and 582) represents a team 570. There are no tuples that represent a division or subdivision. For example, the data in the first row 576 is for the team Boston College. The row 576 identifies the division 572 and subdivision 574 that Boston College belongs to, but the row 576 does not represent an entire division or subdivision. In particular, there are other rows, such as the second row 578 that belong to the same division and subdivision.

In this case, when the defined relationship is used, additional tuples 566 are added to represent the divisions and subdivisions. Note that a row for a division, such as row 568 for the Atlantic Coast division, only has the name of the division, and no other data, because the other data fields team 570, subdivision 574, etc. are not properties of a division. On the other hand, the additional rows for subdivisions include the information that specifies which division they are in. As used in this disclosure, the term "row" typically refers to rows from the data source 236, whereas "tuple" typically refers to a record that has been retrieved from the data source, and potentially modified in various ways. For example, a retrieved tuple only includes the data fields that are needed for the requested data visualization, which is typically fewer than all of the fields in the data source. In addition, the tuples may include additional computed data fields. Here, there are additional tuples to fill out the hierarchy.

Having defined the category tree relationship, a user could construct the team hierarchy 564 using the user interface 500. For example, the connectors are specified by the relationship, and the positioning of the elements uses one or more quantitative fields constructed from the relationship, similar to those described below with respect to FIG. 7E. In particular, a category tree forms a tree relationship $R_T$ 426 among the tuples once the additional tuples 566 are added, so a depth first search of the tree creates an ordering for the tuples as illustrated in the team hierarchy 564. The divisions 584 and 596 are the top level "roots" for each subtree. In this illustration, the Big East division 596 is not divided into subdivisions, so all of the teams, including West Virginia 598 (corresponding to row 582 in the data source) are ordered under the division 596. The Atlantic Coast division 584 is divided into the Atlantic subdivision 586 and the Coastal subdivision 592, and each of these subdivisions has multiple teams. In this example, Boston College 588 and Clemson 590 are in the Atlantic subdivision 586 and Virginia Tech 594 is in the Coastal subdivision 592. In this case, the teams within a subdivision may be ordered by a specific rule (e.g., alphabetical, by rank, etc.), or it may be arbitrary.

Figure 5A:
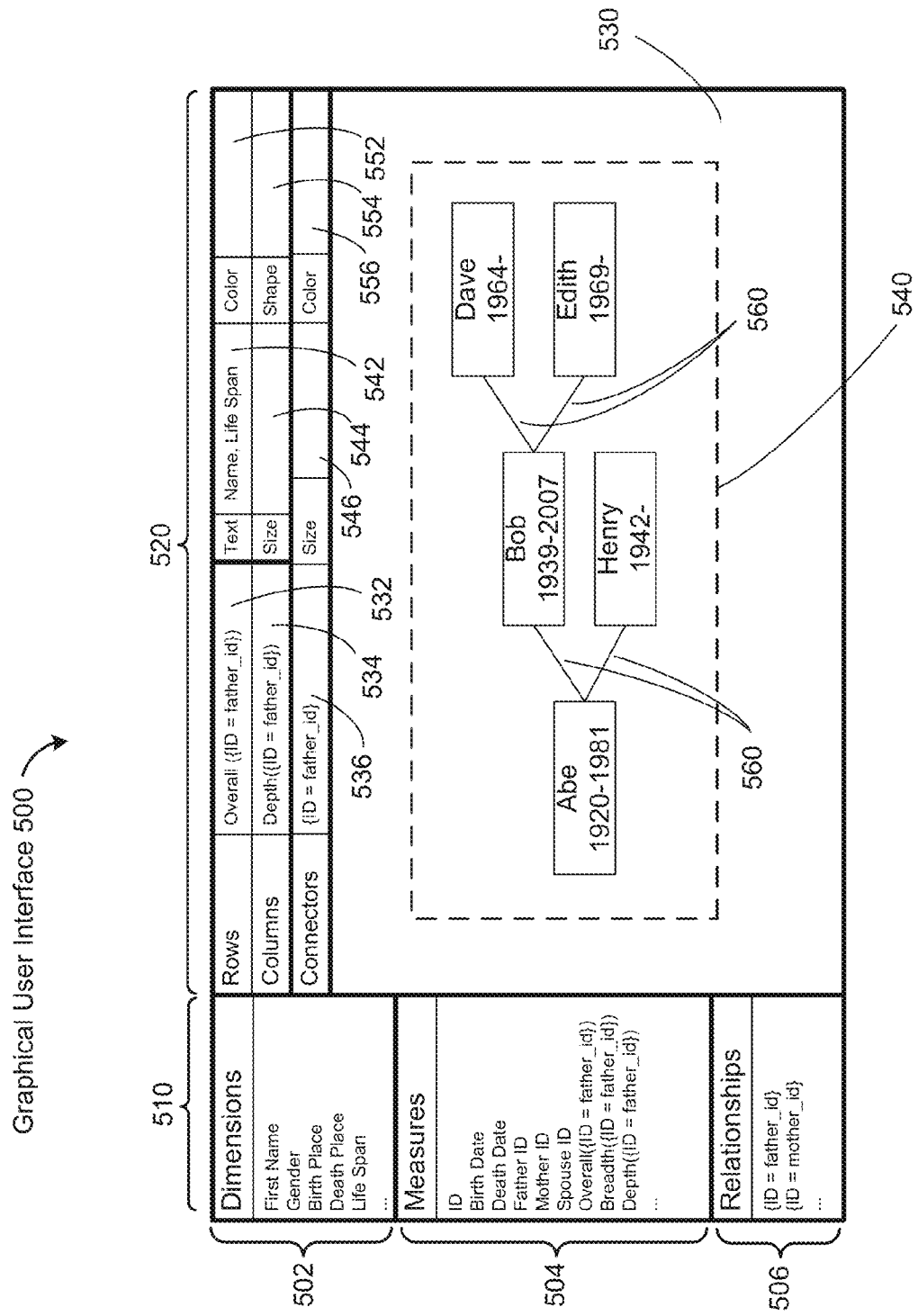
FIG. 5A illustrates a graphical user interface (GUI) that a user may use to create data visualizations in accordance with some implementations.

FIG. 5A illustrates a graphical user interface (GUI) 500 that enables users to build data visualizations in accordance with some implementations. The user interface 500 includes a schema information region 510 and a data visualization region 520. The data visualization region 520 includes a plurality of shelves (described below) where the user 100 specifies various characteristics of a desired data visualization. Below the shelves in this implementation, the data visualization region 520 includes a graphic display region 530 where the data visualizations are displayed. In this illustration, the graphic display region 530 is displaying a data visualization 540.

The schema information region 510 displays the data fields 238 and relationships 240 from the selected data source(s) 236. In some implementations, the schema information region 510 is subdivided into sections. In this illustration, the schema information region 510 includes a dimensions section 502, a measures section 504, and a relationships section 506. As noted above, some implementations categorize the data fields 238 into dimensions and measures. Some implementations then display the dimension data fields 238 in the dimensions section 502 and the measure data fields 238 in the measures section 504. Each data field 238 may correspond directly to a field in the underlying data source 236, or may be computed or derived from one or more data source fields. In the example depicted in FIG. 5A, the measures section 504 includes three derived data fields 238 that are based on the child-father relationship 240 (i.e., the three data fields at the bottom of the measures section 504, beginning with the derived data field Overall ({ID=father_id}) 238. In the dimensions section 502, the Life Span data field 238 is computed based on the birth year and death year, which are derived from the Birth Date and Death Date measures. Another example of a derived data field 238 is age. In some instances, "age" is the difference between the current date (or some reference date) and a birth date or other start date. Using the data fields 238 in the schema information region, age at death may be computed by subtracting the birth date from the death date (and typically truncating to full years).

In some implementations, the dimensions and measures are grouped together in a single section. In some implementations, the dimensions and measures are sorted alphabetically. In some implementations, a user can assign an alias or label to a data field 238, which can be used instead of the field name from the data source 236. In some implementations, a user may specify a sort order for the dimensions or measures. This may be particularly useful when the number of data fields 238 requires scroll bars in the dimensions section 502 or measures section 504 (e.g., sort the data fields so that the most frequently used fields are at the top).

In addition to the data fields 238, the schema information region 510 includes a relationships section 506, which displays zero or more relationships 240 among the data (e.g., relationships such as those illustrated in FIG. 4B). Some of the relationships 240 may be identified by the relationship identification module 230 (e.g., relationships based on a single field or relationships previously defined by the same or a different user). In some implementations, the user interface 500 includes a button, toolbar icon, or menu option to invoke the relationship builder module 232, which can be used to define one or more relationships. Once constructed, such a relationship displays in the relationship section 506, and may be saved (e.g., in database 106) for future use. In some implementations, relationships 240 are assigned a default name or label, such as "{ID=father_id}" as illustrated in the relationships section 506. In some implementations, a user 100 may assign an alternative name or label to relationships.

As illustrated in FIG. 5A, data fields 238 are used to build relationships 240, and relationships can be used to construct additional data fields. Here, the data fields ID and father_id are used to build the father relationship {ID=father_id}. In addition, the relationship {ID=father_id} is used to build three data fields 238. The data field labeled Overall ({ID=father_id}) represents an overall position of each tuple in a traversal of a graph formed using the {ID=father_id} relationship. (See also FIG. 7E.) The data field labeled Depth({ID=father_id}) represents the depth of each tuple in a tree formed by the relationship. Similarly, the data field labeled Breadth({ID=father_id}) can be defined for each tuple as the total number of tuples at the same depth. In some instances, the number of "siblings" includes the tuple itself. Mathematically, the breadth at tuple A can be computed by finding the unique tuple B (if one exists in the data set), for which A.father_id=B.ID, then computing the cardinality of the set of all tuples C for which C.father_id=B.ID. In some instances, the breadth at a tuple defaults to 1 when the tuple has no father in the data set. In some instances, the breadth of each tuple can be defined as the number of children of each tuple. In other words, for a tuple A, the number of children is the cardinality of the set {B|B.father_id=A}.

Each of the data fields 238 and each of the relationships 240 can be associated with a shelf in the data visualization region 520. Some systems to create data visualizations are described in U.S. Pat. No. 7,089,266, entitled "Computer Systems and Methods for the Query and Visualization of Multidimensional Databases," which is incorporated herein by reference in its entirety. Additional data visualization systems are described in U.S. Pat. No. 8,099,674, entitled "Computer Systems and Methods for Automatically Viewing Multidimensional Databases" and U.S. patent application Ser. No. 14/242,843, filed Apr. 1, 2014, entitled "Systems and Methods for Ranking Data Visualizations," both of which are incorporated herein by reference in their entirety.

In some implementations, the data visualizations are broadly categorized into general layout types. Some implementations include the layout types Cartesian, circular (also referred to as "radial" or "polar"), packed, and network. In Cartesian layouts, the rows shelf 532 and the columns shelf 534 typically define the y-position and x-position of graphical marks (e.g., points in a scatter plot or bars in a bar chart). The type of marks in a data visualization is generally associated with the view type (also referred to as a "chart type"). For example, bars in a bar chart, text in a text table, points in a scatter plot or line chart, and so on.

The visual appearance of the marks can be modified by various encodings. In the text encoding shelf 542, the user may specify one or more data fields whose text will be used with the marks (either as the marks themselves, or as associated labels). In the example of FIG. 5A, the text encoding specifies the "Name" and "Life Span" data fields 238, so the text for these two fields are used as part of the marks in the data visualization 540.

The color encoding shelf 552 can be used to specify different colors for marks based on values of a data field. For example, a user could select the "Gender" data field for color encoding, in which case the data visualization 540 would use different colors for men and women. In this example, color encoding may be implemented as the background color for each of the boxes, so the background color for Edith would be different from the other four boxes. Implementations typically assign certain colors by default, but the default colors may be changed by the user.

The size encoding shelf 544 may be used to correlate the size of visual marks with a quantitative data field. In the example of FIG. 5A, size encoding could be used to identify some relevant characteristic of the people. For example, the size could be correlated with the number of children for each person. In other contexts, size could be used to illustrate each person's age, height, wealth, or other characteristics that are numeric in nature.

The shape encoding shelf 554 can be used to specify different shapes for marks based on a data field. For example, if the Gender data field were used for shape encoding, men and women could be differentiated by the shapes of the marks.

Note that the shelves 542, 544, 552, and 554 identify encodings for the graphical marks. Some implementations enable more or fewer encoding shelves. Some implementations impose limits on which data fields 238 may be selected for each of the encoding types. For example, size encoding is typically limited to quantitative data fields (e.g., size encoding based on Birth Place would not make sense).

Because shape encoding becomes ineffective when there are too many shapes, some implementations limit shape encoding to data fields with less than a predefined maximum number of distinct values (e.g., setting the maximum number as 10 or 15).

In some implementations, each mark includes a text indicator, a graphic mark, or both. The visual encodings of the marks may include displayed text, text color, text size, mark shape, mark size, mark color, or other encodings.

Figure 7B:
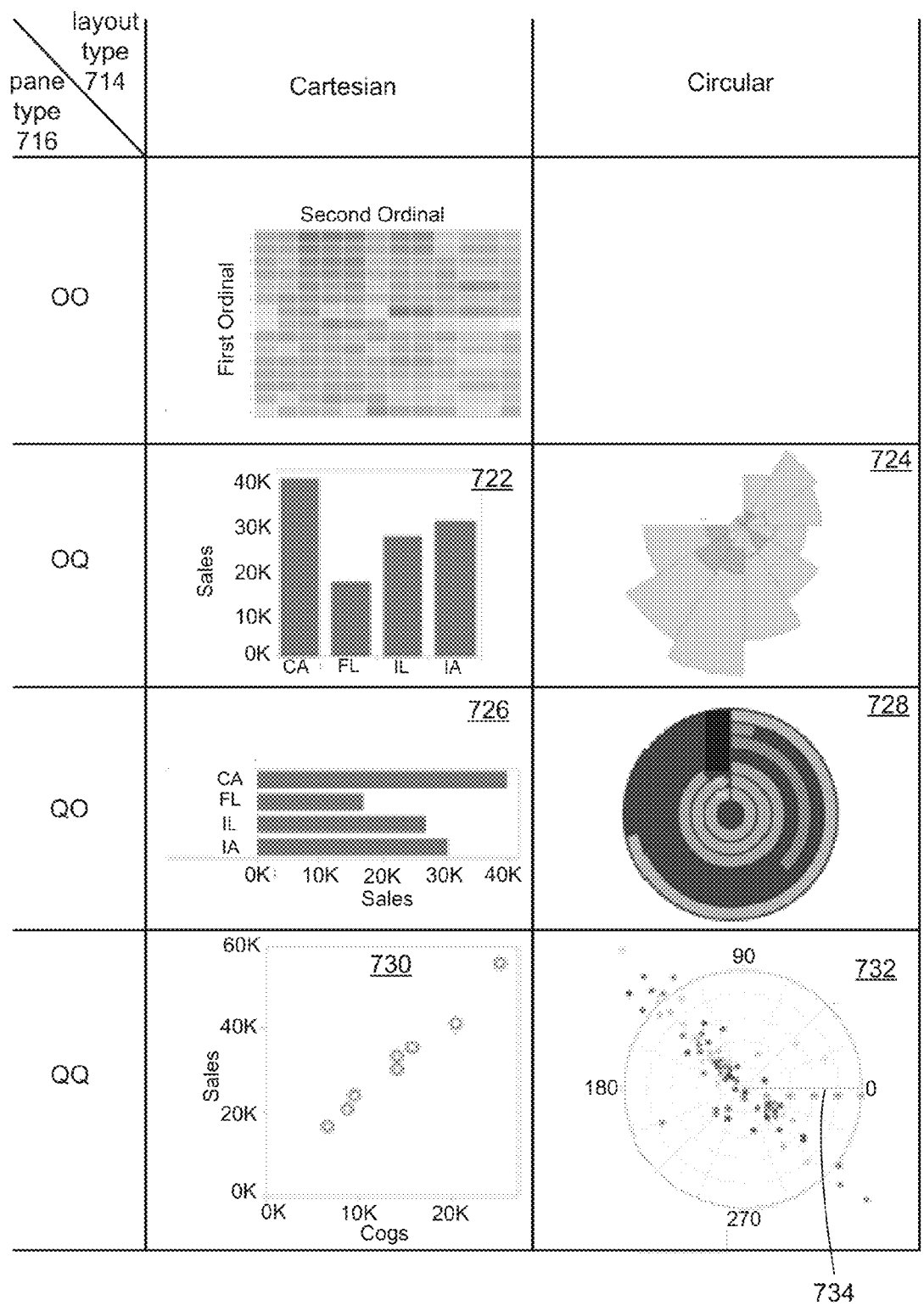

With layout types other than Cartesian, the encoding shelves typically operate in the same way. However, the rows and columns shelves 532 and 534 have different meanings Some examples with circular layouts are illustrated in FIG. 7B below. In some implementations, the labels "Rows" and "Columns" are changed dynamically based on the layout type and/or the view type in order to clarify how the shelves are used. In some implementations, when circular layouts are used, the rows shelf 532 and the columns shelf 534 define the radial axis and the angular axis of the corresponding polar diagrams, somewhat like using polar coordinates.

In addition to the graphical marks, implementations support connectors that connect graphical marks together. The connectors are sometimes referred to as "edges" or "edge marks." The connector shelf 536 is used to specify which graphical marks (corresponding to tuples) are graphically connected. Typically, a relationship 240 is used to specify the connectors, such as the relationship {ID=father_id} illustrated on the connector shelf 536 in FIG. 5A. This specifies that a connector will be drawn between pairs of marks when the child-father relationship 240 holds between the tuples. The connector lines 560 connect the corresponding visual marks. Although the connector lines 560 here are drawn as straight lines, some implementations use arcs or other curves as connectors. In some implementations, the shape of the connector lines 560 is configurable, either globally or for individual data visualizations.

A user 100 may also place a data field 238 on the connector shelf 536. When a data field 238 is placed on the connector shelf 536, it is treated as an equivalence relation 416, in which tuples with the same value for that data field are connected. In particular, the user can place a data field 238 on the connector shelf, and is not required to build an equivalence relationship (using the relationship builder module 232) first. For example, in a data source 236 representing purchase transactions, placing the "order ID" data field 238 on the connector shelf would connect together each pair of items from the same order.

Some implementations allow more that one data field 238 or relationship 240 to be placed on the connector shelf 536. When the connector shelf 236 contains two or more items, implementations must address the issue of whether to use AND or OR to combine the items. In some implementations, there is a default behavior, which is displayed, and the user can change that default behavior. In some implementations, the default behavior is to treat multiple items on the connector shelf 236 with OR, so that two marks are connected if any of the relationships apply. For example, if the user 100 dropped the additional relationship {ID=mother_id} on the connector shelf 536, the connector shelf may display {ID=father_id} OR {ID=mother_id}. In this case, there is a connector between each child and parent. When there are three or more items on the connector shelf 536, parentheses may be required to specify the desired combination of relationships (e.g., "(A OR B) AND C"). In some implementations, the relationship builder module 232 provides an interface that can construct new relationships from data fields 238 as well as construct new relationships 240 from existing relationships 240. In some implementations, when an expression with two or more items is used on the connector shelf, the user has the option of saving the combined relationship as a single new relationship. For example, the combined relationship {ID=father_id} OR {ID=mother_id} could be saved and named "Parent" for future use.

Like the graphical marks, connectors 560 have various encodings. In some implementations, there are encodings for line style, line size, line color, whether the lines have arrows or other shapes where they connect to the marks, line tapering (non-constant line width), ordering, and others. The user interface 500 illustrated in FIG. 5A includes encodings for size and color.

The encodings for connectors introduces some complexity not present in the encodings for the graphical marks. For example, if a certain data field 238 is used to encode size or color of connectors 560, which endpoint of the connector is used to define the data field value used? As a specific example, suppose a user selects the Gender data field 238 to encode the color of connectors. The connector 560 between Edith and Bob could be either color because one endpoint of the connector has the value "female" for the Gender field, whereas the other endpoint has the value "male" for the Gender field. Implementations address this ambiguity in various ways. In some instances, such as an equivalence relationship 416, the two endpoints are guaranteed to have one or more data fields with the same value. When the data field values are guaranteed to be the same, there is no encoding problem. For relationships that are directed, some implementations allow specifying which endpoint is used. For example, the relationship {ID=father_id} is directed, so a user may specify the head or tail of the relationship for size or color encoding (e.g., when placing a data field onto the connector size encoding shelf 546 or the connector color encoding shelf 556, the user 100 may be prompted to select head or tail). In some implementations, this is depicted on the size shelf 546 or color shelf 556 as "Gender (from)" for example. Some implementations include a connector shape encoding shelf that can be used to specify properties of a connector that show direction (e.g., shape of arrowhead).

Note that a tapering encoding for connectors 560 does not have the same ambiguity problem. If a quantitative data field 238 is selected for tapering, then the values of the quantitative field at both endpoints are used, and the connector between them tapers based on the difference between the two values. Some implementations restrict what encodings may be used to avoid ambiguity.

Figure 5B:
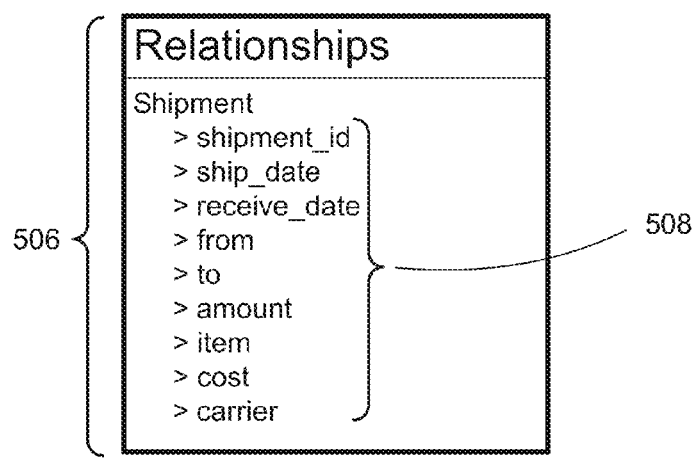
FIGS. 5B, 5C, and 5D illustrate ways that relationship-based properties may be used in accordance with some implementations.

In some instances, a relationship 240 itself has associated data. For example, the first order relationship 410 illustrated with respect to FIG. 4D has many different properties that are associated directly with each shipment (e.g., amount 492, item 494, and cost 496). In some implementations, the Relationships section 506 includes the relationship-based properties 508, as illustrated in FIG. 5B. When there are relationship-based properties 508, they may be used for the connector encodings within typical constraints (e.g., the "carrier" property would be appropriate for color encoding, but not appropriate for size encoding). Note that the relationship-based properties are generally not available for the encoding of marks. In general, such encoding would not make sense, and it would also be ambiguous because a single mark may be related to two or more other marks. For example, using the data in FIG. 4D, it would not make sense to encode marks for facilities based on properties of shipments to or from the facilities.

Figure 5C:
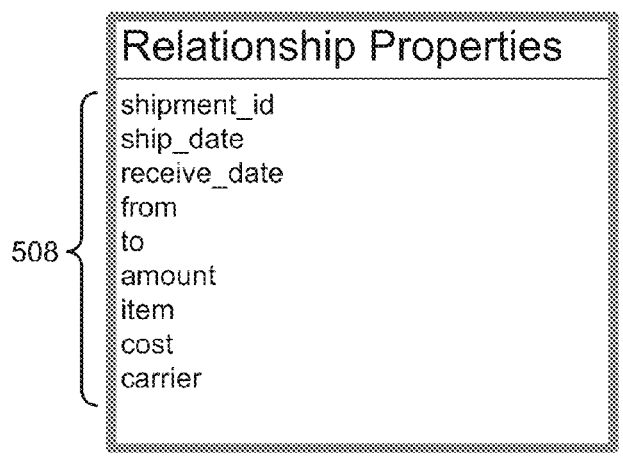

Instead of identifying the relationship-based properties 508 in the Relationships section 506 of the schema information region 510, some implementations allow a user to place a relationship on a connector encoding shelf (such as the size shelf 546 or the color shelf 556), and prompt the user to select a specific relationship-based property 508 at that time. Some implementations use a pop-up window such as the one illustrated in FIG. 5C.

As described below (e.g., FIGS. 10A-10H and 11A-11J), connectors 560 may be encoded based on aggregated data as well. Although not illustrated in FIG. 5A, a user may specify a level of detail for the graphical marks, in which case a single graphical mark may represent an aggregation of multiple records from the data source 236. Although aggregation may not be as useful for the family tree data illustrated in FIG. 5A, aggregation is frequently useful for business data. When the graphical marks are based on an aggregation of tuples, the connectors between those tuples may be aggregated as well. For example, in FIGS. 11A and 11B, the size of the graphical marks is based on the number of tuples aggregated. Similarly, the size (or color) of connectors can be computed based on aggregating data from the tuple-level relationship. For example, in FIG. 10E, the size of the connectors is based on the number of flights between each of the states.

Figure 5D:
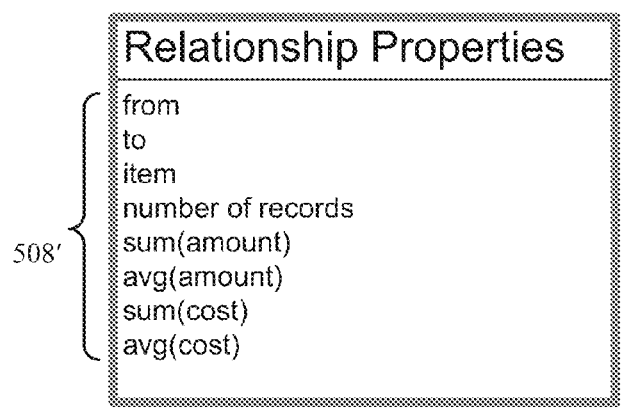

In addition to the count of the number of individual relationships between tuples, some data sources 236 are suitable for aggregation by summing or averaging. For example, in the shipping example of FIG. 4D, a relationship between facilities is defined based on shipments between those facilities. Associated with the shipments are the amount 492 and the cost 496. If the connector data is aggregated, the amount 492 or the cost 496 could be summed or averaged and used for a size or color encoding Consider the following example that uses the data from FIG. 4D. Assume that visual marks are displayed for each facility, and assume there is shipment data for a year (or is filtered to a specific year). If connectors are drawn for each shipment, there could be a very large number of connectors, including many connectors with the same source facility and destination facility. It may be better to group together the shipments with the same source facility, destination facility, and item 494, so the user 100 specifies the level of detail to include the "from" facility 488, the "to" facility 490, and the item 494. In some implementations, there is a connector level of detail shelf, and the relationship based properties can be dropped onto the shelf as described above with respect to the size and color encodings 546 and 556 (see FIGS. 5B and 5C). Having specified the level of detail, the connectors are aggregated, so the available set of properties for connector encoding changes. For example, implementations that use a popup window for the encodings may use a window as illustrated in FIG. 5D to display the available properties. Because the "from," "to," and "item" properties are used in the grouping, they are in the set of aggregated relationship properties 508'. They can be used for the other encodings. In addition to these three fields, the set of aggregated relationship properties 508' includes five aggregate properties: the number of records, the sum and average of the amount, and the sum and average of the cost.

Figure 6A:
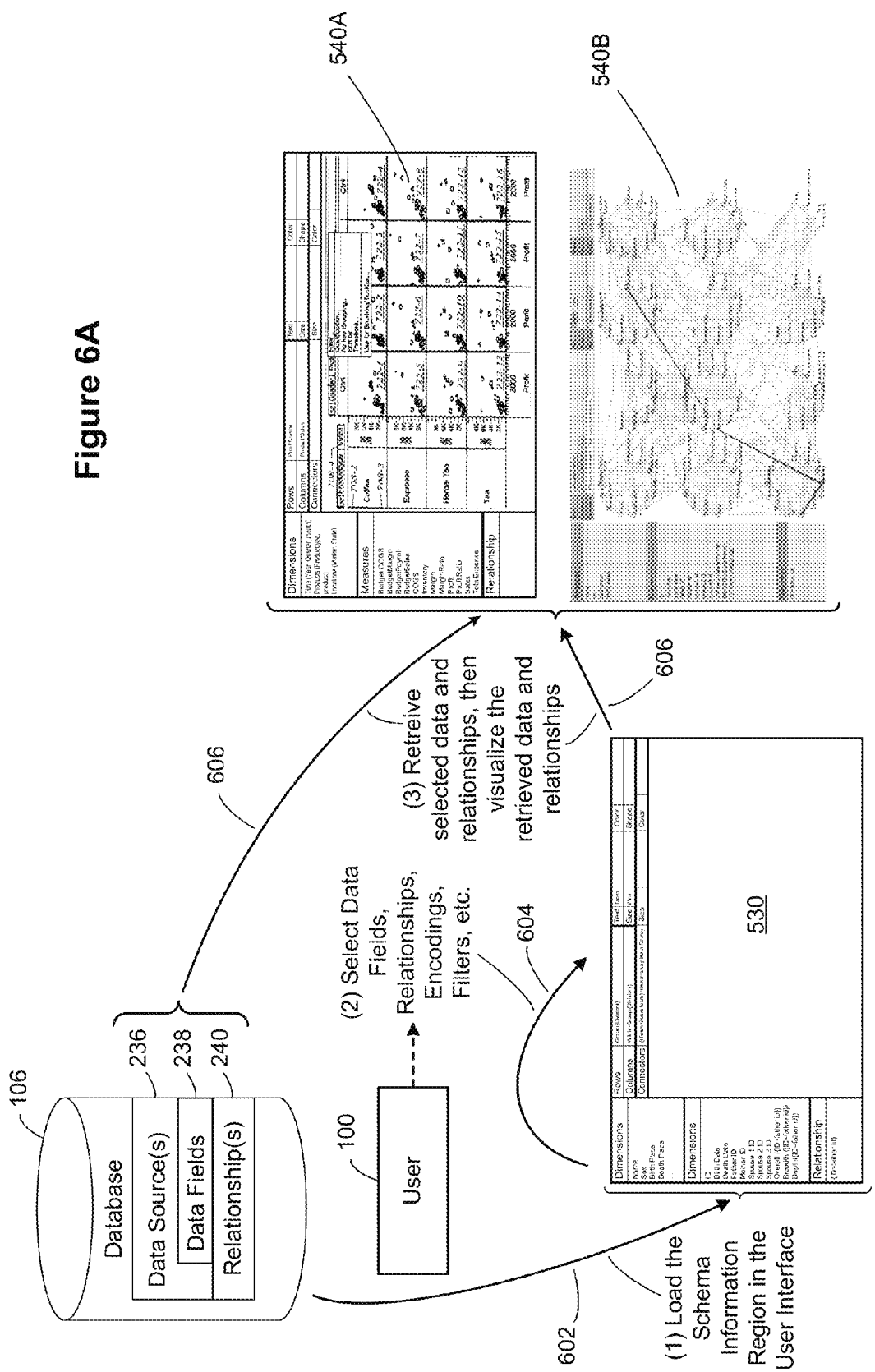
FIGS. 6A and 6B illustrate high level process flows for creating data visualizations in accordance with some implementations.

FIG. 6A illustrates an overall process flow for a data visualization application 222 or 322 in accordance with some implementations. The database 106 includes data fields 238 from data sources 236 and relationships 240 (identified by the relationship identification module 230 or constructed using the relationship builder module 232). In some implementations, the database 106 also stores other information, such as a history log 244 or user preferences 242. The database 106 may be accessed over a network 108 or stored locally on a computing device 102 of the user 100. After the user 100 selects the data source(s) 236, the corresponding data fields 238 and relations 240 are loaded (602) into the schema information region 510 of the user interface 500.

The user 100 uses the user interface 500 to select (604) a set of data fields 238 and to specify how those data fields are used. In addition, the user may select (604) one or more relationships 240 (e.g., as connectors). The data fields 238 and relationships 240 may specify the overall layout (e.g., the rows and columns of a Cartesian layout), may specify how visual marks or connectors are encoded (e.g., size and color), or may specify the level of detail for the desired data visualization (i.e., at what level the data is aggregated). This was described above with respect to FIGS. 5A-5D.

The user may also select or specify one or more filters, which are described in more detail below. Filters can apply to visual marks or connectors between marks, and may apply to individual records from a data source or to aggregated tuples.

As explained above in FIGS. 5A-5D, the data fields 238 are selected from the data sources 236. In some implementations, some of the data fields 238 are defined according to expressions that combine and/or perform operations on one or more data fields 238 or relationships 240.

After the user has specified (604) the parameters for the desired data visualization, the data visualization application 222 (or 322) generates a plurality of queries to retrieve corresponding data and relationships from the database 106. In some implementations, the queries include node queries that retrieve tuples including respective data fields 238. In some implementations, the queries include one or more link queries that retrieve relationship information related to the retrieved tuples. For example, a relationship 240 between tuples may be defined by having a first data field of a first tuple equal to a second data field of a second tuple. See, e.g., first order relationship 410 in FIG. 4B and corresponding examples in FIGS. 4C and 4D.

In response to the plurality of node and link queries, a set of data tuples are retrieved (606) from the data source(s) 236, and each data tuple includes an ordered set of data fields 238. For each node query, the retrieved tuples have the same structure, including number of data fields, order of the data fields, data types of the data fields, and data field names. In some instances, there is a single node query. In some implementations, the relationships among the retrieved data tuples are included in the retrieved tuple data (e.g., for relationships that compare two distinct data fields of two data tuples or for equivalence relationships). In some instances, the data visualization application 222 (or data retrieval module 226) retrieves (606) relationship data as well. In some implementations, generating the queries and retrieving the corresponding data is performed (606) by the data retrieval module 226.

As explained in more detail with respect to FIGS. 5A and 7E, the tuple data and relationship data may be intertwined from a calculation perspective. For example, relationships may be constructed from tuples (see, e.g., FIGS. 4B-4D), and data fields may be constructed from relationships (see, e.g., FIG. 7E). In many cases, a user 100 can use data fields and relationships in similar ways.

After the selected data is retrieved (606) and processed (e.g., aggregated or filtered), the data visualization generation module 228 generates (606) a data visualization that uses the retrieved data tuples and relationships to build the desired data visualization. The user interface module 224 then displays (606) the data visualization on a display device 208. In some instances, data tuples are visualized as two-dimensional or three-dimensional diagrams or charts without illustrating data relationships among the data tuples. In some instances, data tuples are visualized with edge marks (connectors) connecting the data marks representing the data tuples. In some implementations, the positions of the marks corresponding to the data tuples are adjusted based on relationships between the tuples (e.g., using mark positions to illustrate a relationship, rather than using a connector to illustrate the relationship).

As shown in FIG. 6A, the computing device 102 displays a graphical user interface 500 to support the above process of building data visualizations. This was described above with respect to FIG. 5A-5D. Included in the user interface is a graphic display region 530. FIG. 6A illustrates two alternative data visualizations 540A and 540B that may be displayed in the graphic display region 530. The data visualization 540A illustrates a data visualization with 16 individual panes (a 4×4 array), where each pane is a "small multiple" and there are no connectors. The data visualization 540B illustrates a network diagram of college football teams, with sub-groupings by conference. The connectors indicate games played between teams.

Figure 6B:
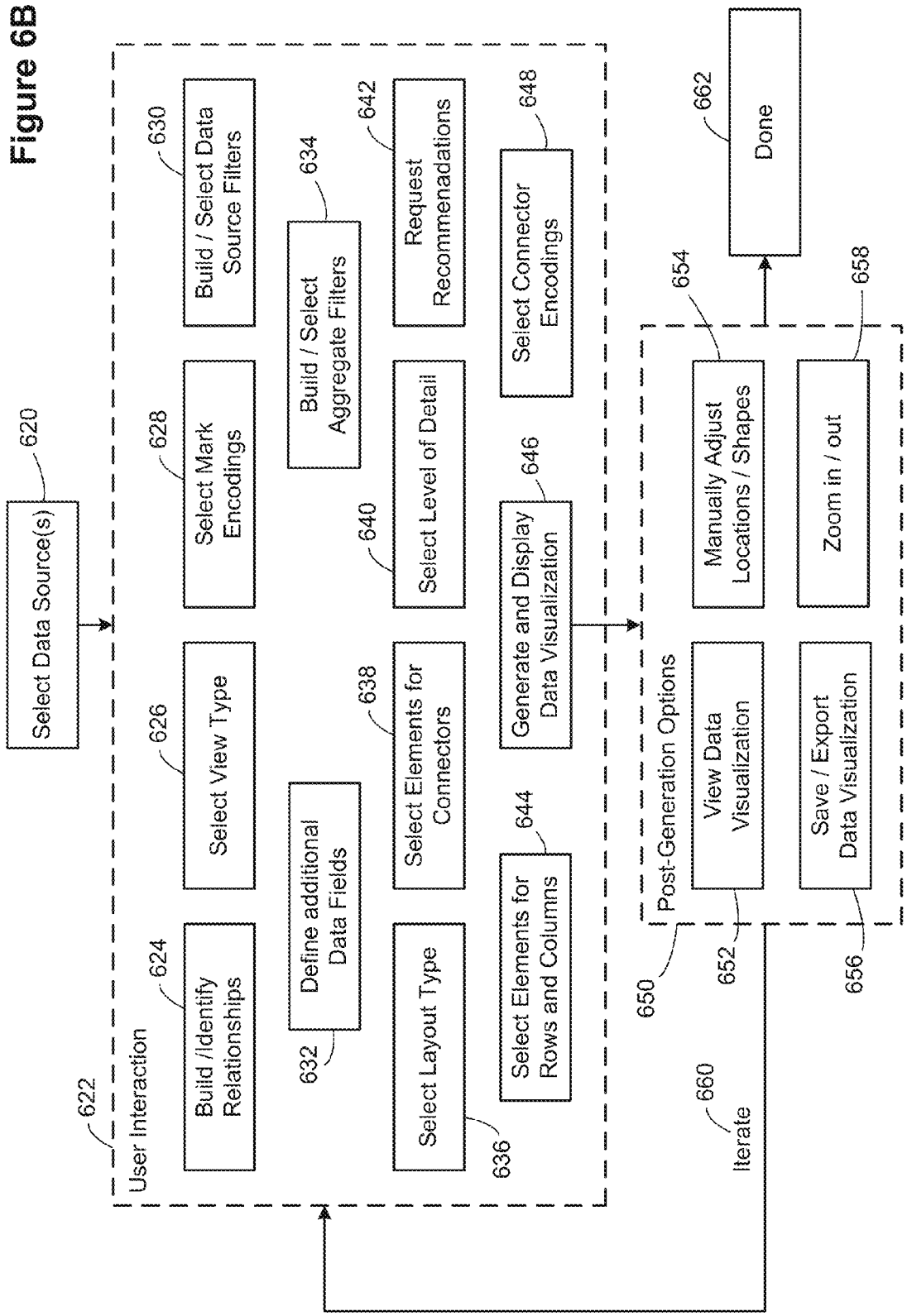

FIG. 6B illustrates other aspects of the process flow for building data visualizations. At a high level, a user selects (620) one or more data sources, then interacts (622) with a graphical user interface 500 to specify the properties of a desired data visualization. In some implementations, the user interactions build a visual specification 234, which is subsequently used to generate and display (646) the desired data visualization. Once a data visualization is displayed, there are certain post-generation options 650 that the user can select. In many cases, based on the generated data visualization, the user iterates 660 the process, going back to select or update one or more options that were previously selected. The ease of making changes and generating a new data visualization facilitates the exploratory process used by analysts to discover characteristics or patterns in their data.

Based on the data fields 238 and relationships 240 corresponding to the selected data source(s) 236, a user can build (624) additional relationships 240 using the relationship builder module 232. Some examples are provided above with respect to FIGS. 4B-4D. In some implementations, a user interface for the relationship builder module 232 is provided in a popup window, and activated by a button or menu item in the user interface 500. When a new relationship is constructed, it is typically stored for future use, which may be with the data source 236 or in a separate location.

In some implementations, data visualizations are classified according to how they present data to the user. In some implementations, the classifications are referred to as "view types" or "chart types." In some implementations, the view types are text tables, highlight tables, heat maps, bar charts, scatter plots, line charts, area charts, circle plots, treemaps, maps, pie charts, bubble charts, Gantt charts, box plots, and bullet graphs. Some implementations include more or fewer view types. In some implementations, some of the view types include two or more variations or sub-types, so after selection of a view type, the user is prompted to select an appropriate sub-type as well. A user can select (626) or change the view type at any time. In particular, FIG. 6B illustrates that the view type can be changed after other features are selected, or even after a data visualization has been generated and displayed. This allows a user to quickly view the same data in alternative ways, such as a bar chart or a line chart of the same data.

Some of the encodings for visual marks are illustrated in FIG. 5A, including text encoding 542, color encoding 552, size encoding 544, and shape encoding 554. At any time, the user can select (628) or change the mark encodings. For example, a user may initially select color encoding for the points in a scatter plot, then discover there are too many colors. If the encoding is based on a quantitative field, the user may change to using a size encoding.

In many cases, a user filters the data in order to focus on a certain aspect. For example, if a sales database includes data for the past 20 years, the user may filter the data so that only the data for the current year is displayed. This is an example of a filter that may be applied as the data is retrieved from the data source (e.g., retrieve only records for the year 2014). On the other hand, some filters are applied at an aggregate level. For example, a user may wish to review sales data for all products with sales volume greater than a certain amount (or just the opposite, those products with low sales volumes). This type of filter applies to aggregate data rather than to individual records from the data source 236.

In some implementations, distinct user interface tools or windows are used to build/select the two types of filters just described: a tool 630 for building or selecting a data source filter and a tool 634 for building or selecting an aggregate filter. In some implementations, an aggregate filter can only be selected if the user has specified aggregation of data (e.g., specifying a level of detail). In some implementations, both types of filters are provided using a single interface tool or window, with various configuration options to specify the type of filter.

Some filter expressions are as simple as comparing a data field 238 to a value (e.g., sales region="Central"), but other filter expressions use complex expressions that can include multiple data fields, relationships, and/or multiple operators (e.g., arithmetic operators or logical operators). Relationships can be used to filter the set of tuples that are displayed as visual marks. In some cases, a specific tuple is designated as a root, and the displayed tuples are filtered to include only those that are connected to the root tuple by a sequence of pairs of related tuples. For example, suppose tuple A is the root tuple, A is related to B, and B is related to C. Then tuples A, B, and C would all be included in the displayed data visualization. However, if there is no sequence of related pairs of tuples from tuple A to tuple D, then tuple D is excluded. This example illustrates that relationships can be used to filter the displayed tuples, even when the relationship itself is not displayed (the data visualization is not required to display any connectors).

Filtering can be applied that limits the displayed visual marks or that limits the displayed connectors (or both). The examples above have focused on the displayed visual marks, but filters may be built and applied to connectors as well. Like visual marks, connectors can be filtered from the source data or from aggregated data. For example, using the data from shipments illustrated in FIG. 4D, shipments can be filtered based on the item transported (e.g., only mocha), filtered by a date range for the shipments (e.g., only shipments in May of 2015), or filtered by carrier (e.g., only ABC Railway). Only the filtered shipments would be displayed as connectors in the data visualization. Using the same data from FIG. 4D, the transactions could be aggregated (e.g., using the "from" field 488, the "to" field 490, and the "item" field 494), and then filtered (e.g., based on the number of shipments, the total amount, or the total cost). In some implementations, the user interface tools for filtering connectors are different from the filtering tools used for the visual marks.

As illustrated in FIGS. 5A and 7E, a user can build (632) additional data fields 238 from existing data fields 238 or relationships. Typically the new data fields 238 are stored for later use, and may be stored with the original data source 236 or elsewhere. In some implementations, a constructed data field comprises a formula or definition, and that formula or definition is applied only as needed (e.g., when a data visualization is generated and displayed). In some implementations, when the data source is a relational database (e.g., SQL), the formula is translated into a stored procedure or view that is stored with the data source. In some implementations, the formula or definition is included in a visual specification 234. In some implementations, the data values for a constructed data field are computed when the formula is saved. For example, if the data source is a spreadsheet or CSV file, some implementations enable the user to save the computed values of the new field as an additional column in the spreadsheet or CSV file. In general, when a user builds (632) a new data field, the user can assign a name to the new field. In some implementations, the same portion of the user interface that enables a user to construct a new field enables a user to assign an alias to an existing field.

Some implementations support various layout types 714. For example, some implementations generate and display data visualizations that are "Cartesian," "Circular," "Packed," or "Network." The layout types 714 are described in more detail below with respect to FIGS. 7B and 7C. In some implementations, the layout type 714 may be selected (636) using a menu item, a toolbar icon, or a user interface control. The selected layout type 714 controls what type of data visualization the data visualization generation module 228 generates and displays. For example, as illustrated in FIG. 7B below in boxes 726 and 728, a user can switch from a Cartesian bar graph to a polar bar chart simply by changing the layout type to Circular. The user can just as easily switch back. In some implementations, when the layout type 714 is changed, some of the labels in the user interface 500 change to reflect the updated roles of the fields. For example, "rows" and "columns" may become "radius" and "angle" when switching from Cartesian to Circular.

As illustrated above with respect to FIG. 5A, a user can select (638) elements to be used as connectors. In particular, the user can place a data field 238 or a relationship 240 onto the connector shelf 536, which is then used to specify the connectors to display. Some implementations allow multiple items on the connector shelf 536.

As illustrated in FIG. 5A, a user can select (648) various encodings for the connectors 560 using connector encoding shelves 546 and 556. Some implementations include additional or different connector encoding shelves. The connector encodings specify various characteristics for the connectors, such as size, color, tapering, shape (e.g., straight lines or arcs), or associated text.

In some implementations, a user can specify how to aggregate the tuple data. In some implementations, aggregation is based on a user selection (640) of the level of detail. Some implementations include a level of detail shelf, and the user may place one or more data fields 238 on the level of detail shelf. In some implementations, a relationship 240 may be placed on the level of detail shelf. For example, a first order relationship 410 may be treated like the data field on the left side (source) of the relationship. An equivalence relationship 416 may be treated like the data field that forms the relationship. Although a user could just select a data field 238 instead of a relationship, allowing relationships 240 provides greater flexibility for users.

When data is retrieved for a data visualization, tuples that have matching values for all of the fields in the level of detail are grouped together. The behavior is similar to an SQL "group by" clause. In some instances (such as an SQL database), the grouping is performed at the data source 236. In other instances, the tuples are retrieved from the data source and aggregated at the computing device 102.

Using the level of detail shelf to specify grouping is common for transactional data. For example, if a sales database includes millions of individual transactions, grouping may provide more useful information to an analyst. For example, sales transactions may be aggregated (i.e., grouped) by customer. Some implementations allow grouping by computed data fields as well, such as a "quarter" data field computed based on a transaction date. For example, a user may place the two data fields "customer_id" (a field defined in the data source) and "quarter" (a field computed from the "sales_date" field in the data source) on the level of detail shelf in order to see data for each customer by quarter. In some instances, when there is grouping by a computed data field, the grouping is performed at the computing device 102.

Some implementations include a separate connector level of detail shelf. In some instances, the data source or the selected level of detail for the tuples imposes inherent limits on what may be selected for the connector level of detail. As illustrated with respect to the example in FIG. 4D, a user may select aggregation for the connectors when there is no aggregation of the tuples. Conversely, even when tuple data is aggregated, the connectors need not be aggregated. For example, suppose the data in FIG. 4D were expanded to include many more facilities, including some cities with multiple facilities. A user could specify "city" as the level of detail for the tuples, but not specify any grouping for the shipment transactions. Each distinct shipment transaction would appear as a separate connector. In this scenario, a shipment between facilities in a single city would appear as a loop at the visual mark for that city. A user may also filter out shipment transactions that are within a single city.

FIG. 5A also illustrates that a user may select (644) elements to specify the rows and columns for the visual marks. The user accomplishes this by placing data fields 238 or relationship 240 onto the rows shelf 532 or the columns shelf 534. In some instances, when multiple data fields 238 or relationships 240 are placed on the rows shelf 532 or columns shelf 534, the outer fields split the displayed data visualization into panes, such as the data visualization 540A in FIG. 6A.

In some implementations, a user can request (642) data visualization recommendations based on the current selections. The data visualization application 222 or 322 may recommend a layout type 714, a view type, potentially useful encodings, and so on. In some implementations, the recommendations are based on the data types of the selected data fields (e.g., are they ordinal or quantitative?). In some implementations, the recommendations are based on the data values of the selected data fields. In some implementations, the recommendations are based on relationships that have been defined or selected.

The recommendation module applies some general rules in order to provide good recommendations. For example, when a relationship is chosen, it should generally be placed on the connector shelf 536 rather than the rows or columns shelves. When a tree relationship is chosen, and there is a low cardinality, a hierarchy chart is an effective data visualization (see FIG. 8F). When there is a tree relationship with a large cardinality, a hyperbolic tree is an effective data visualization (see FIG. 8C). For tree relationships with intermediate cardinality, a force-directed graph is an effective data visualization (see FIG. 8D). When the relationship is a tree, and a quantitative field is being used, a treemap or hierarchy chart can be effective.

At any point, the user can generate (646) and display (646) a data visualization corresponding to the current user selections. As described above with respect to FIG. 6A, the selected data and relationships are retrieved from the data source, processed as needed (e.g., aggregation and post aggregation filtering), then displayed as a data visualization 540 (such as data visualizations 540A or 540B).

Once a data visualization has been displayed, there are various post-generation options 650 that a user may select. Of course the user can view (652) the data visualization, which is a primary objective of data visualizations. In some instances, the user will present the data visualization to others, and thus one of the post generation options 650 is to save or export (656) the displayed data visualization. In some implementations, the data visualization may be saved as a PNG file, a PDF file, a JPEG file, a BMP file, or other standard formats for visual data. In some implementations, a user may choose to save the underlying data with the saved data visualization. In addition, a user may also choose to save or export the visual specification 234 for the data visualization. In some implementations, the visual specification may be stored with the data visualization, or it may be stored separately. Because the data in the data source may change over time, the same visual specification may result in different data visualizations when run at different times. Some implementations, permit saving of a visual specification during the user interaction phase 622 (i.e., the corresponding data visualization need not be displayed or even generated yet).

In addition to saving or exporting a visual specification 234 (which specifies how the data will be generated and displayed) or saving a data visualization 540 (the output generated by the visual specification), some implementations allow exporting the data used by the data visualization. This may be particularly useful when the data is processed in various ways after retrieval from the data source. For example, there may be additional data fields that are derived or computed, the data may be aggregated or filtered, or the data may be sorted. When there is connector data, implementations typically export the data for the visual marks separately from the data for the connectors. In some implementations, the data can be exported to CSV files or spreadsheets. Some implementations allow exporting to other formats.

Some implementations allow a user to manually adjust (654) a data visualization after it is generated and displayed. For example, a user may adjust the location of visual marks (e.g., in a network layout). In some implementations, a user can adjust (654) the location or shapes of connectors in a data visualization (e.g., creating arcs rather than straight lines, or adjusting locations so that connectors or marks do not overlap). In some implementations, the adjustments are stored as part of the visual specification 234 so that the adjustments can be reapplied (if possible) if the user makes other selections. In some implementations, the adjustments are stored in a visual stylesheet, which is separate from the visual specification. In some implementations, the visual stylesheet stores any manual adjustments made after a data visualization has been generated. For example, a user may make adjustments to the location of connectors, then decide to change the color encoding of the connectors. When regenerated, the connectors are in the same adjusted locations, but use the newly selected color scheme. In some implementations, manual adjustments are stored with the generated data visualization in addition to or instead of the visual specification 234. For example, the manual adjustments result in modifications to a generated graphics file (e.g., TIFF, JPEG, or PNG file).

Further examples of post-generation interactions with a displayed data visualization are provided in additional figures below.

Figures 12A, 12B, 12C, 12D:
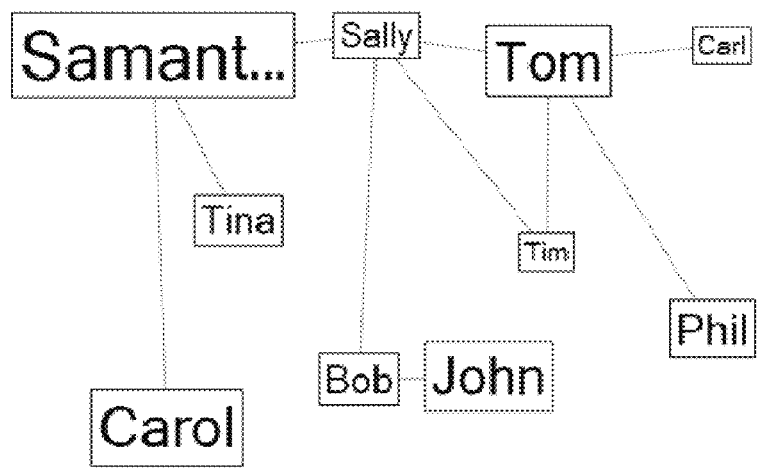
FIGS. 12A-12F provide a sequence of data visualizations corresponding to analysis of a social network in accordance with some implementations.
Figure 13B:
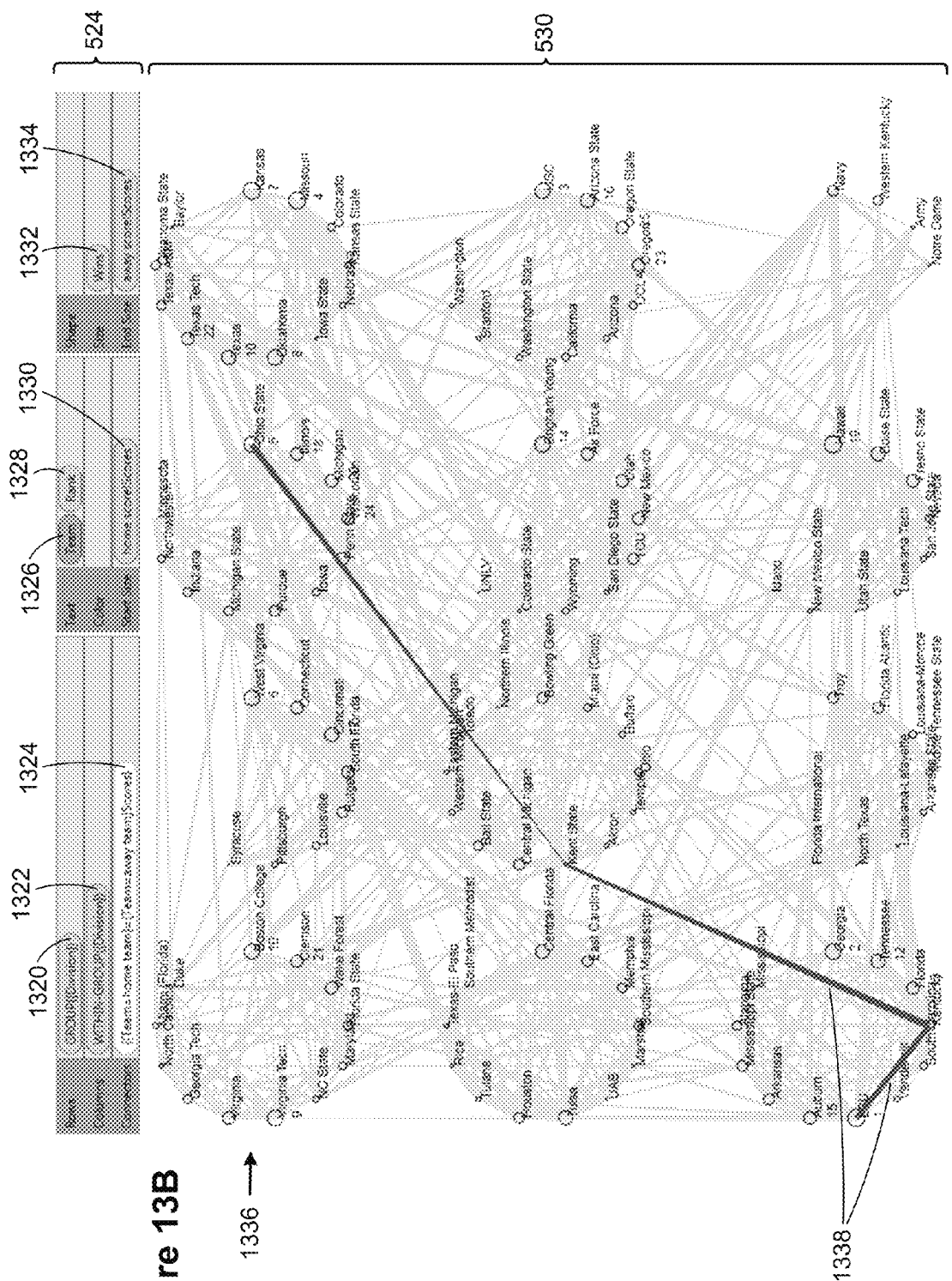
Figure 13C:
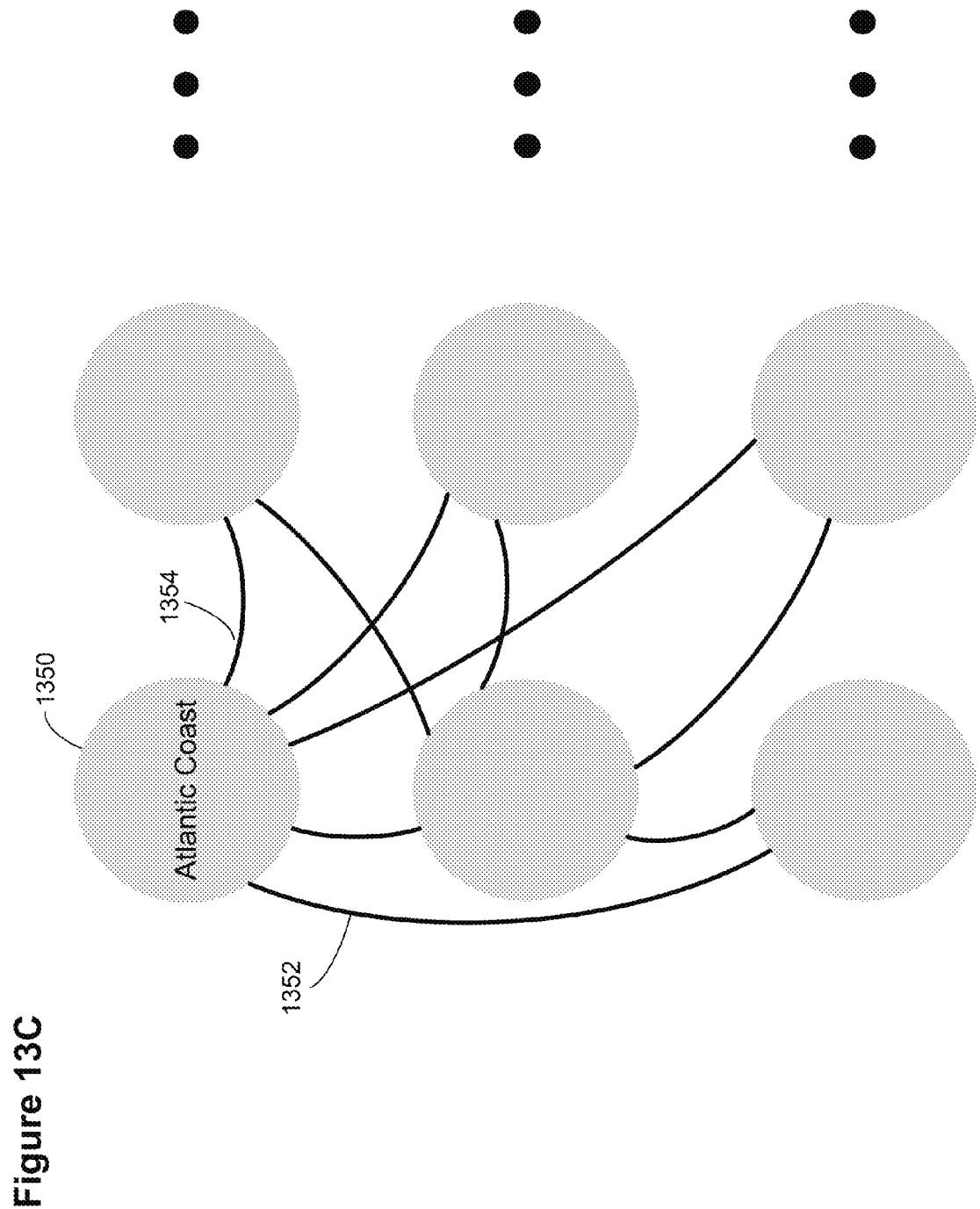
Figure 13D:
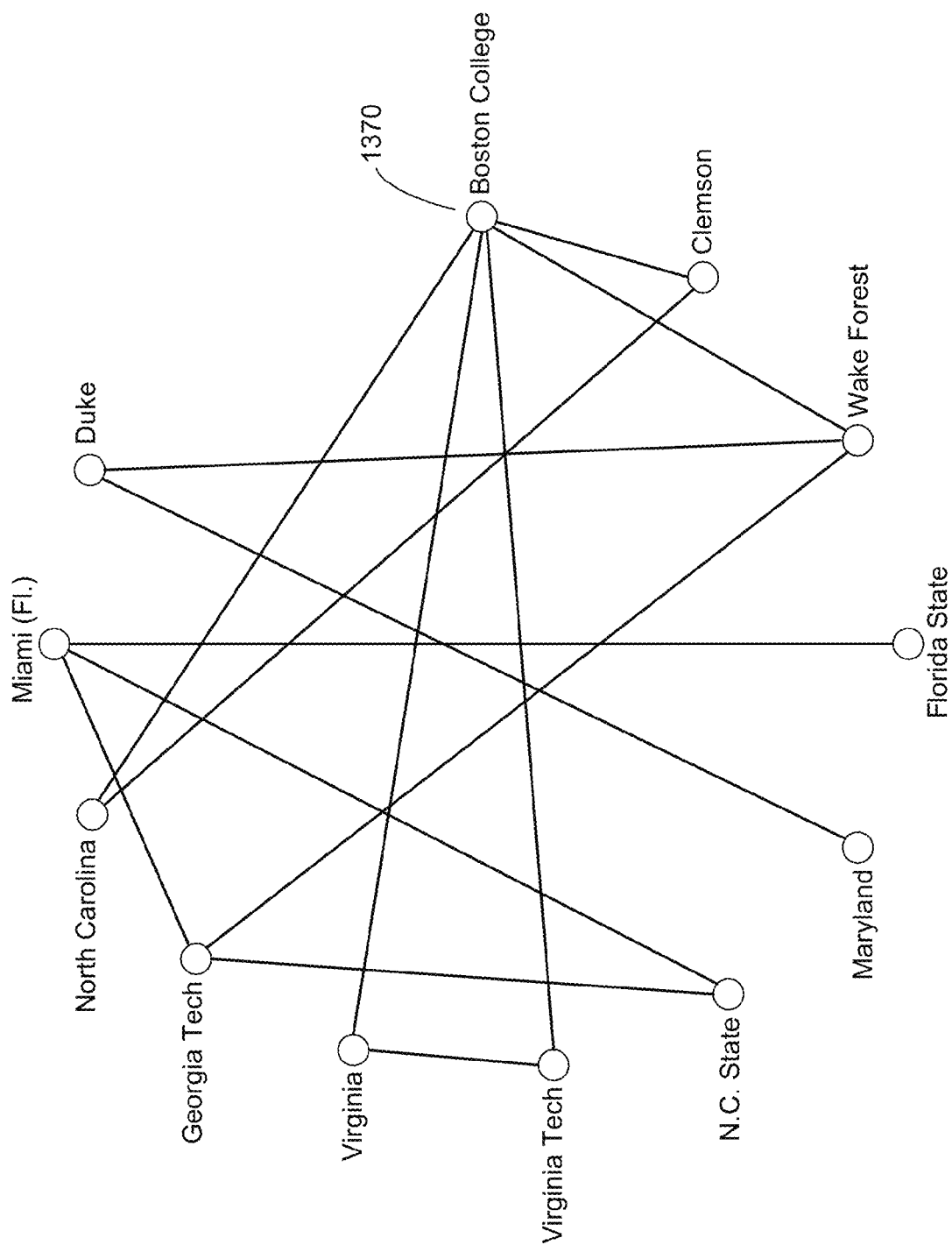

Some implementations provide various zoom in/zoom out features 658. In addition to zoom features that behave like ordinary magnification, some implementations adjust the details displayed based on the magnification. For example, FIGS. 13B-12D illustrate college football teams in the United States and games played between them. In FIG. 13B, all of the teams and connectors are displayed, making the display appear somewhat like spaghetti. However, FIGS. 13C and 13D illustrate magnification-based detail. The high level view in FIG. 13C illustrates each of the divisions, with games played between teams from different divisions. The magnified view in FIG. 13D shows only a single division and the games between teams in that division, without the clutter of games played against other teams.

In some instances, after viewing, saving, or adjusting a data visualization, the user is done 662, and closes the application 222 or 322. Commonly, however, based on the data visualization, the user identifies one or more aspects of the data visualization to change. In this case, the user iterates (660) the process, interacting (622) with the user interface 500 as described above. The iterative process may be repeated any number of times. In some implementations, the most recently generated data visualization 540 remains displayed in the graphic display region 530 of the user interface 500 until the user generates a new data visualization.

In some instances, the data source(s) are changed or modified. If the user starts from scratch with a new data source 236, implementations typically remove the previous selections (e.g., when the data source is removed, the data fields on the rows shelf 532 or the columns shelf 534 are no longer meaningful. so they are cleared). In some implementations (not depicted in FIG. 6B), a user may add another data source that is blended with an existing data source without losing the user's selected options (e.g., retaining the information in the visual specification).

FIG. 7A illustrates how ordinal and quantitative data fields are displayed differently in data visualizations 540. The classification of data fields 238 as "ordinal" or "quantitative" can be useful to determine how data is displayed. In general, a "quantitative" data field has data values that vary over a continuous range of numeric values. On the other hand, an "ordinal" data field has discrete values.

The profit data field illustrated in FIG. 7A is quantitative, and spans a continuous range 702. In this particular example, the profit may fall anywhere between 0 and 22 million. In some instances the profit could be negative, so the range 702 would have to account for the negative values as well. The range 702 is shown horizontally in FIG. 7A, which corresponds to placing the profit data field 238 on the columns shelf 534 in the user interface 500 (the columns shelf 534 specifies the x-position of the graphical marks).

FIG. 7A also illustrates two ordinal data fields "quarter" and "region." For the quarters, assume the data has been filtered to a single year. The ordinal field "quarter" partitions the axis into four discrete portions. The quarter data field is commonly computed based on an underlying data field with date or date/time values, but some data sources 236 store data for quarters directly (e.g., in a spreadsheet where a user has already performed some calculations). If the quarter data field is placed on the columns shelf 534 in the user interface 500, the quarters are spread out horizontally, such as quarters 704. All of the data for an individual quarter (such as Qtr4 706) is grouped together. If the quarter data field is placed on the rows shelf 532, the quarters are spread out vertically, such as quarters 708. The fourth quarter Qtr4 710 is displayed as the lowest row.

In another example, if a "region" data field is placed on the columns shelf 534, the axis 712 is displayed horizontally, with each distinct region forming a column. For example, region "Southeast US" 714 and region "Europe" 716 each create a column for data in the data visualization.

For ordinal data fields 238, some implementations enable a user to specify the order of the created rows or columns. For example, a user 100 may be able to rearrange the five regions in the region axis 712.

The axes displayed in FIG. 7A are horizontal or vertical as used in a Cartesian layout. However, the same structure for ordinal and quantitative fields applies to other layouts as well, such as circular layouts as depicted in FIG. 7B. Sometimes circular layouts are referred to as "radial" or "polar."

The table in FIG. 7B illustrates sample data visualizations that may be generated and displayed based on the classifications of the data fields specified for the columns shelf 534 and the rows shelf 532 (which together specify the pane type 716) as well as the layout type 714. There are four distinct pane types (OO, OQ, QO, and QQ), which specify the data type used for the x-position and y-position of the marks (as specified on the Columns shelf 534 and Rows shelf 532). Note that the pane type 716 is based on the classification of the innermost data fields in the columns shelf 534 and rows shelf 532. In some implementations, when two or more data fields are specified for the rows or columns, the outermost data fields subdivide the data visualization region 530 into a plurality of panes, as illustrated by the data visualization 540A in FIG. 6A.

As described in more detail below, additional types of data visualizations are possible based on these layout types 714 and pane types 716. Also, some implementations support additional layout types 714, including packed and network, some of which are illustrated below with respect to FIG. 7C.

The box 720 illustrates a heatmap data visualization that may be generated and displayed in a Cartesian layout when both axes use ordinal data fields (an OO pane type). The heatmap data visualization in box 720 is a grid, and each element of the grid is colored based on the color encoding of some data field (e.g., by placing some data field 238 on the color encoding shelf 552 in the user interface 500). Note that other types of data visualizations are also appropriate for a Cartesian layout with ordinal values used for both the rows and columns. For example, a text table would be a common option. In a text table, rather than a colored rectangle in each grid position, there would be text, which could represent the data for another field (e.g., revenue).

The box 722 illustrates a data visualization that may be generated and displayed in a Cartesian layout when the x-position (Columns) uses an ordinal field and the y-position (Rows) uses a quantitative field (an OQ pane type). One such data visualization is a bar chart with vertical bars. Each bar corresponds to a distinct ordinal value and the height of each bar corresponds to the value of the quantitative field.

The box 724 illustrates a data visualization with a radial bar chart, which is an appropriate data visualization for an OQ pane type and a circular layout. Each ordinal value corresponds to a sector of the bar chart. Generally, each radial bar has the same central angle (e.g., 30 degrees) as illustrated in this example. In some implementations, the central angle is determined based on the number of distinct ordinal values. The sector radius for each bar is determined by the quantitative field. In the illustrated example, the radial bars are stacked. A user can easily switch from a Cartesian layout to a Circular layout using the graphical user interface 500. In some implementations, switching layout type 714 uses a menu item or toolbar icon. In some implementations, there is a user interface control to select the layout type (not shown in FIG. 5A).

The box 726 is similar to the box 722, but the ordinal and quantitative fields have been reversed. In this case, a bar chart is still an appropriate option, but the bars are horizontal. Each bar corresponds to a distinct ordinal value, and the length of each bar corresponds to the selected quantitative field. In some instances, the displayed lengths of the bars are scaled to use the full display space.

The box 728 illustrates a data visualization that may be generated and displayed in a circular layout with an ordinal field specified for the "Columns" 534 and a quantitative field specified for the "Rows" 532. In some implementations, when a radial layout is selected, the labels "rows" and "columns" in the user interface 500 are replaced with alternative labels, such as "Radius" and "Angle." Here, the ordinal field corresponds to the radial distance, so bars are created at intervals away from the center. The quantitative field corresponds to the angle, so larger values are displayed as longer bars wrapping around the circle. In some implementations (as illustrated by the data visualization in the box 728), the bars always start from a vertical line going upward from the center and proceed clockwise around the circle. In other implementations, the starting location of the bars is different (e.g., from a horizontal line) or have an opposite direction (e.g., counterclockwise). In some implementations, the starting location of the bars or the direction of the bars is configurable by the user.

The box 730 illustrates a scatter plot data visualization that may be generated and displayed in a Cartesian layout with quantitative data fields 238 selected for both the rows 532 and the columns 534. Each pair of quantitative values specifies the location of a corresponding mark in the scatter plot. Encodings, such as text 542, color 552, size 544, or shape 554 may be used to specify how the marks are displayed. In a Cartesian layout, the roles of the two quantitative fields in a QQ pane type 716 are symmetric. Switching the roles of the two quantitative fields mirrors the plot across a 45 degree angle line.

The box 732 illustrates a polar plot data visualization, which is appropriate for a QQ pane type with a Circular layout type 714. For a Circular layout, the "Rows" selection 532 and "Columns" selection 534 correspond to radius and angle, and in some implementations, the labels on the display are updated when a Circular layout type is selected. In some implementations, the values of the quantitative fields are used as polar coordinates to specify the location for each mark. Using polar coordinates, an angle of zero corresponds to the positive horizontal axis 734, and positive values correspond to angles measured counterclockwise from the axis 734. Generally, a polar plot is appropriate only when one of the quantitative variables to be displayed represents measured angles.

In addition to the Cartesian and Circular layout types 714 illustrated in FIG. 7B, some implementations support Packed and Network layout types 714, as illustrated in FIG. 7C.

The box 740 illustrates three types of data visualizations that may be generated and displayed for OO panes with a packed layout type. Data visualization 740A is a packed bubble chart in which each mark is a circle or bubble. In general, the bubbles are packed together closely. In some implementations, the size, color, shape, or text of each bubble is encoded according to user selection in the user interface 500. In some implementations, related bubbles are grouped together, as illustrated in data visualization 740A. For example, a group of tuples may share the same first element and differ only in the second element. The bubbles for these tuples may be grouped together as a bunch or grouped together as a string.

The data visualization 740B is sometimes referred to as a tag cloud, a word cloud, or a text cloud, and packs together words from some source. For examples, the words may be taken from a document, article, or speech. In many cases the words are encoded using size or color, indicating the frequency of each word in the source. In some cases, the position or orientation (e.g., horizontal or vertical) of words is based on an underlying quantitative or ordinal field.

The data visualization 740C is a treemap that displays hierarchical data. In some implementations, the nested structure shown in a treemap overrides the standard grid structure of panes when a user selects multiple data fields 238 for the rows 532 or columns 534. In a treemap, the individual rectangles do not generally align as a two-dimensional array.

The box 742 illustrates a data visualization with a Network layout type 714 and OO panes. Node-link diagrams, such as the one illustrated in box 742, typically include edges in addition to the node marks, as described throughout this disclosure.

Boxes 744 and 748 indicate that the data visualizations in box 740 can be adapted in certain ways when one of the data fields is quantitative rather than ordinal. In particular, a quantitative data field may introduce additional "forces" that affect the placement of nodes. For example, if the data field selected for columns 534 (the x-position) is quantitative, those quantitative values may be interpreted as forces pushing nodes horizontally to the right. Nodes with larger quantitative values are pushed further to the right.

The box 752 illustrates a data visualization with a packed layout when quantitative fields are used for both the rows and columns. In this example, the quantitative variables are the longitude and latitude of states in the United States, with sizes of marks encoded according to population and color of marks encoding obesity rates. Each of the circles is in approximately the right location geographically, but there are some adjustments in order to accommodate the sizes of the circles and remain packed. This type of data visualization is sometimes referred to as a Dorling cartogram.

As indicated in boxes 746, 750, and 754, networked layouts that have at least one quantitative field for rows 532 or columns 534 generate network diagrams that are force-directed or constraint based, and include additional forces based on the underlying coordinate system. In some implementations, the labels "rows" and "columns" in the user interface 500 are modified for network layouts to indicate how the data fields are used.

Figure 7D:
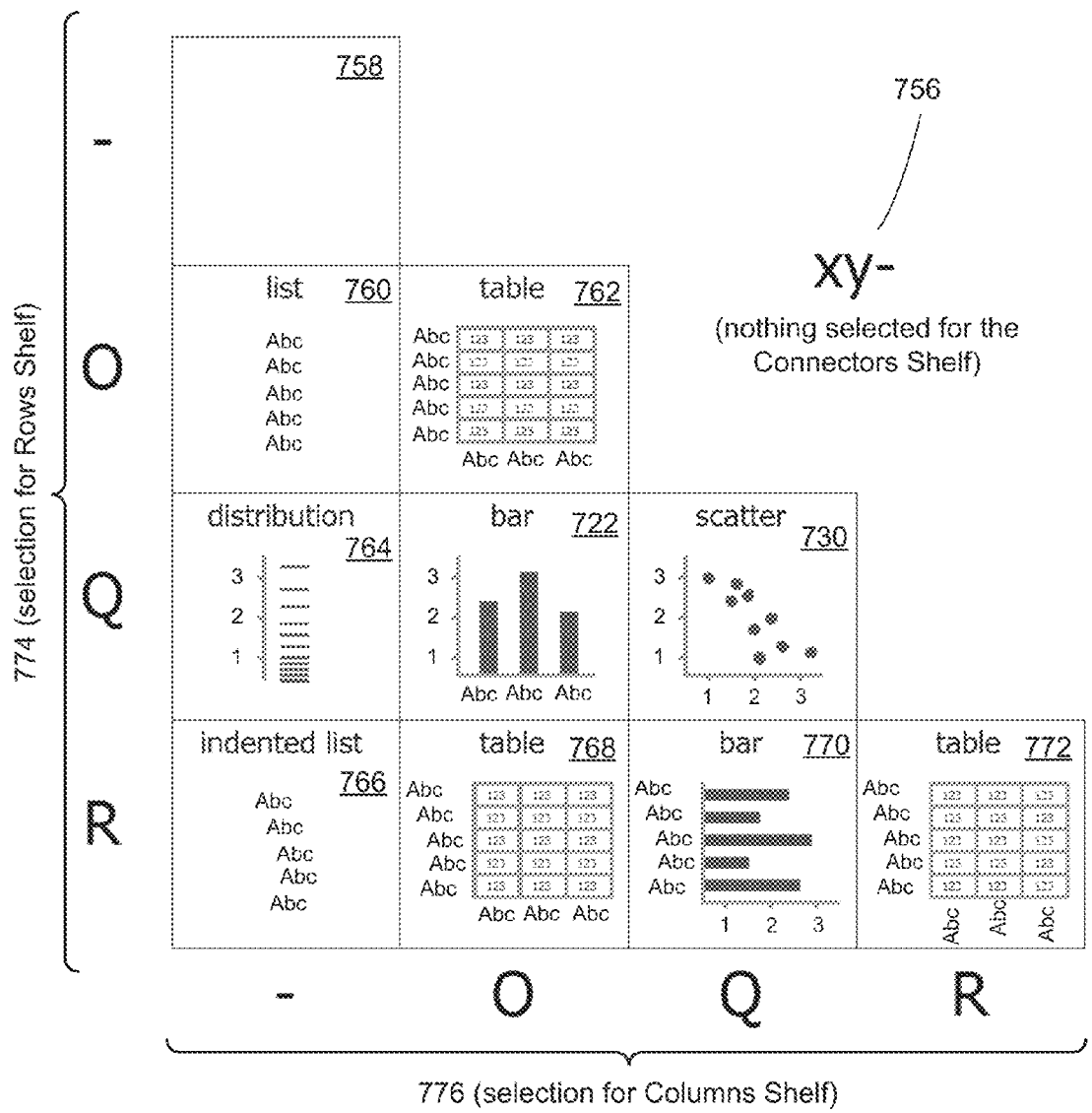
FIG. 7D illustrates some of the data visualizations that may be constructed according to the user selections for rows and columns.
Figure 8A:
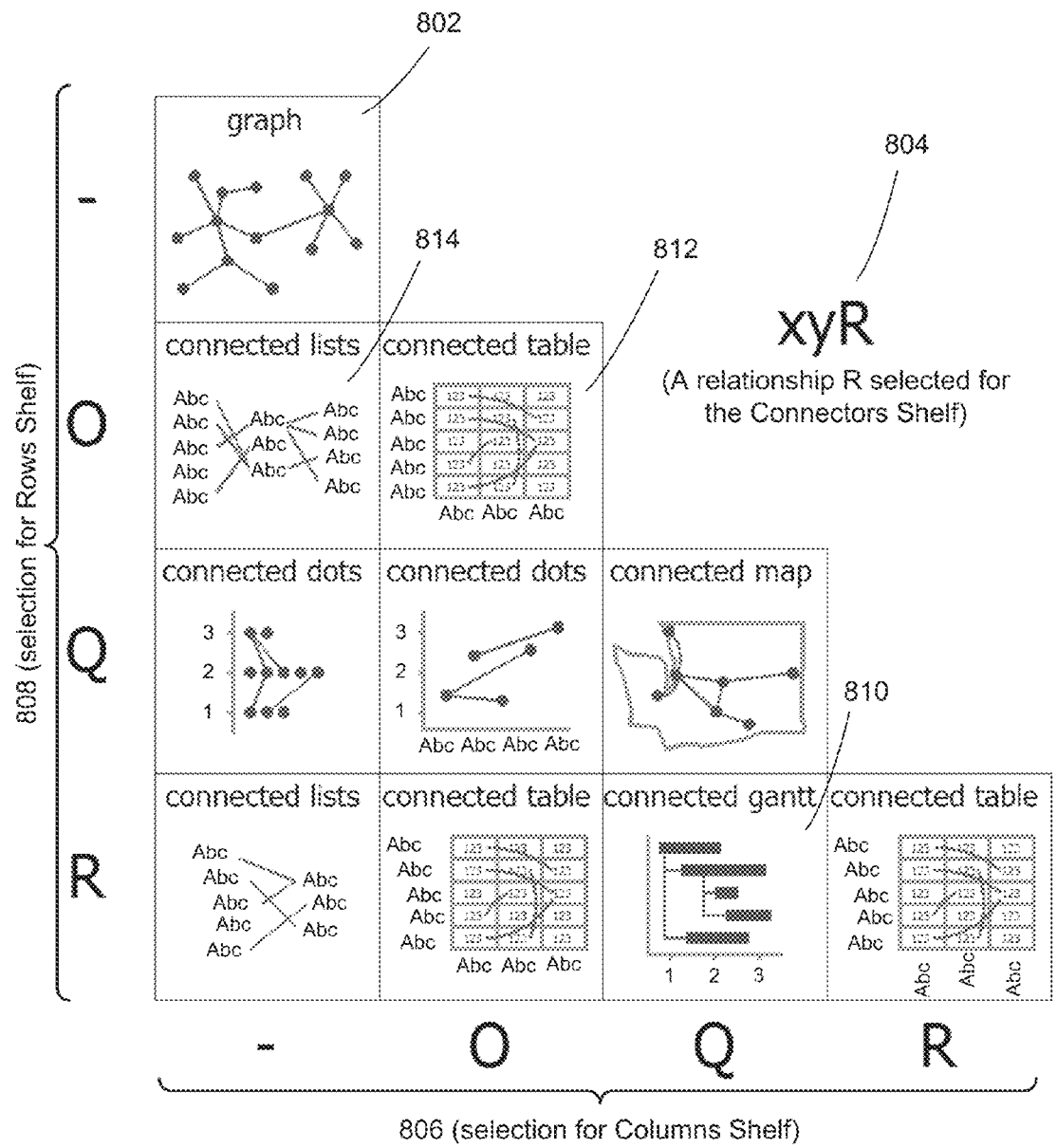
FIG. 8A provides a chart of data visualizations that include both data and relationships among the data in accordance with some implementations.

FIGS. 7B and 7C illustrate various ways to visualize data using different layout types. FIG. 7D focuses on Cartesian layouts, but expands the set of options for pane type 716. In addition to selecting pairs of fields that are ordinal (0) or quantitative (Q), data visualizations can be created when no data field is selected for one of the shelves (depicted as a "–" in FIG. 7D). In addition, FIG. 7D illustrates the case where a relationship 240 (R) is placed onto the rows shelf 532 or the columns shelf 534. The example data visualizations in FIG. 7D have nothing selected for the connector shelf 536, and thus the chart is labeled xy-(756). Adding connectors is illustrated in FIG. 8A. The lower labels 776 indicate what type of data field is selected on the columns shelf 534, which identifies the x-position of the visual marks. The side labels 774 indicate what type of data field is selected on the rows shelf 532, which specifies the y-position of the visual marks.

The box 758 illustrates the case where no data fields 238 have been selected for either the rows or columns. Having selected nothing, there is no data visualization.

The box 760 represents pane type —O, with nothing selected for columns (no x-position), and an ordinal field for rows, specifying the y-position. In this case, the retrieved tuples may be displayed as a list (e.g., with text encoding). In some implementations, the elements of the list may be sorted using another encoding (e.g., alphabetically or numerically based on the displayed data).

The box 764 is similar to box 760, but uses a quantitative field 238 for the y-position. In some cases, this creates a data visualization that is a distribution of the quantitative values (e.g., a line or dot for each value next to a vertical scale). In some implementations, the quantitative values may be grouped together (either by having exactly the same value or split into intervals), with a visual mark indicating the number of instances for each value. Some implementations allow a user to specify this using a level of detail shelf.

The box 766 presents a data visualization that may be displayed where there is no specification of x-position, and a relationship 240 is used to specify the y-position (i.e., a "-R" pane). In some implementations, when the relationship 240 is a first-order relationship 410 (or second order 412 or higher 414), using the relationship 240 in the rows shelf 532 or columns shelf 534 is almost equivalent to selecting the data field used as the source of the relationship 240. For example, using the relationship {ID=father_id} 240 (described above with respect to FIGS. 4B and 4C) is essentially the same as using the ordinal field ID. But using a relationship 240 has some benefits. First, the user can specify orderings that would be difficult using the corresponding ordinal field. The second is that a relationship can imply more than a simple 1-dimensional ordering, allowing a list of values to be indented based on relationship information, making for richer labels. This is illustrated by the data visualization in box 766, where the indentation is based on the depth of the relationship. For example, continuing with the {ID=father_id} example, the oldest generation could be positioned the furthest to the left, with younger generations further and further to the right.

For an OO pane as in the box 762, one appropriate data visualization is a text table as illustrated. Another option is a heatmap grid, as illustrated above in box 720 of FIG. 7B. Boxes 722 and 730 were described above in FIG. 7B, but are included here for completeness.

As noted above for box 766, a relationship 240 can sometimes be treated as an ordinal field with some added benefits. Because of that, the data visualizations in boxes 768 and 770 look much like the data visualizations illustrated above in boxes 720 and 726 in FIG. 7B. However, on the vertical axis (corresponding to the relationship selection for rows), the labels are indented according to the relationship. In this way, a single data visualization is able to convey even more information.

The box 772 illustrates a data visualization that may be generated and displayed when relationships are used for both the x-position and the y-position. Using underlying ordinal fields 238 corresponding to each of the relationships 240, the main data visualization may be a text table as illustrated or a heatmap grid as illustrated in box 720 in FIG. 7B (or other data visualization types). Here, because relationships are used for both the rows and the columns, the axis labels on both axes are indented according to the relationships.

The data visualization examples in FIG. 7D where a relationship is used illustrate the case where the relationship is a first order relationship 410 (or second order 412 or higher 414). As illustrated in FIG. 4B, there are additional relationship types, such as an equivalence relationship $R_E$ 416. For an equivalence relationship 416, when the relationship is used on the rows shelf 532 or the columns shelf 534, it behaves essentially like the data field 238 that is used as the basis of the equivalence relationship, which may be ordinal or quantitative. An additional advantage of using an equivalence relationship 416 for rows or columns is that an automated tool for identifying good data visualizations has more information, and thus may be able to make better recommendations. Because an equivalence relationship has no implied ordering, using an equivalence relationship for rows or columns would not have the indentation illustrated above in boxes 766, 768, 770, and 772.

More generally, a relationship 240 can be used to define a new ordinal field 238 when the relationship creates a sort order of the underlying data. For example, if a relationship creates a tree ($R_T$ 426), then a depth-first traversal or breadth-first traversal of the tree creates an ordering. If the tree consists of multiple portions that are not connected to each other, then the traversal has to traverse each of the connected portions, and the order of traversing the groups may be arbitrary. The new ordinal field defined by the sort is effectively the values "1," "2," . . . , where each of these ordinal values corresponds to a unique tuple. Generally, when the relationship includes loops (e.g., A relates to B, B relates to C, and C relates to A), the traversal avoids processing a tuple A second or subsequent times. Defining a new ordinal field 238 in this way using a relationship 240 may be done independently of any specific data visualization, and stored in the database 106. In this way, the defined data field 238 appears in the schema information region 510 in the user interface 500. Alternatively, the new ordinal field 238 may be defined as part of placing the relationship 240 onto the rows shelf 532 or the columns shelf 534 (e.g., using a popup window so that a user can specify how the relationship 240 will be used).

A relationship can be used to build quantitative fields as well. FIG. 7E illustrates multiple ways of defining a quantitative field 238 based on an equivalence relationship 416 or a tree relationship 426, but the same techniques may be applied to other types of relationships as well.

An equivalence relationship 416 partitions the tuples into distinct groups, which are sometimes referred to as equivalence classes. A traversal of all the tuples traverses one group at a time, and traverses each group before going on to the next group. In general, this involves multiple arbitrary choices, including the order to traverse the groups and the order to traverse the tuples within each group. In some cases, the traversal may be directed by the data within the tuples. For example, in the family tree data 438 (FIG. 4C), an equivalence relationship may be defined by people having the same father. Within a group of siblings, a logical traversal order is based on birth date 454. Following this same example, each group has a unique father, so the traversing of the groups could be based on the birth date of the father for each group (e.g., if the father of group A was born before the father of group B, then group A is traversed before group B). When the data includes fathers with the same birth date, some arbitrary decisions about traversal order would still have to be made. Regardless of how the traversal is performed, it provides an ordering of the tuples, which can be used to define several quantitative fields.

For each tuple, the value of the quantitative field $Q(R_E, overall)$ 780 is the overall position of the tuple in the traversal just described. Note that these values are unique. As described below, a quantitative field $Q(R_E, overall)$ 780 can be used to define the placement of tuples within a data visualization.

For each tuple, the value of the quantitative field $Q(R_E, group)$ 782 specifies the traversal order for the group of which the tuple is a member. As noted above, the traversal processes each group in its entirety before moving on to the next group, so there is a unique order to the processing of the groups. If tuple A is a member of the group that was the 39th group, then the value of $Q(R_E, group)$ for this tuple is 39.

For each tuple, the value of the quantitative field $Q(R_E, local)$ 784 is the traversal order of the tuple within its group. For example, if a group includes three tuples, the values of $Q(R_E, local)$ for the tuples in the group are 1, 2, and 3. For a singleton group, the value of $Q(R_E, local)$ for the one tuple is 1. In some implementations, this quantitative field is identified as $Q(R_E, within-group)$ For a tree relationship $R_T$ 426, FIG. 7E illustrates six different quantitative fields that may be defined once a specific traversal of the tree is selected. Note that a tree is not required to be fully connected here. Furthermore, the same methodology can be applied to any graph (e.g., containing cycles). In that case, a traversal of the tuples just avoids traversing a tuple more than once. Some edges may not be used in the traversal. When a graph (or tree) consists of two or more groups of nodes that are disconnected from the other groups, the groups are traversed one at a time, possibly in an arbitrary order if there is no natural ordering of the groups based on the data in the tuples. In addition, the same methodology can be applied whether the graph is directed or undirected. When the graph is directed, the traversal follows the directions of the edges, but in the undirected case, the traversal of edges can go either way. Commonly, within each connected group, the traversal is depth first or breadth first.

For each tuple, the value of the quantitative field $Q(R_T, overall)$ 786 is the overall position of the tuple in the traversal. Similar to the quantitative field $Q(R_E, overall)$ 780, the overall positions are unique, and the values can be used to determine placement or other characteristics of visual marks.

For each tuple, the value of the quantitative field $Q(R_T, depth)$ 788 is the depth of the tuple in the traversal. For a fully connected tree, the depth is just the distance from the root (i.e., the starting tuple). The depth of the root itself is 0. In a tree with multiple distinct groups that are disconnected from each other, there is a local root for each group, and the depth of each tuple is the distance from its local root. In this case, each local root has a depth of 0. In some implementations, when there are multiple groups, each local root is assigned a depth of 1, imagining a (non-existent) top level root of depth 0 that connects to each of the local roots. Note that in the more general case of a graph, the selected traversal can affect the depth of a tuple, because there may be multiple alternative paths from a local root to a tuple, and the alternative paths may have different numbers of edges.

For each tuple, the value of the quantitative field Q(R_T, local) 790 is the index of the tuple within its group of siblings. For a tree, the concept of siblings is well known (i.e., all of the tuples that have the same parent tuple). The traversal imposes a specific order. Note that the siblings are not necessarily traversed consecutively (e.g., a depth first search traverses the descendents of a tuple before proceeding with the siblings of the tuple), but the traversal does impose an order. If there is a set of siblings with four members, then the values of the quantitative field Q(R_T, local) for these siblings are 1, 2, 3, and 4 according to the order in which they are traversed. In some implementations, the local index values start at 0 (e.g., 0, 1, 2, and 3 in the previous example). In some implementations, quantitative field $Q(R_T, local)$ 790 is written as Q(R_T, within-group) or WITHIN-GROUP(R_T).

For a graph that is not a tree, a tuple may have multiple parents. However, a traversal effectively builds a tree. After the traversal is complete, the sibling concept is well-defined. Therefore, the quantitative field Q(R_T, local) can be extended to work with relationships that are not trees.

For each tuple, the value of the quantitative field Q(R_T, child_count) 792 is the number of direct children of the tuple. The same field 792 is meaningful for graphs generally after a traversal has been selected.

For each tuple, the value of the quantitative field Q(R_T, desc_count) 794 is the number of descendents of the tuple, which includes children, grandchildren, and so on. The same field 794 is meaningful for graphs generally after a traversal has been selected.

For each tuple, the value of the quantitative field Q(R_T, desc_depth) 796 is the maximum depth of any descendent of the tuple. The same field 796 is meaningful for graphs generally after a traversal has been selected.

One of skill in the art recognizes that additional quantitative fields may be defined based on one or more relationships. For example, the quantitative field Q(R_E, group) 782 can be extended to apply to any relationship that creates a graph.

The data fields 238 corresponding to columns in the data source 236, as well as data fields 238 that are derived from data fields or relationships (e.g., the derived quantitative fields illustrated in FIG. 7E) are presented in the schema information region 510 of the user interface 500. When selected, data for the data fields 238 is retrieved or computed, and used as specified to display visual marks. Each data field 238 or relationship 240 may be used to define other data fields or relationships.

As described above, various schema elements from the schema information region 510 in the user interface 500 may be placed in various other locations or shelves to use the elements or build new ones. In some implementations, the following actions occur based on dragging a specific schema element to another location in the user interface 500:

dragging a relationship 240 from the relationships section 506 to the connector shelf 536 adds a new relationship to the visual specification 234, which will result in displaying connectors based on the relationship;

dragging a relationship 240 from the relationships section 506 to the rows shelf 532 or the columns shelf 534 adds a new relationship to the visual specification 234, which will result in the relationship specifying the y-position or x-position of the marks;

dragging a relationship 240 from the relationships section 506 to the measures section 504 builds a quantitative distance measure on the relationship, such as those identified in FIG. 7E. In some implementations, the user is prompted to select a specific distance measure to build;

dragging a measure or dimension (from the dimensions section 502 or measures section 504) to the relationships section 506 creates a new equivalence relationship based on the measure or dimension;

dragging a measure or dimension to the connector shelf 536 creates a new equivalence relationship based on the measure or dimension, and adds the new relationship to the visual specification 234, which will be used for displaying connectors.

FIG. 8A provides some examples of data visualizations that visualize both data and relationships among the data. This set of examples is similar to the examples in FIG. 7D, but these include a relationship R to specify connectors (e.g., using the connector shelf 536). Because a relationship R is selected for the connector shelf 536, the chart is labeled xyR (804). The lower labels 806 indicate what type of data field is selected on the columns shelf 534, which identifies the x-position of the visual marks. The side labels 808 indicate what type of data field is selected on the rows shelf 532, which specifies the y-position of the visual marks.

When a user specifies connectors, connector marks are added to the generated data visualization. The connector marks are typically referred to herein as "connectors" or "edge marks." Each of the connectors couples together visual marks to show the relationship. In some cases, the connectors have a corresponding direction, which may be depicted using arrows on the connectors.

As illustrated in box 802, sometimes a user does not select data fields to specify the x and y coordinates of visual marks. Instead, the locations of the visual marks corresponding to the tuples may be selected based on the connectors (e.g., to avoid overlap). Commonly, the data visualization application 222 spreads out the visual marks in order to make the data visualization as readable as possible. In some implementations, after a data visualization is generated and displayed, the user can manually adjust the locations of the tuples to create a more aesthetic or customized visualization. In some cases, a graphic as depicted in box 802 is referred to as a node-link diagram.

In other instances, one or both of the axes is associated with a specific data field (or a relationship), as illustrated in each of the boxes of FIG. 8A other than box 802. In each case, a portion of the data visualization displays the tuple data, and in that respect, the graphics are generally similar to those illustrated in FIG. 7D. In addition to the tuple data, each data visualization includes edge marks between some of the tuple pairs. In some implementations, the edge marks are displayed as straight lines, as illustrated in box 814, where list elements are connected. In some implementations, edge marks may be curved, such as the edge marks in box 812. In some implementations, the type of edge marks depends on the type of selected characteristics (e.g., layout type 714, pane type 716, or view type).

In some cases, the addition of a relationship for connectors changes the type of data visualization that is displayed, as illustrated in box 810. As shown in box 770 in FIG. 7D, an appropriate data visualization without connectors is a horizontal bar chart. But when a relationship is added, an appropriate data visualization may be a Gantt chart. A Gantt chart may use horizontal bars, but the connectors show relationships between the bars (e.g., precedence).

FIG. 8B illustrates a map graphic 816 that uses geographic coordinates to superimpose visual marks and connectors on top of a North American map. The three character data type acronym QQR 818 indicates that the user has selected a quantitative field Q to specify the x position (using the columns shelf 534), a quantitative field Q to specify the y-position (using the rows shelf 532), and a relationship R for the connector shelf 536. The tuples represent cities, and the connectors represent airline flights between the cities. In this case, the placement of the visual marks is determined by the longitude 820 and latitude 822 of each visual mark, which the user has selected for the columns shelf and the rows shelf. In this example, the relationship has no effect on the location of the visual marks, because the placement of the visual marks is determined by the user selected fields for rows and columns. Also, because the locations of the marks are determined by geographical coordinates here, a user typically cannot adjust (654) the locations of the visual marks after a data visualization has been generated (e.g., a user cannot choose to move Phoenix to another location).

In some implementations, a map layout such as the one illustrated in FIG. 8B is selected by choosing a map view type. In general, when a user specifies a map view type, the user must also specify a map to be used (e.g., the name of a PNG or JPEG file that will be used as the background map). From the connectors 560 in the map 816, it is easy to recognize airline hubs, such as Chicago 821 and Phoenix 826. Although depicted in black and white here, a user could use color encoding to identify the different airlines.

Figure 8C:
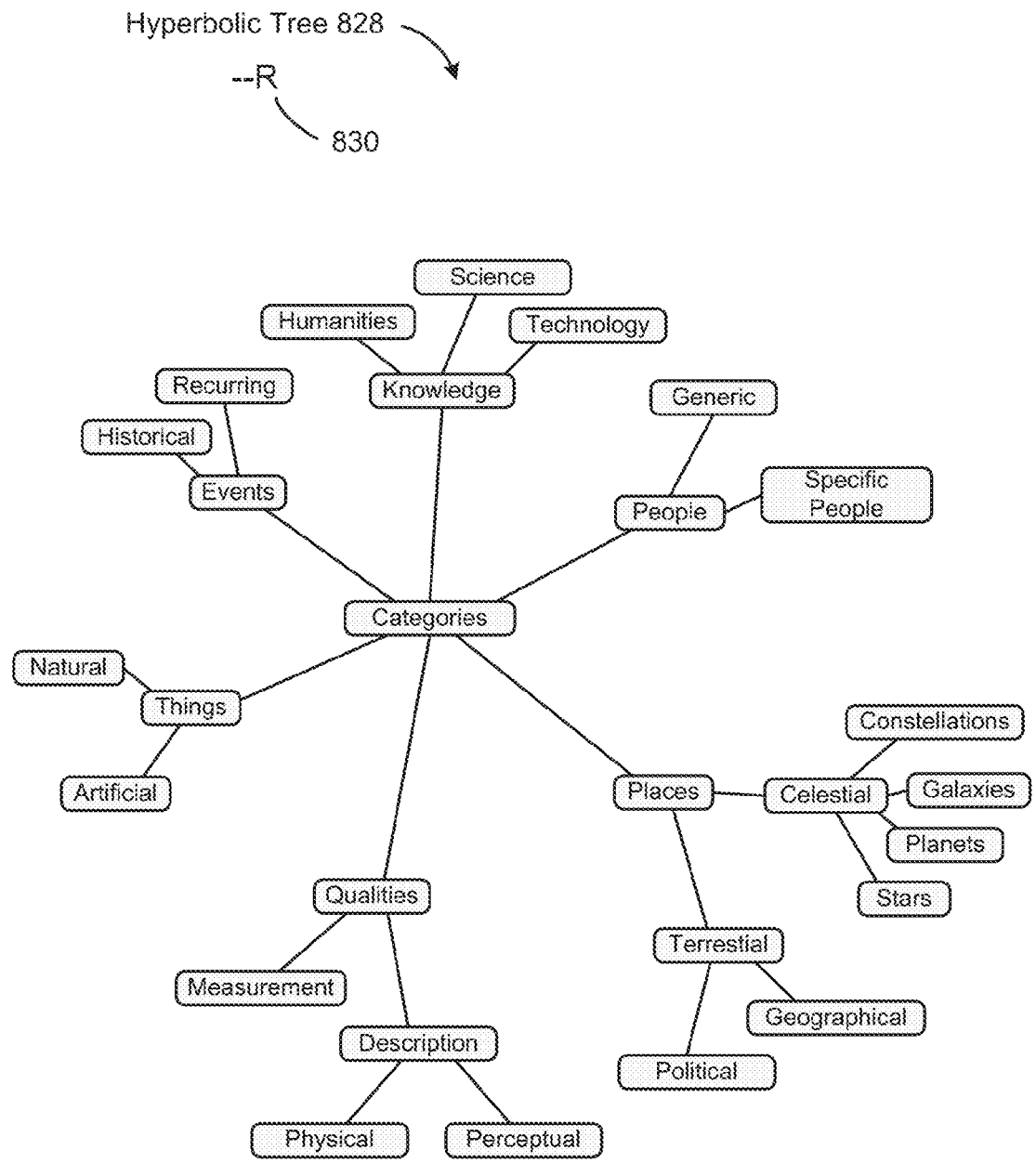

In FIG. 8C, the user has not specified either the x or y coordinates of the visual marks, so it can be described by the data type acronym --R 830. Since no data fields are specified for determining the position of the marks, the data visualization generation module 228 is free to place the marks in a way that displays the relationships effectively. In addition to the automated process of selecting the location, some implementations further allow the user to drag (654) marks to new locations (e.g., for aesthetics or to provide an alternative view that may display important aspects of the data).

In some implementations, the hyperbolic tree 828 is selected based on the combination of the data type acronym --R 830 in conjunction with a network layout type 714, and a designated view type.

The data used for FIG. 8C is hierarchical, and displayed as a hyperbolic tree 828. Classifying a relationship can help determine the best type of visualization. For example, some implementations use the classifications identified in FIG. 4B (directed or undirected, a tree versus an arbitrary graph, and so on). Some implementations use the cardinality of the relationship (i.e., is the relationship 1 to 1, 1 to many, or many to many). The hyperbolic tree 828 in FIG. 8C uses the fact that progressing outward from the center is 1 to many. In some instances, a user can assist in the layout by choosing a root node for a tree (or root nodes where the tree is not connected). If a sort order has been defined (e.g., by a traversal), the root notes are implicitly defined. In fact, a sort order for the tuples (e.g., based on a relationship) can be taken into account in other ways as well, such as how the nodes are arranged in a hierarchy.

Figure 8D:
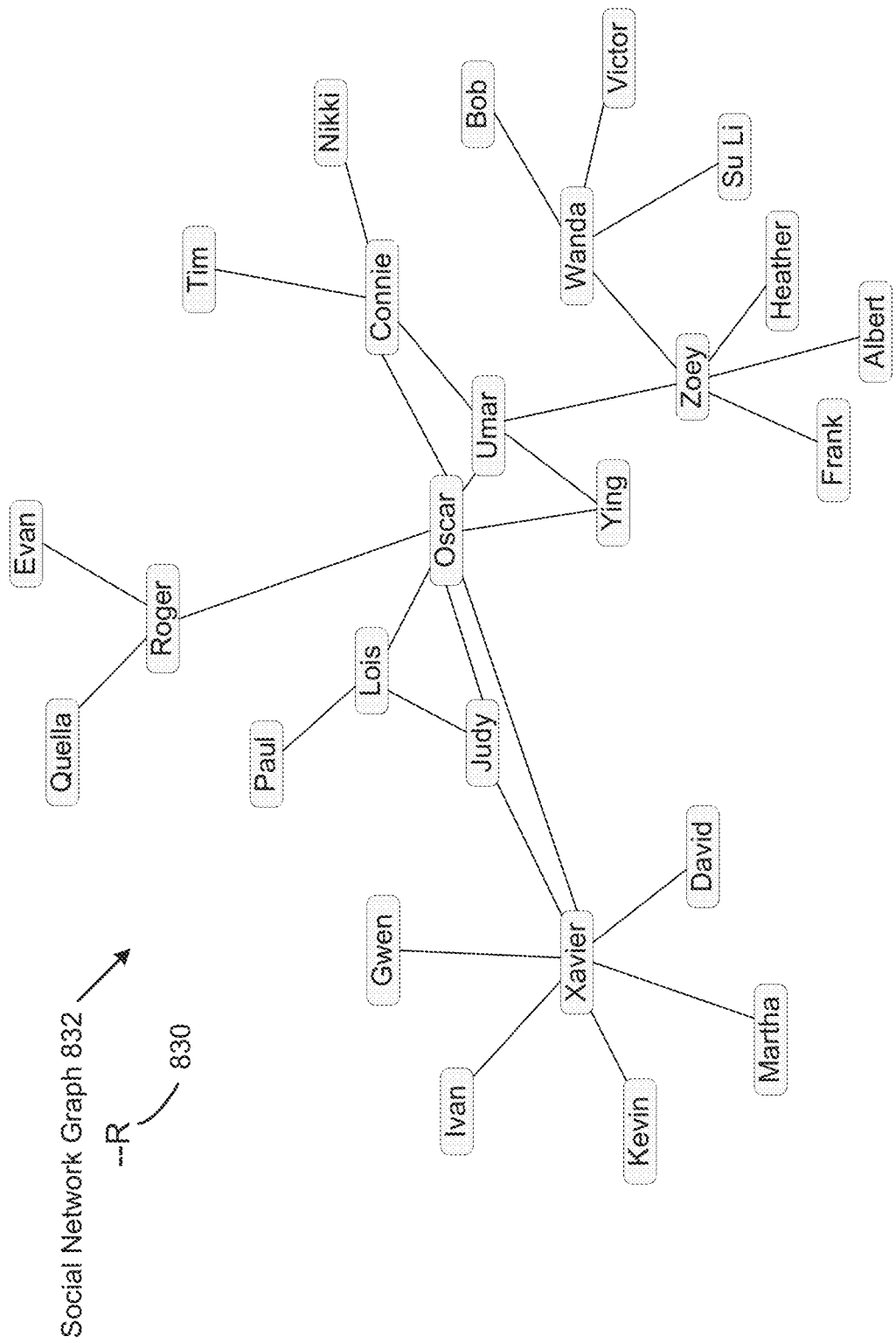

FIG. 8D displays another data visualization that has a --R data type acronym 830. In this case, the data visualization is a social network graph 832, which is displayed using a force directed graph layout. Unlike the data in FIG. 8C, the data here is not a tree (it is an arbitrary graph), so the force directed graph layout is appropriate.

Figure 8E:
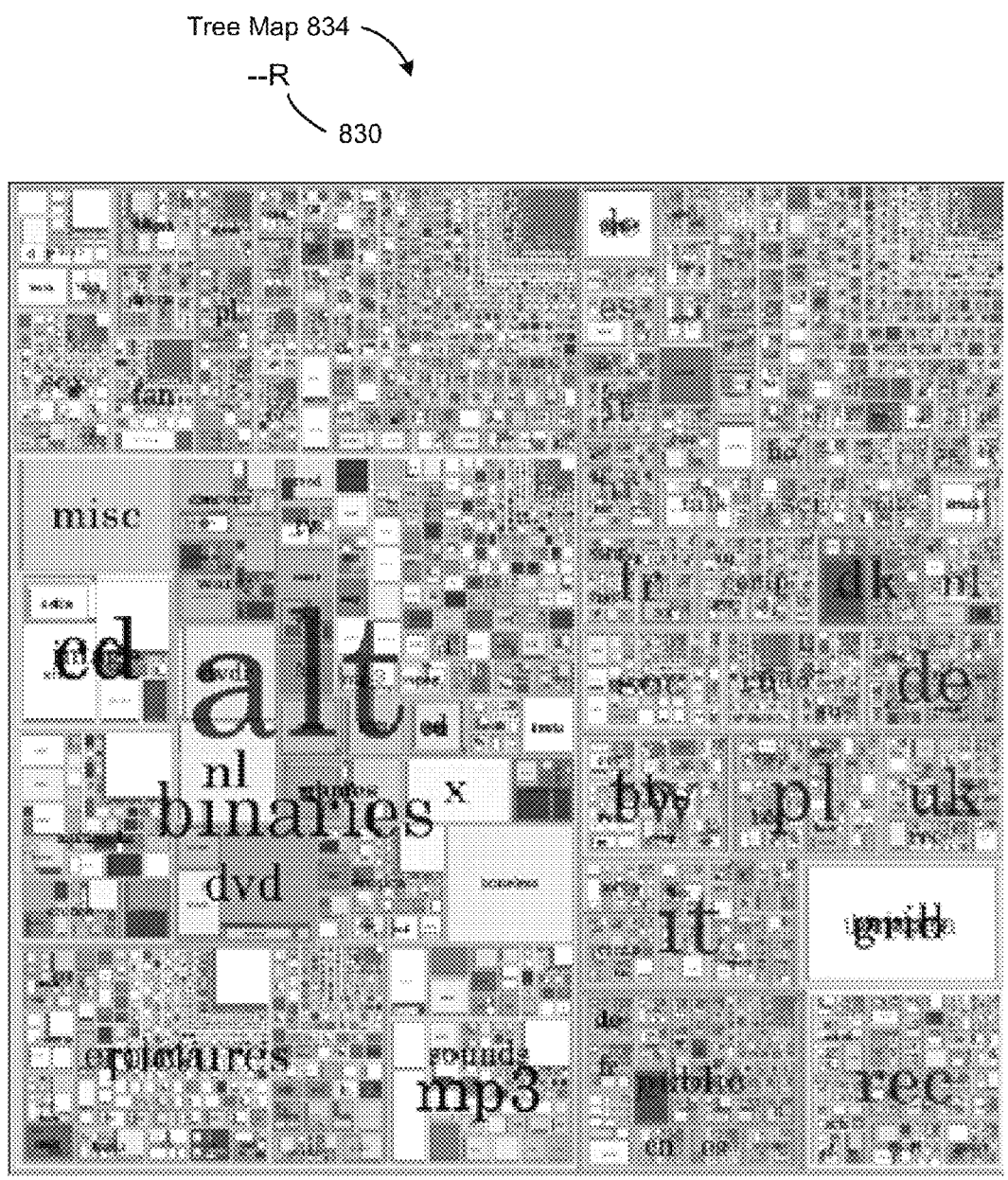

FIG. 8E illustrates another data visualization that may be generated and displayed when the data type acronym is --R 830. In this case, the relationship defines a tree and the user has selected a size encoding. The user may select a treemap view type to get the tree map data visualization 834. For a treemap data visualization, color encoding can also be useful. The example shows postings to a user group during a year, where nested boxes show the hierarchy of responses, size shows the number of postings, and color indicates how much the number of postings increased or decreased. Note that in this example, the connectors are not displayed as edge marks. Instead, the relationship is displayed by the nesting in the rectangular hierarchies.

Figure 8F:
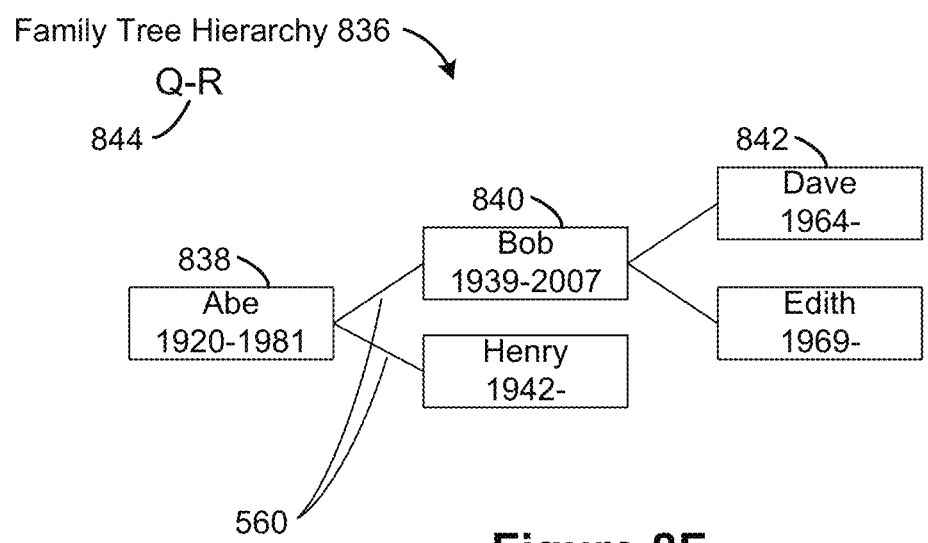

FIG. 8F displays a family tree hierarchy 836, which appears in FIG. 5A above as the displayed data visualization 540. This example is based on the sample data in FIG. 4C. As seen in the data in FIG. 4C, Abe 838 is the father of Bob 840 and Henry, and Bob 840 is the father of Dave 842 and Edith. The relationship R is used to define the connectors 560 (e.g., by placing the relationship R on the connector shelf 536). In order to place the descendents further to the right, a computed quantitative field $Q_R$ is placed on the columns shelf 534. (See, for example, computed field 788 in FIG. 7E.) The computed quantitative field $Q_R$ uses the relationship to determine distance, which in this case measures the distance of a node from the root (the root is Abe 838).

Because the position along the vertical axis is not selected by the user, the data visualization generation module 228 can arrange the nodes (the boxes) to avoid overlap. The generation module can assign y-coordinates as needed because they have not been selected by the user.

This example also shows multiple data fields used for a text encoding, with the display adjusted for the text content.

Figure 8G:
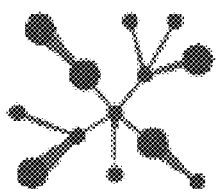

FIG. 8G illustrates a graph 846 in which the user has not specified data fields for x or y positions. That is, the data type acronym is --R 830. This may be generated, for example, by selecting a network layout type and an appropriate view type (e.g., graph). Unlike the graphs in FIGS. 8C and 8D, however, the user has chosen a size encoding for the visual marks (the nodes) so that some of the nodes are larger than others. In this instance, rather than continuous sizing, each of the nodes is one of three sizes.

FIGS. 8H, 8I, and 8J illustrate data visualizations in which connectors are used, and the user has specified both the rows and columns. Based on the data types selected for the rows and columns, different types of data visualizations are generated.

The family hierarchy 848 in FIG. 8H uses the data from FIG. 4C. In this case, the x-axis 852 is associated with birth and death dates of the people, the y-axis is based on the father-child relationship, and the connectors are based on the same father-child relationship. The data type acronym here is QRR 850. The relationship R selected for the y-axis defines the vertical order, but the data visualization generation module 228 can determine the spacing arrangement.

FIG. 8I illustrates semantic substrates 854, which are based on a data type acronym QOR 856. The data visualization in FIG. 8I includes a plurality of visual marks that represent related case laws in the U.S. Supreme Court and a circuit court. Here, the x-axis 858 is associated with year of each case law, and the y-axis 860 is associated with two courts (i.e., a "row" for the Supreme Court and a row for the circuit court). Visual marks are placed to represent relevant cases based on their respective year and court. In some instances, a user may specify an equivalence relationship 416 for the rows, where the equivalence relationship is based on both court and subject matter There are various relationships between the cases based on citation. In one example, citations are instances where the circuit court cites an earlier Supreme Court case. In another example, the relationship is based on the Supreme Court taking an appeal from the circuit court. In some instances, the tuples are aggregated based on court, year, and subject matter (e.g., using a subject matter classification in the records from the data source). When the tuples are aggregated, the connectors are commonly aggregated as well. In some cases, the connectors have a size encoding based on the aggregated number of relationship instances. In some instances, a user applies a filter to the connectors based on the year of the circuit court case. For example, in FIG. 8I, there are many dots corresponding to cases, but connectors are displayed only for citations for 1995 circuit court cases. See Shneiderman, B., Network Visualization by Semantic Substrates, IEEE Transactions on Visualization and Computer Graphics, 12(5), 733-740, 2006. Disclosed implementations can build such graphics using the user interface 500 rather than constructing the graphics manually.

FIG. 8J illustrates a dendrogram 862, which may be used when the data type acronym is $QQ_RR$ 864. The dendrogram 862 is associated with a hierarchical clustering. The y-coordinates (rows shelf 532) use a quantitative field constructed from a relationship, such as depth 788 described with respect to FIG. 7E. The x-coordinates (columns shelf 534) use another quantitative field. The visual marks corresponding to the data tuples may be sorted along the corresponding x-axis of the dendrogram in accordance with specific clustering criteria of these tuples. The connectors are based on the same relationship used to construct the quantitative field used on the y-axis.

Figure 8K:
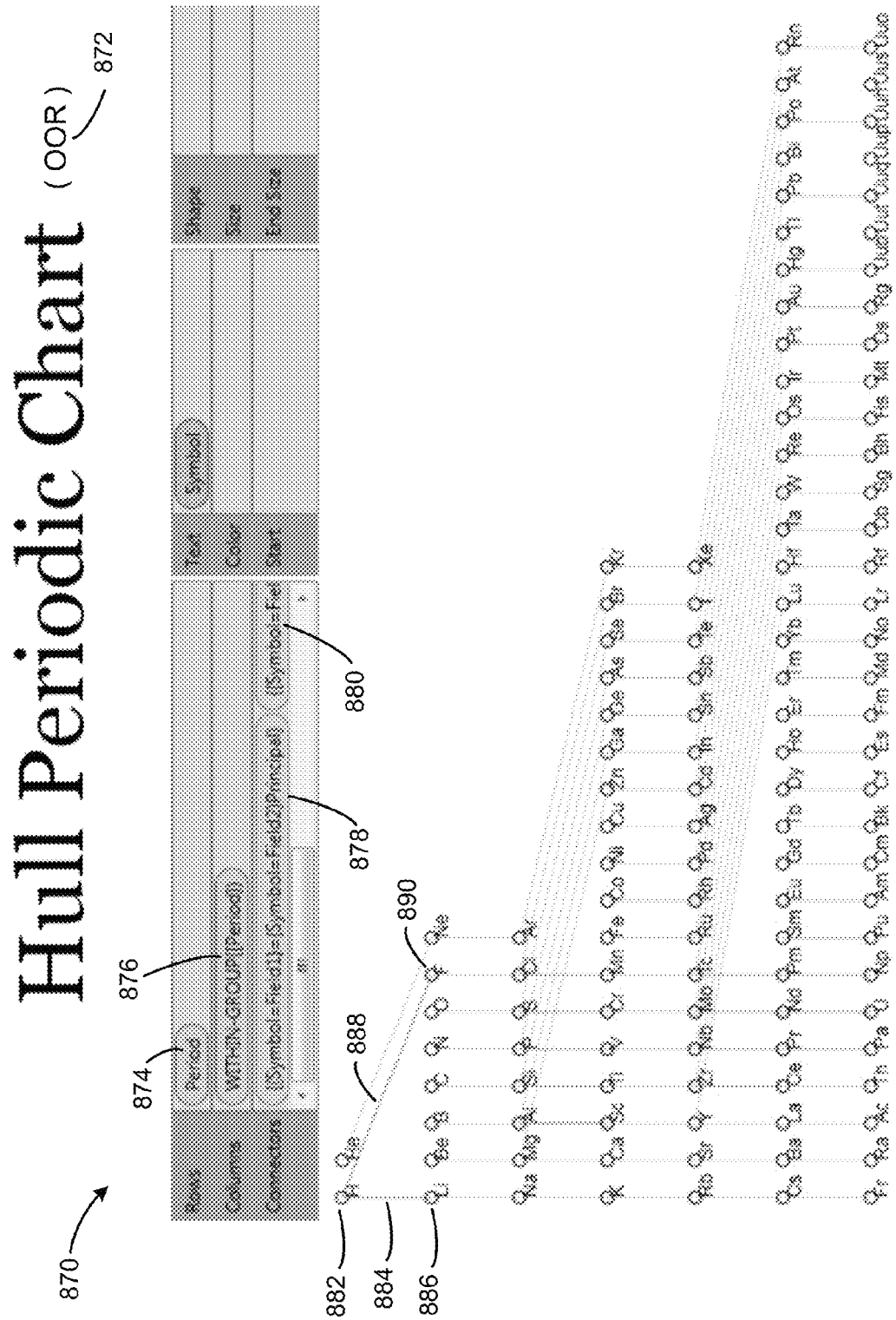

FIG. 8K illustrates a chart (870) of the elements that uses an OOR data type acronym 872. This is called a Hull Periodic Chart. This example shows the power on the data visualization application 222 and user interface 500, even if the application 222 might be used in this specific way. The underlying data for the tuples includes data fields 238 for each chemical symbol, the period of each symbol (corresponding to the valence shell of electrons), the atomic number of each element, and other data for each element.

In the Hull Period Table 870, the period 874 is placed on the rows shelf 532, such that elements in the same period are displayed in the same row. The period is effectively an ordinal field because of the discrete values. Using a traversal of the elements by atomic number, a computed field within-group([Period]) 876 is defined, which computes the order of the elements within each period. This is similar to the computed fields 784 and 790 in FIG. 7E. Because the computed values are discrete integers, this computed field is effectively an ordinal field as well. The selections on the rows shelf 532 and columns shelf 534 determine the location for each element.

An interesting aspect of this chart 872 is that is uses two distinct relationships 878 and 880 between elements. These relationships are sometimes referred to as principal and secondary. For example, the element Hydrogen 882 is connected to Lithium 886 by a connector 884 (the principal relationship 878), and connected to Fluorine 890 by a second connector 888 corresponding to the secondary relationship 880. In some implementations, connectors corresponding to the different relationships are encoded with different colors. In some implementations, the elements themselves are color coded (e.g., to indicate the element is a solid, liquid, or gas at a standardized pressure and temperature). Encodings may indicate other properties, such as whether an element is a metal, the density of the element, and so on.

Figure 8L:
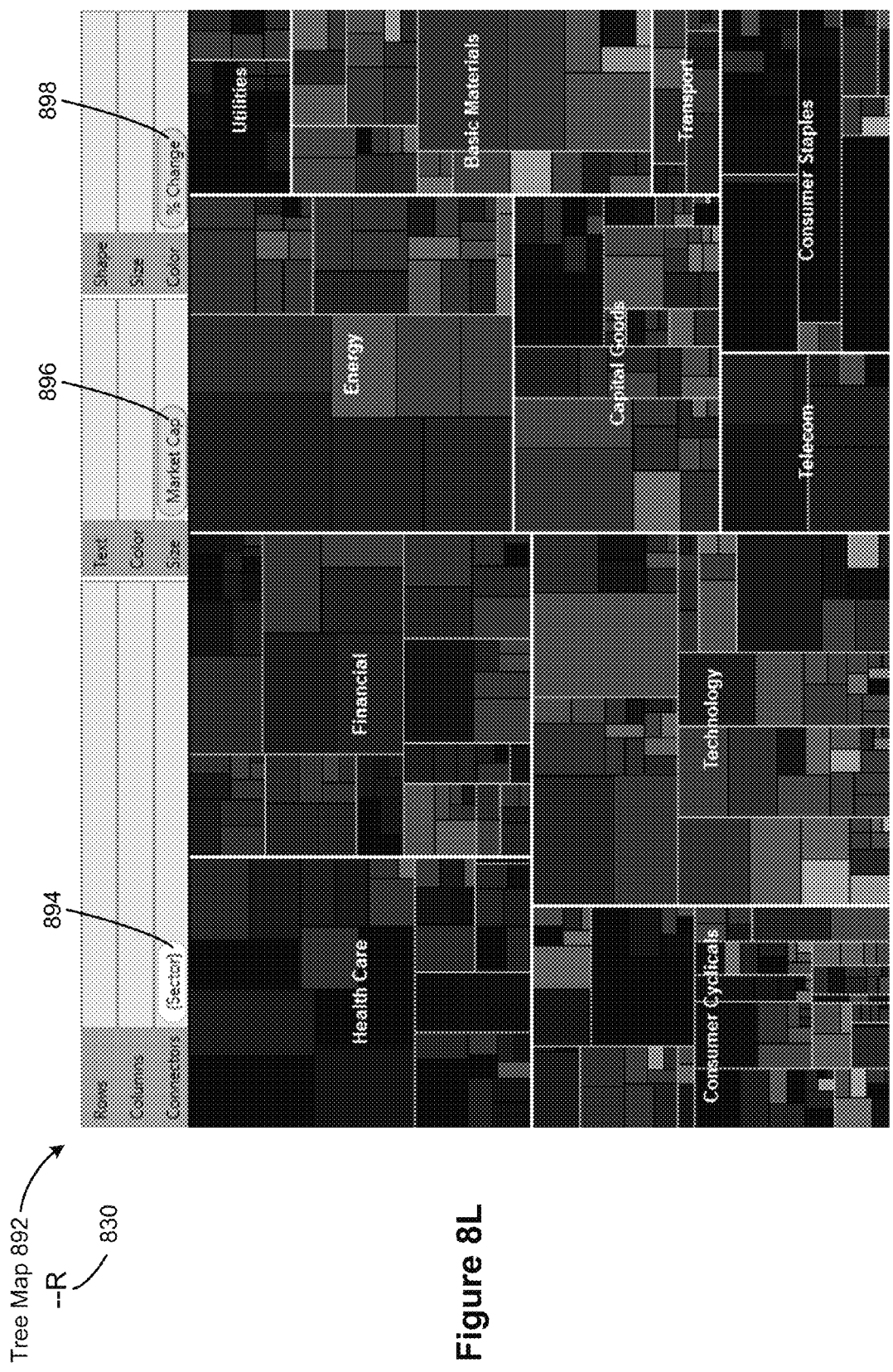

FIG. 8L provides another treemap 892 data visualization, and displays a portion of the user interface 500 that shows how data on the shelves are used to create the treemap data visualization 892. Like the other treemap 834 in FIG. 8E, the data type acronym is --R 830. The "--" in the data type acronym 830 corresponds to the fact that no elements have been placed on the Rows shelf or the Columns shelf. However, the relationship {Sector} 894 has been placed on the Connectors shelf.

The {Sector} relationship is a category tree hierarchy, similar to the one illustrated in FIG. 4E. At the top of the hierarchy are the labeled sectors "Health Care," "Financial," etc., as seen in the displayed treemap 892. Each sector is subdivided into industries, which form the smaller rectangles within each sector. In some instances, the industries are further subdivided into smaller groupings. The {Sector} relationship corresponds to the sector/industry hierarchy.

Unlike a typical connector, which is visualized as a line or arc, the connectors here are visualized by the hierarchy of rectangles: when an industry is related to a sector in the hierarchy, the rectangle for the industry is inside the rectangle for the sector. Here, the user has specified "Market Cap" 896 for size encoding of the connectors. Using the size encoding produces rectangles that are proportional in size to the market capitalization of each industry. This example includes a color encoding based on "% Change" 898, which is the percent change in market capitalization during a certain period of time. In this way, it is easy to identify the industries that are growing or shrinking.

In some implementations, when a treemap is generated and displayed, a user can zoom in to get more detail about any portion of the treemap. Based on the magnification level, more detail is provided.

Figure 8M:
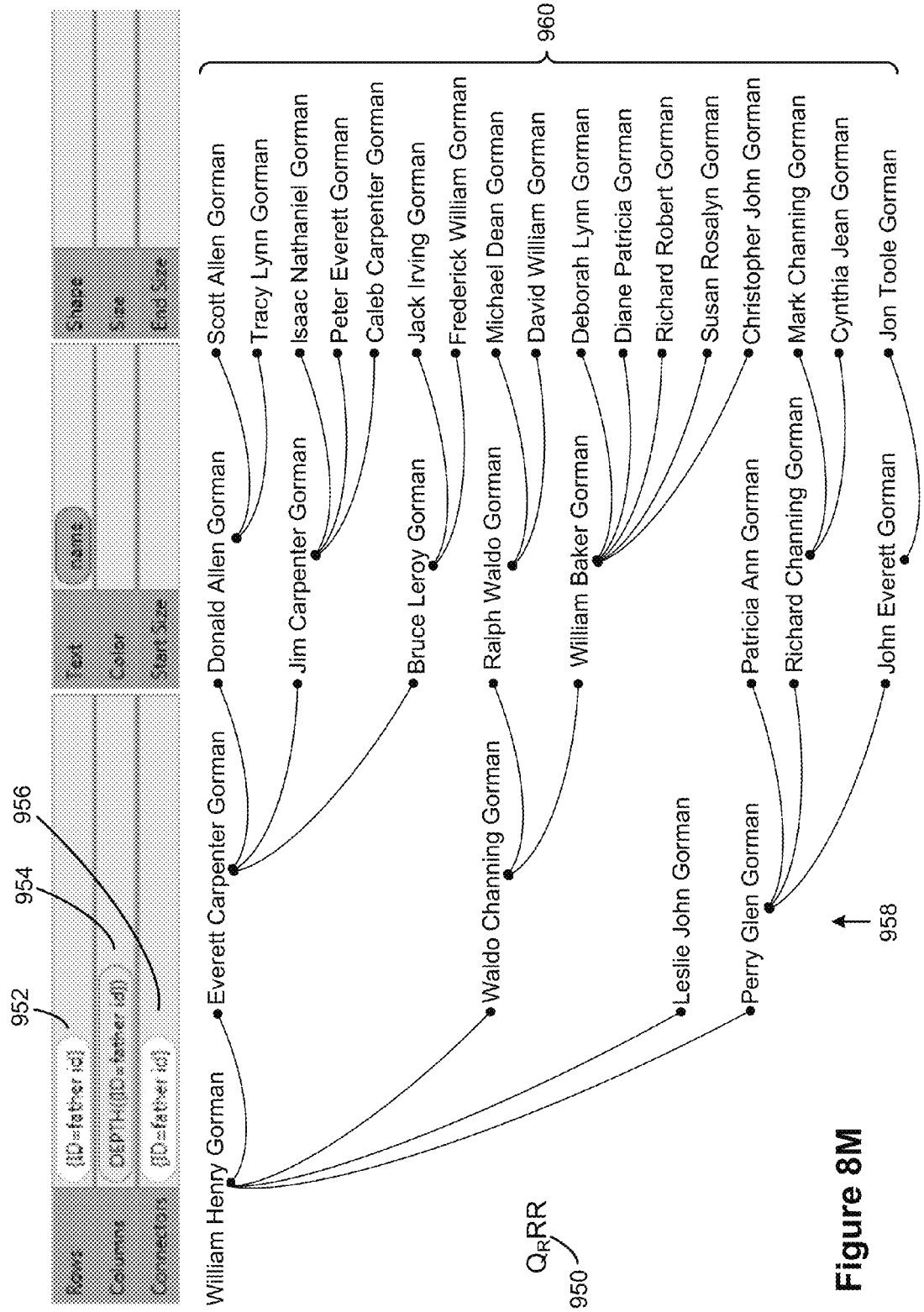

FIG. 8M illustrates both filtering and sorting based on a relationship. This figure presents another family tree hierarchy, and uses the relationship {ID=father_id} as described above with respect to FIG. 4C (but uses a different set of data). As shown at the top of FIG. 8M, the columns (x-position) 954 are specified by the quantitative function DEPTH( ) based on the relationship {ID=father_id}. The rows (y-position) 952 are specified by the relationship itself, and the connectors 956 use the same relationship {ID=father_id}. Based on these settings, the data visualization has data type acronym $Q_RRR$ 950.

A filter has been applied to limit the depth of the family tree to four levels. Filtering based on depth within a tree relationship is also described below with respect to FIG. 14 and FIGS. 21A-21C. Note that the depth is based on a traversal of the tree.

The traversal of the tree also provides a unique order to the nodes (the person tuples). In some implementations, when a relationship is selected to specify the rows or columns, the elements are sorted based on the tree traversal, as illustrated here. For example, in the second column 958, the children of William Henry Gorman are displayed in the traversed order. The traversed order is not necessarily tied to any data of the tuples, but the traversal may use tuple data if available. For example, if birth date information is available for all of the people, the traversal may use that information when deciding which node to traverse next. In a breadth-first traversal, all of William Henry Gorman's children (i.e., the people in the second column 958) are traversed before other descendents. However, a depth-first traversal, other descendents are traversed before all of the children. Regardless of the traversal algorithm, the result is a unique order for all of the elements in the tree. If a subset of the nodes are selected (e.g., the nodes in the second column 958), there is a unique order of those nodes, which is used as the sort order here.

The fourth column 960 includes great grandchildren of William Henry Gorman. With either a breadth-first traversal or a depth-first traversal, the great grandchildren are sorted in such a way that the people with the same father are sorted together (e.g., the five children of William Baker Gorman are sorted together). Note that sorting the great grandchildren by their birth dates would not put siblings together, creating a data visualization that is either messy, not as easy to read, or both.

Using a relationship 240 to sort elements in a data visualization can also be applied to other layout types 714, such as a circular layout. For example, if a relationship 240 is selected to specify angular position in a circular layout, the placement of the nodes in the layout is based on the traversal order. In some implementations, sorting can be applied within designated subsets as well, as illustrated below in FIGS. 13A-13D (sorting the teams within each division according to a circular layout).

Figure 9A:
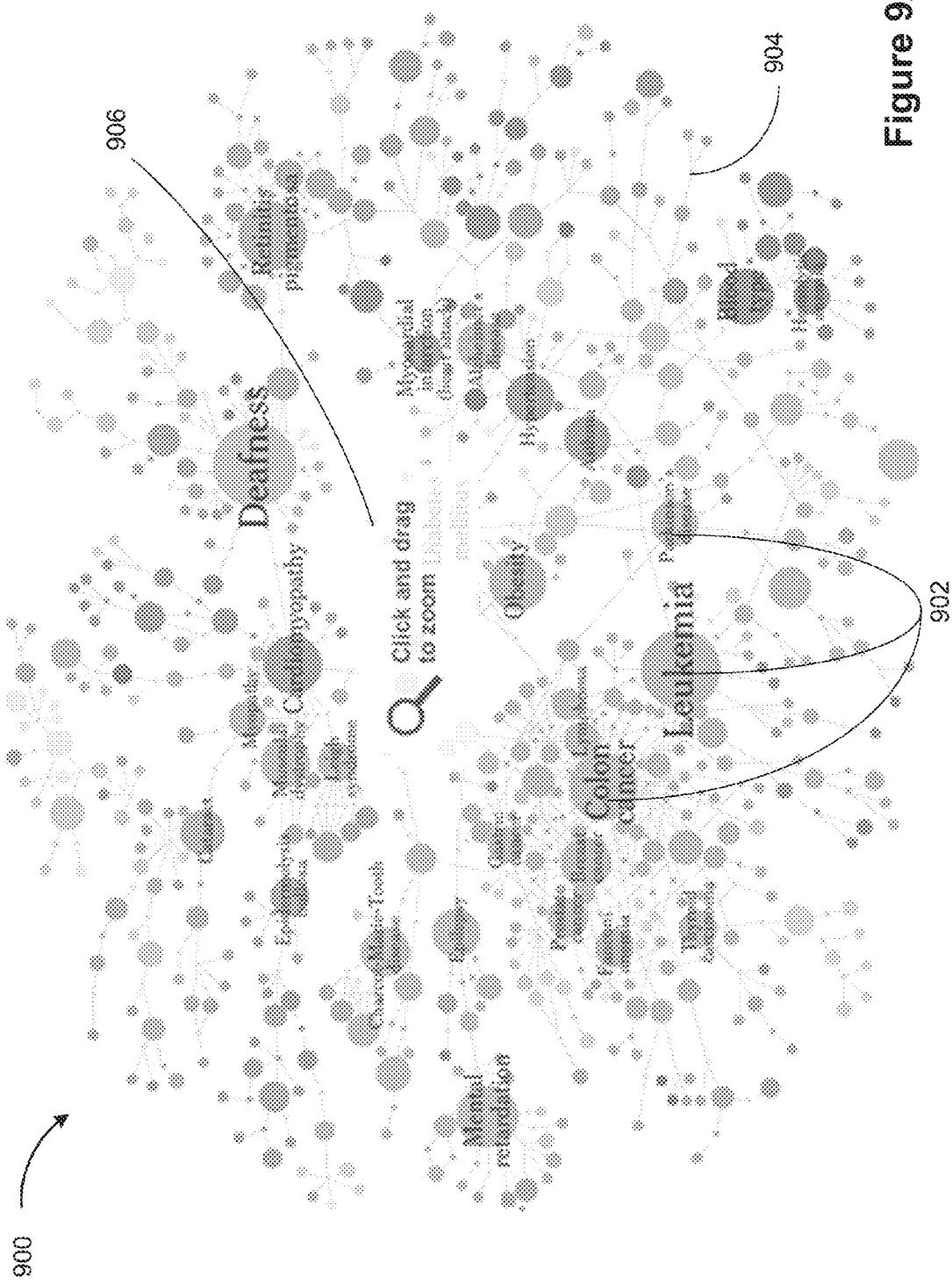
FIGS. 9A-9C illustrate various data visualizations that include a plurality of marks and connectors in accordance with some implementations.
Figure 9B:
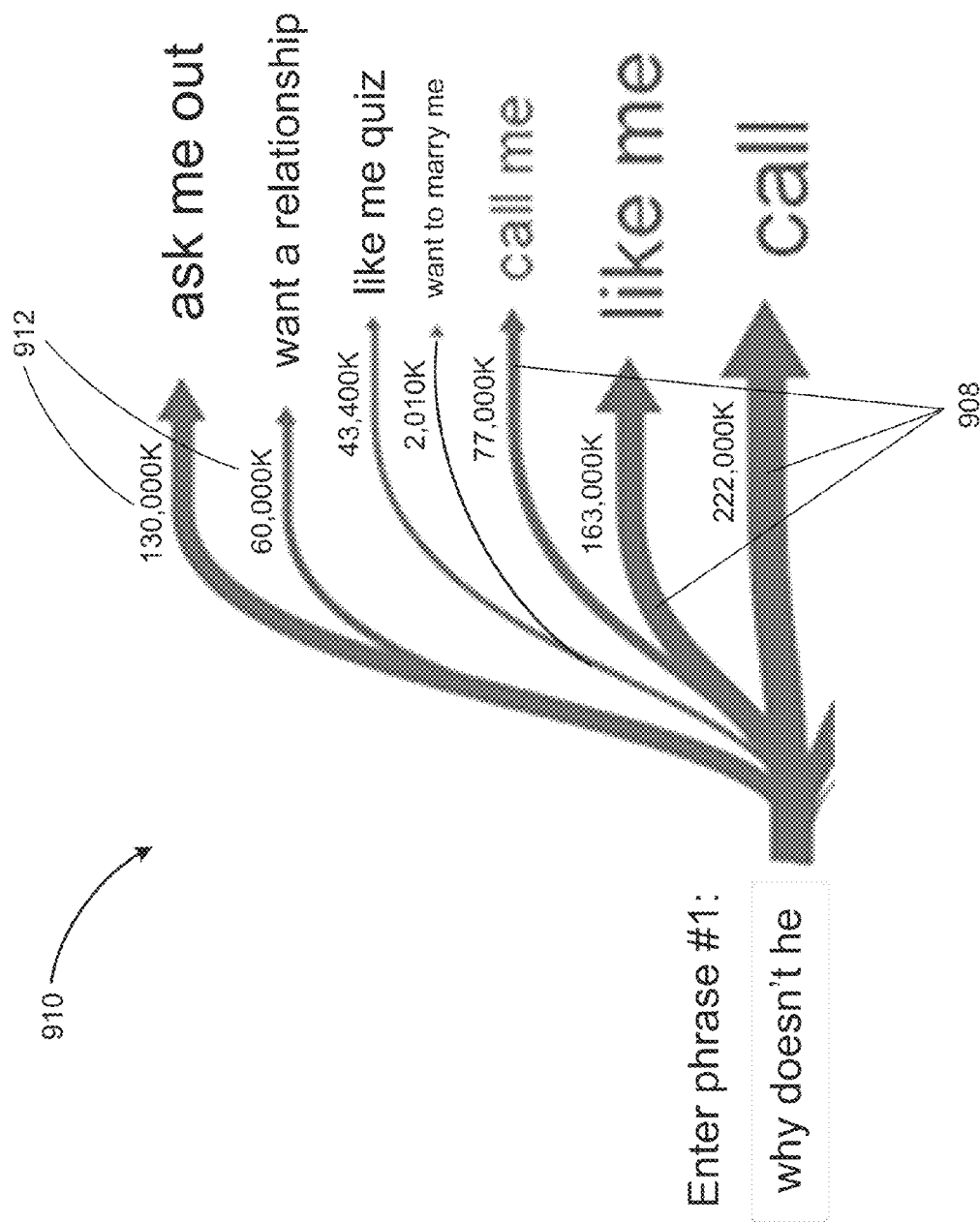
Figure 9C:
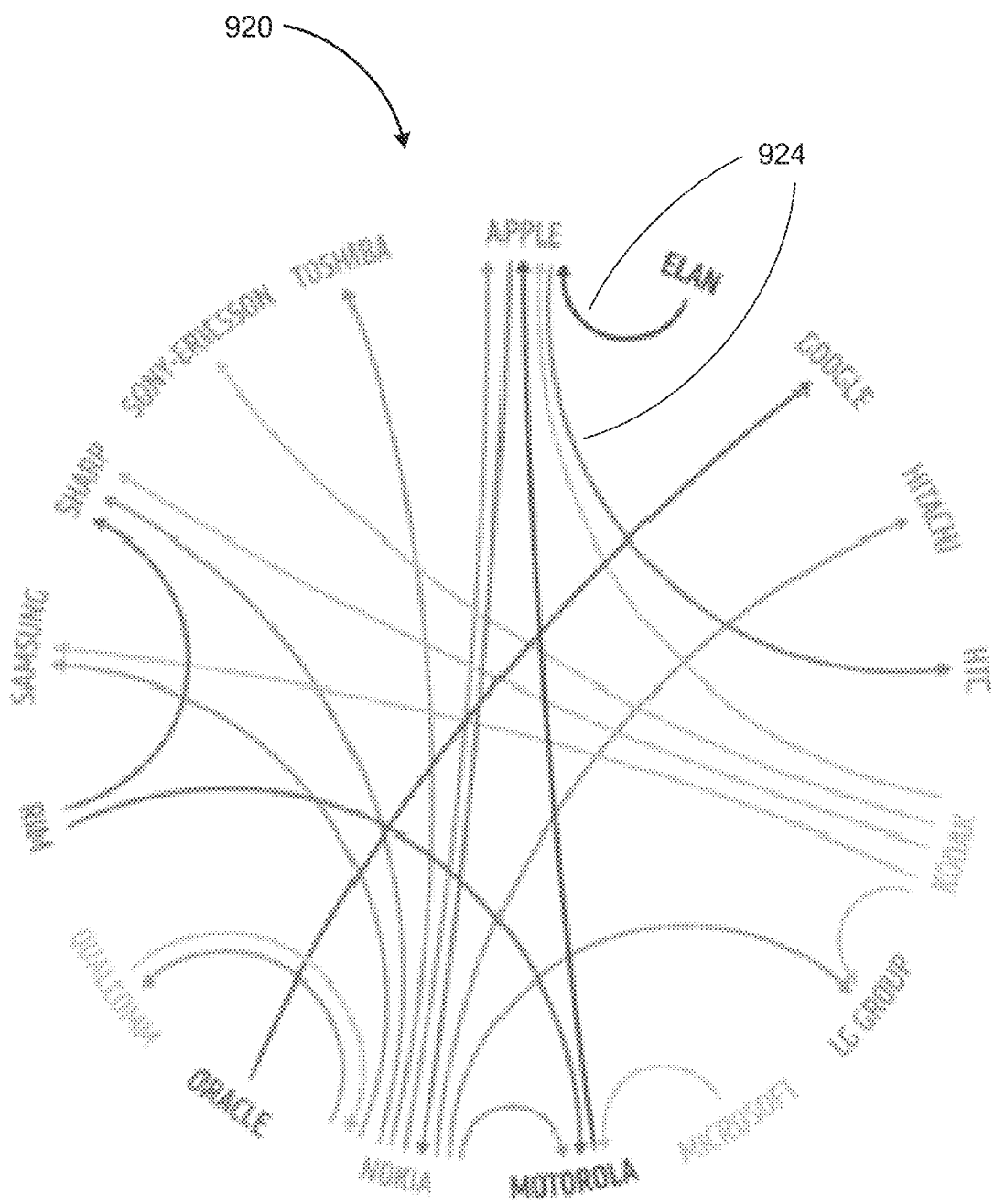

FIGS. 9A-9C illustrate generating and displaying data visualizations with certain aesthetic qualities. How data is presented can be very important in order for end users to understand and retain the presented information. Each of the visual representations 900, 910, and 920 includes a plurality of visual marks and connectors in accordance with some implementations. Each of the plurality of marks represents at least one tuple retrieved from a data source 236. In some instances, each mark is displayed as a simple geometric shape (e.g., circle, square, triangle, and diamond) or an image. In some instances, each mark is represented or accompanied by a text label (e.g., using the text encoding shelf 542 in user interface 500). The marks are linked to each other by the connectors. The geometric shapes, images, text labels, and/or connectors preferably do not overlap each other, or overlap as little as possible based on the data to be presented. Having overlap in a data visualization reduces the effectiveness of the visualization both functionally and aesthetically. From a functional standpoint, certain data is either obscured or confused. And from an aesthetic standpoint, having a "good" graphic keeps users engaged with the presentation. Therefore, a key factor evaluated by the data visualization generation module 228 is how well the data is displayed (e.g., readable, usable, etc.).

In some implementations, the locations of the visual marks in a data visualization are not explicitly or implicitly associated with an ordinal or quantitative data field of a retrieved tuple (e.g., the rows shelf 532 and the columns shelf 534 in the User interface 500 are left blank). Therefore, the data visualization generation module 228 selects the locations of the visual marks The data visualization generation module 228 includes a plurality of layout algorithms, and applies an appropriate algorithm based on the visual specification 234 (e.g., the layout type, the pane type or data type acronym, the view type, and so on).

The data visualization 900 illustrates determining the locations of visual marks 902 to accommodate corresponding text labels. The sizes of the text labels are encoded according to the sizes of the visual marks 902 to prevent the text labels from overlapping with each other. In some instances, a text label that is semantically associated with a visual mark is too long. In some instances, only a part of the text label is displayed with the corresponding visual mark (e.g., using truncation). In some instances, the text label is wrapped for display on multiple lines. In some instances, text labels are displayed that extend outside of the visual marks. In some instances, text labels are selectively used for some, but not all, visual marks because of limited space. The text marks that are not shown on the data visualization 900 may be displayed when a user chooses to zoom in on a particular portion using the zoom feature 658 (as indicated by the icon 906), or in some implementations when a user hovers a cursor at a certain location.

The zoom feature 658 is an interactive post-generation option 650, which is particularly useful for a graphic such as 900 that is based upon a lot of data. Some implementations provide magnification-based detail (such as text labels in graphic 900) as appropriate for the level of magnification selected.

In some implementations, when the visual marks 902 are accompanied by their text labels, the data visualization generation module 228 implements a dynamic label placement method that places the text labels in accordance with a set of predetermined visual effect criteria specifically related to text labels. According to this set of visual effect criteria related to text labels, the dynamic label placement method avoids overlapping labels, makes labels readable, and places as many labels as possible on the data visualization 900.

In some implementations, when an image is used to represent a visual mark (e.g., digital photos of people in a social network), the image characteristics (e.g., location, size, and resolution) are selected to provide satisfactory visual effects (e.g., select image sizes so that the images do not overlap).

The style of connectors affects the aesthetics and readability of a visual representation. In some implementations, the connector encodings include connector type, arrow location, color, and width. In some implementations, the connector types include straight connectors 904 and curved connectors 924. In some implementations, the connectors may have either fixed width or tapered width (width gradually changes from one end of the connector to the other end). Some implementations include arrowhead connectors 908 (which may have arrowheads on either or both ends). Some implementations include arrow connectors where the arrows are placed in a middle portion of the connector 908. Some implementations include additional settings for connectors, such as a transparency setting that specifies the transparency level. When used, the transparency level of the connector determines whether visual marks that overlap with the connector may still be partially visible under the overlapping areas.

A connector shows a relationship among several data tuples not only by linking visual marks that represent the data tuples together, but also by having visual characteristics that are displayed according to the relationship. For example, some connector encodings (e.g., the line width of the connector) may show aggregated or other numeric properties of the relationship. This is illustrated in graphic 910, which represents women's responses to survey questions about their personal relationships. The line width of each connector 908 is proportional to the number of interviewees that responded in each way. In this case, the number of people corresponding to each connector 908 is also displayed as a text mark 912 next to the corresponding connectors 908

Curved connectors provide greater flexibility to display data effectively. As shown in the data visualization 910, the curved connectors 908 are separated at their common origin (i.e., the text label "why doesn't he"), and thus the widths of the connectors are displayed with improved visual effects.

As illustrated in data visualization 920, the curved connectors offer improved visual effects compared with straight lines, especially when they are used to connect visual marks that are very close to each other. In some implementations, the curvature of a curved connector is selected according to the visual marks that may overlap the curved connector. In some implementations, the connectors are curved in order to avoid crossing the visual marks. In some implementations, certain visual marks or connectors are identified as having a higher priority, so crossing those marks or connectors is not permitted. Note that the graphic 920 uses a circular layout for the marks, with spacing selected so that the visual marks around the perimeter are roughly equally spaced.

In some implementations, the data visualization generation module 228 includes a plurality of dynamic layout algorithms, which arrange the visual marks and the connectors together according to a set of predetermined visual effect criteria. The dynamic layout algorithms use the visual specification 234, including the information in rows shelf 532, the columns shelf 534, the connector shelf 536, the encodings for visual marks, and the encodings of the connectors, to arrange the marks and connectors. The dynamic layout algorithms also use the tuple data and connector data to identify visual marks that are potentially located on the path of the connectors, as well as the curvature and width of the connectors themselves. According to this set of visual effect criteria, the dynamic layout algorithms avoid overlapping marks and connectors as much as possible, and make connectors discernible. In some implementations, the dynamic layout algorithms use an iterative process that adjusts both the connectors and the visual marks until satisfactory visual effects are obtained.

FIGS. 10A-10H illustrate a sequence of data visualizations created by a user who is evaluating airline flight data between states in the United States. This scenario shows flows across geographic networks. For this example, the data in stored in a data source 236 with the following data fields 238 about flights:
Airline
FlightNum
DestinationState
DestinationAirport
OriginState
OriginAirport
Passengers
Revenue The user is an analyst for a major airline. The airline is considering adding additional destinations and wants to understand the revenue and passenger flow to all possible destinations. The user begins by creating the bar chart 1000 in FIG. 10A. The bar chart 1000 shows the total number of passengers flying into each state. In the user interface 500, the DestinationState field is placed on the rows shelf 532 and the formula for the number of passengers is SUM([#Passengers]).

Figure 10A:
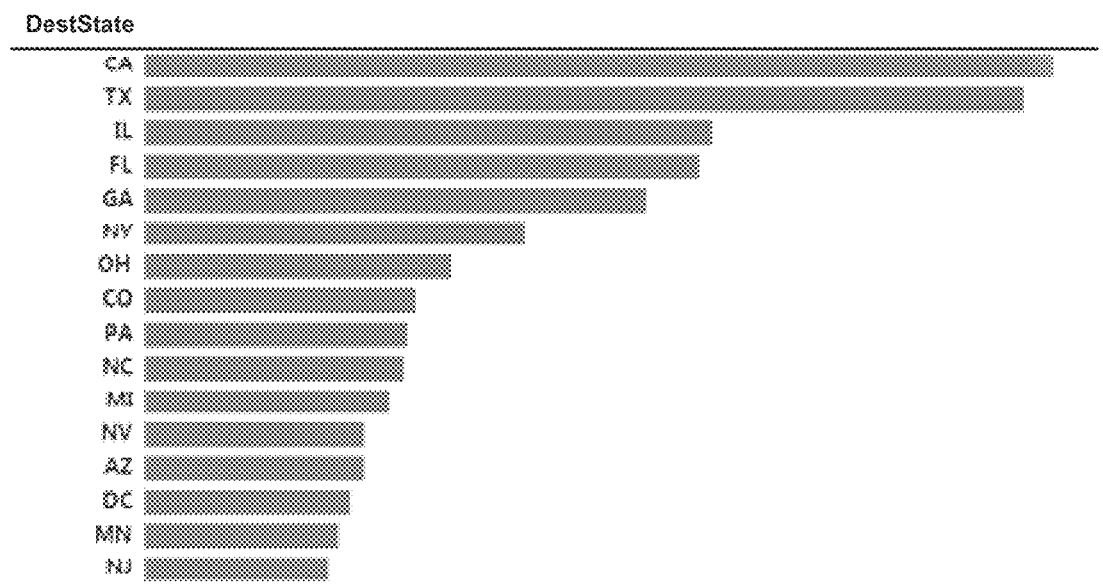
FIGS. 10A-10H provide a sequence of data visualizations corresponding to analysis of airline flights between states in accordance with some implementations.
Figure 10B:
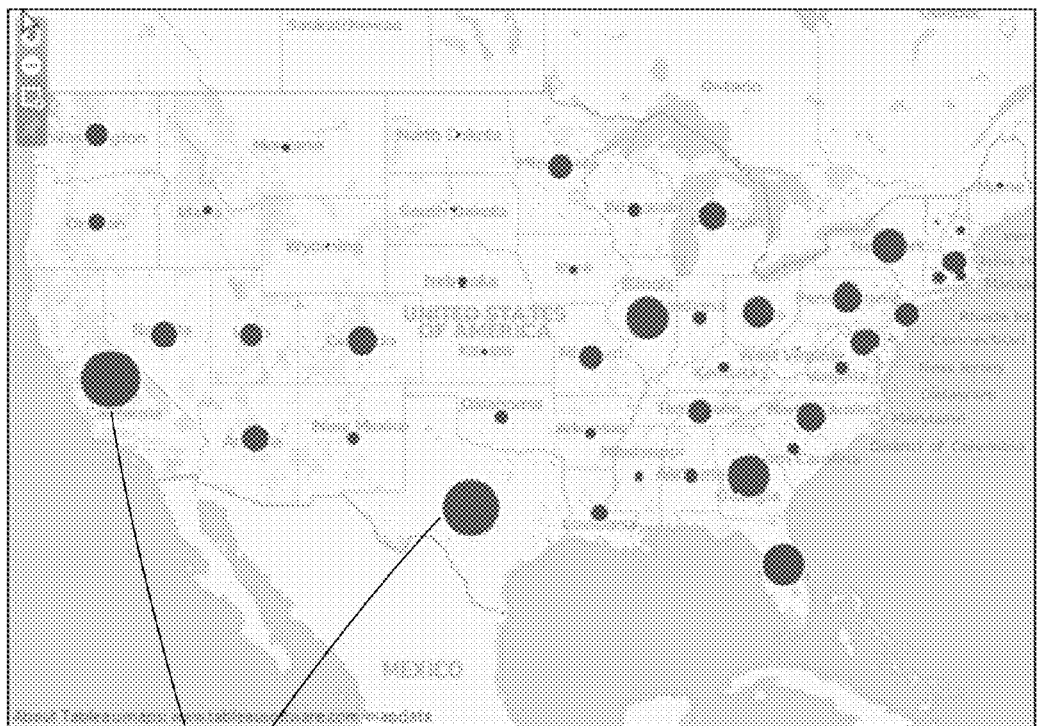

The airline already has routes to CA and TX, but IL and FL both seem like interesting opportunities for expansion. The user is interested in seeing how these new destinations interact with their current routes so the user switches the view type to a map view as illustrated in FIG. 10B. In the map view, each DestinationState is correlated to a position on the map, and visual marks are created for each state, such as the marks 1004 for California and Texas. The marks use a size encoding to visually display the number of travelers to each state. The user does this by placing the formula SUM([#Passengers]) onto the size shelf 544.

Figure 10C:

This airline only operates in major population centers, so the user filters out states with less than a specific number of passengers traveling to them, as illustrated in FIG. 10C. Here, the user specifies a filter using SUM([#Passengers]). In addition, the user also sets an explicit filter to remove Georgia from the map because it is not a destination the airline can consider at this time. The application of the second filter is not illustrated in FIG. 10C.

Figure 10D:
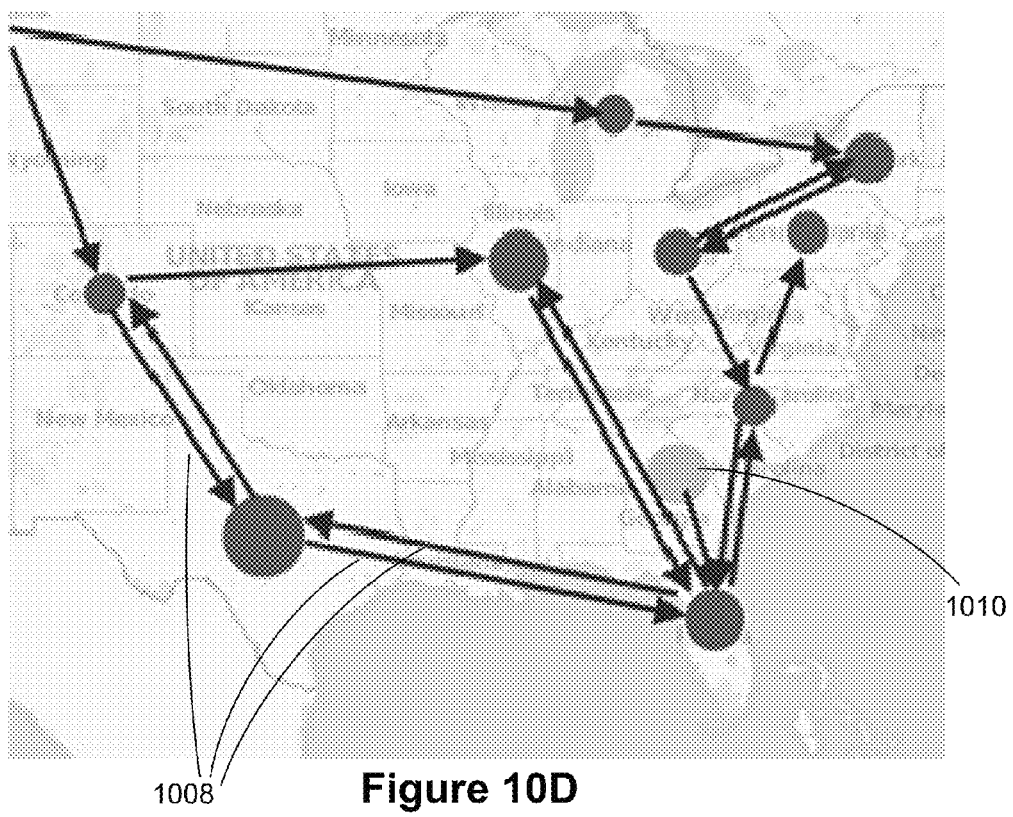

The user then adds connectors to the map, including the connectors 1008 illustrated in FIG. 10D. The connectors here are sometimes referred to as "To/From Edges" because they connect a source and a destination. In many cases there are pairs or connectors between two states, illustrating the travelers in both directions. The flight data defines the relationship between source and destination, and that relationship is placed on the connector shelf 536.

In some implementations, the user uses the relationship builder module 232 to define the relationship with the source as [OriginState] and the destination as DestinationState. In this data set, a row in the database directly maps to a single edge in the graph. Each node (a visual mark) corresponds to one or more rows in the database. For example, Texas is a single node in the graph, but there are flights into Texas from multiple other states.

This example raises a number of interesting issues. First, the size encoding for the marks applies only to the marks, and not to the connectors. As seen in FIG. 10D, all of the connectors have the same width. Second, the filter that excludes GA only excludes Georgia as a DestinationState, while not excluding Georgia as an OriginState. As a result, some implementations create a "ghost" node 1010 in the visualization to represent the edge from Georgia to Florida.

The user is able to pick from a number of rendering styles for the edges, including straight edges between points, simple arcs, or great circle arcs. In this instance, the user has chosen the default straight edges.

Figure 10E:
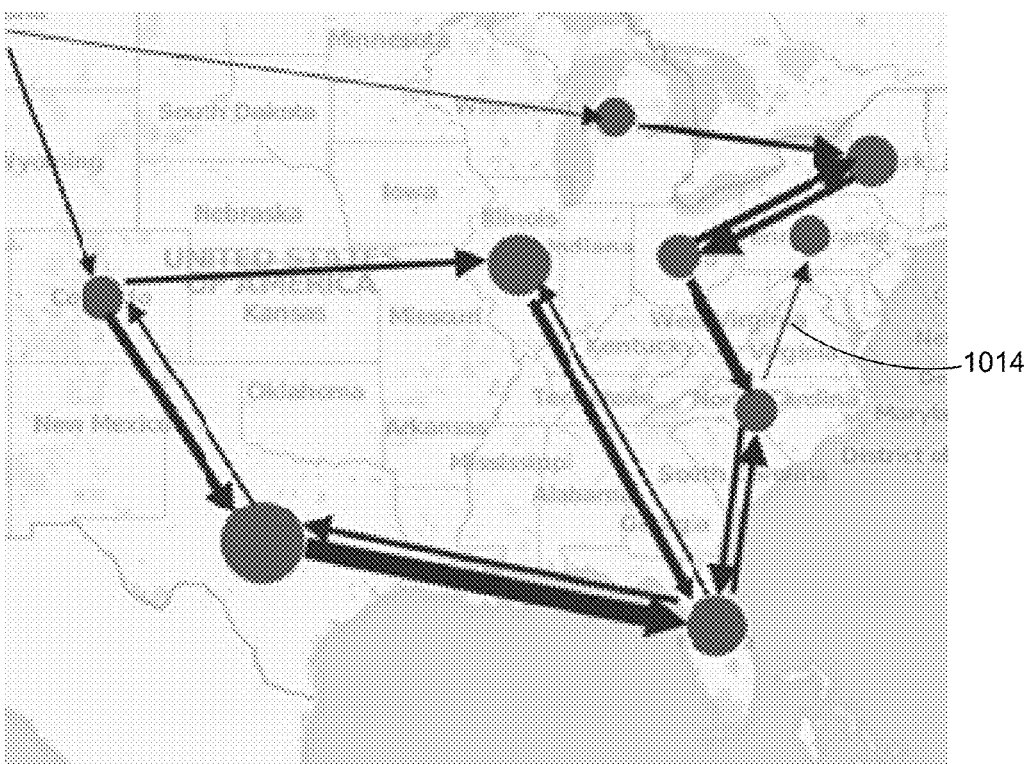

In FIG. 10E, the user has removed the ghost node (e.g., by toggling a Ghost Node display option in a display menu). In addition, the user has changed the color of the edges using the color encoding shelf 556 for connectors. Finally, the user has encoded the size of the connectors by placing the formula SUM(#passengers) on the connector size encoding shelf 546. For connectors, the size is the width.

Figure 10F:
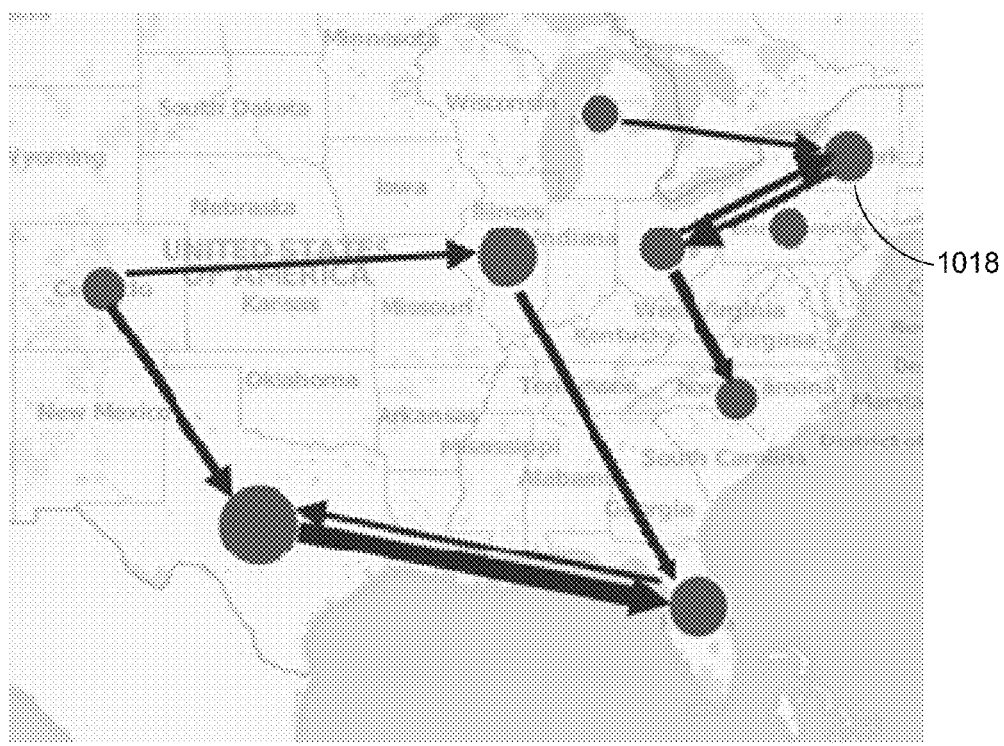

In FIG. 10F, the user has removed the connectors that represent too little traffic by applying an aggregate filter to the edges. The aggregate filter for the connectors uses SUM(#Passengers)>Threshold, where the threshold is a specific value. This filter removes the edge 1014, for example, which was previously displayed in FIG. 10E.

Figure 10G:
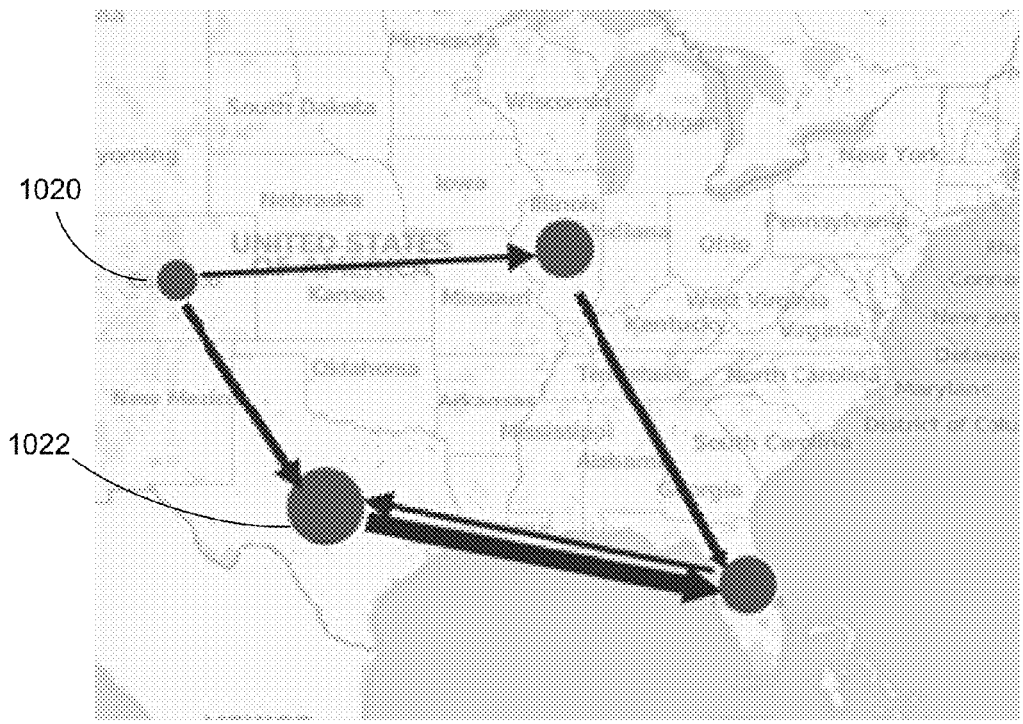

FIG. 10G illustrates filtering the nodes in a graph based on the relationship for the connectors. The user wants to limit the display to nodes that are connected to Florida in the current graph. In some implementations, the user accomplishes this by right clicking on the FL node and adding a filter to limit the display to nodes that are connected to Florida by links that are still in the graph. This is an example of filtering visual marks based on properties of the connectors or a relationship. In this case, the New York node 1018 is now excluded. On the other hand, Colorado 1020 is still included because there is a path to Florida that goes through Texas 1022. Although not depicted in this illustration, a node may remain in the display with sequences of connectors with more than two links.

Figure 10H:
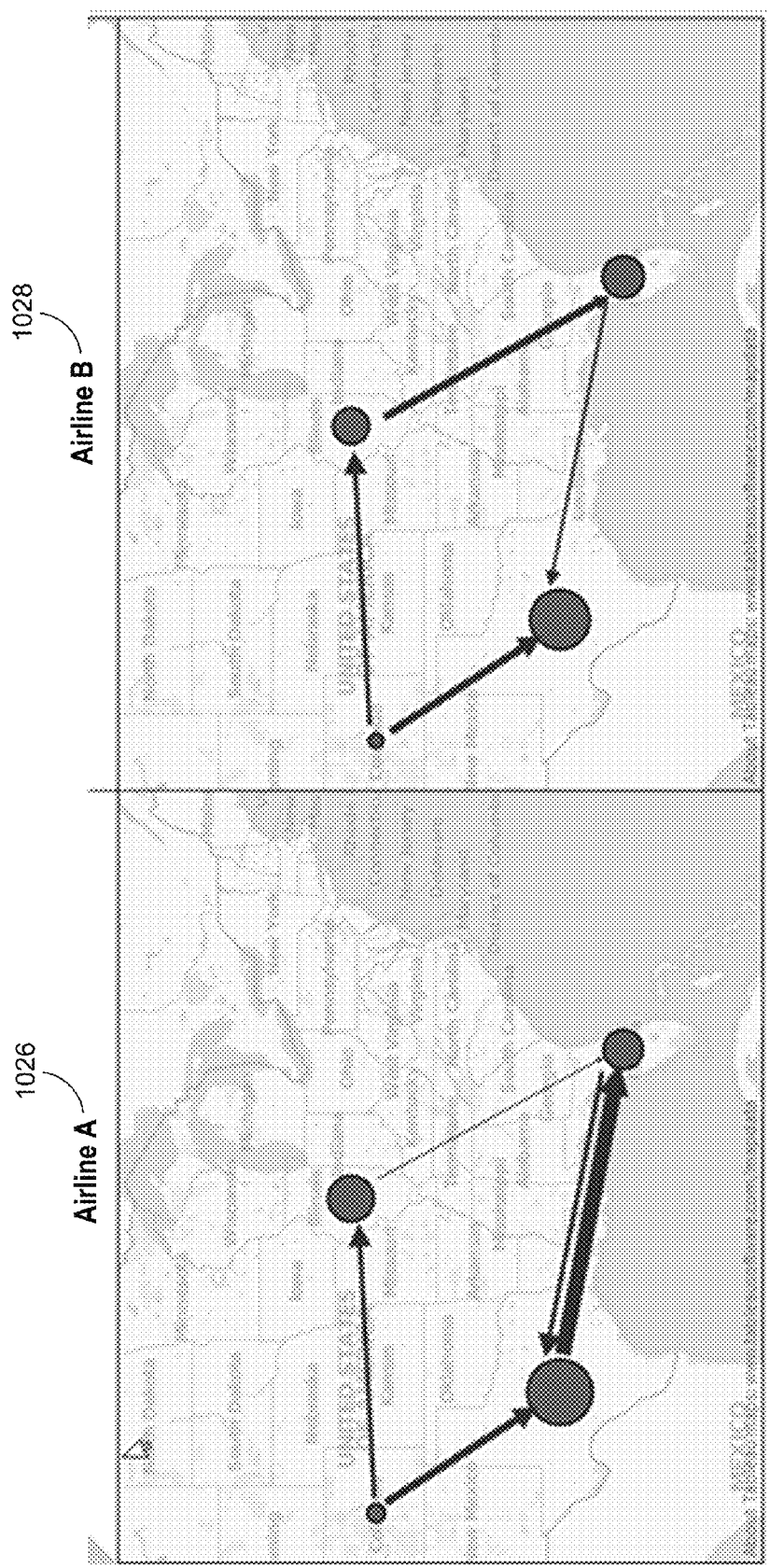

FIG. 10H illustrates that that the user can split the data into small multiples based on the airline's two major competitors to see their different approaches to flying into Florida. In this case, the data previously displayed in FIG. 10G is split into two graphs based on the airlines, thus displaying a graph for Airline A 1026 and a separate graph for Airline B 1028. In some implementations, this splitting into panes is accomplished by adding the airline data field to the columns shelf 534. If the data included additional airlines, there would be additional panes. Alternatively, if the user is interested in only these two airlines, the user could add another filter.

After this work, the user can choose to go back to a bar chart, and see data corresponding to the various filters and selections that have been applied. In some implementations, the user invokes a data visualization recommendation module 642 to identify alternative ways to view the data.

FIGS. 11A-11J illustrate a sequence of data visualizations created for market basket analysis. The data for this scenario is from a hypothetical SuperStore data source 236 with the following data fields 238:

Product
OrderID
Date
Price
Sales
Margin

A user wants to study which products frequently occur in the same order and how this has varied over time and across promotions. The user starts by placing the [Product] field on the Level of Detail shelf. Rather than overlapping the products, some implementations stack items in a cell by default. Because no fields have been placed on the rows or columns shelf, the product names just wrap around. Assuming the user has selected text marks for the products, the initial graphic may appear as shown in FIG. 11A.

In FIG. 11B, the user has encoded Price as the size of each item (e.g., using the size shelf 544). This produces a pseudo-tag cloud. Some implementations include "tag cloud" as a view type, so selecting that option results in a true tag cloud. See, for example, graphic 740B in FIG. 7C. In some implementations, a tag cloud is created when the user selects a "packed" layout type and selects a specific view type.

In FIG. 11C, the user applies some filters to focus on just this year's sales, so the data is filtered to YEAR([Date])=2011. In addition, the user limits the products to those with price <=1000, which eliminates "Desktop."

FIG. 11D illustrates switching from a Cartesian layout to a Circular layout. In some implementations, the user makes the selection by clicking on an icon near the Rows and Columns shelves. In some implementations, this is accomplished by using a toolbar icon or a menu item. As illustrated in FIG. 11D, the Text marks have optional borders, allowing them to appear more like "marks".

Figure 11E:
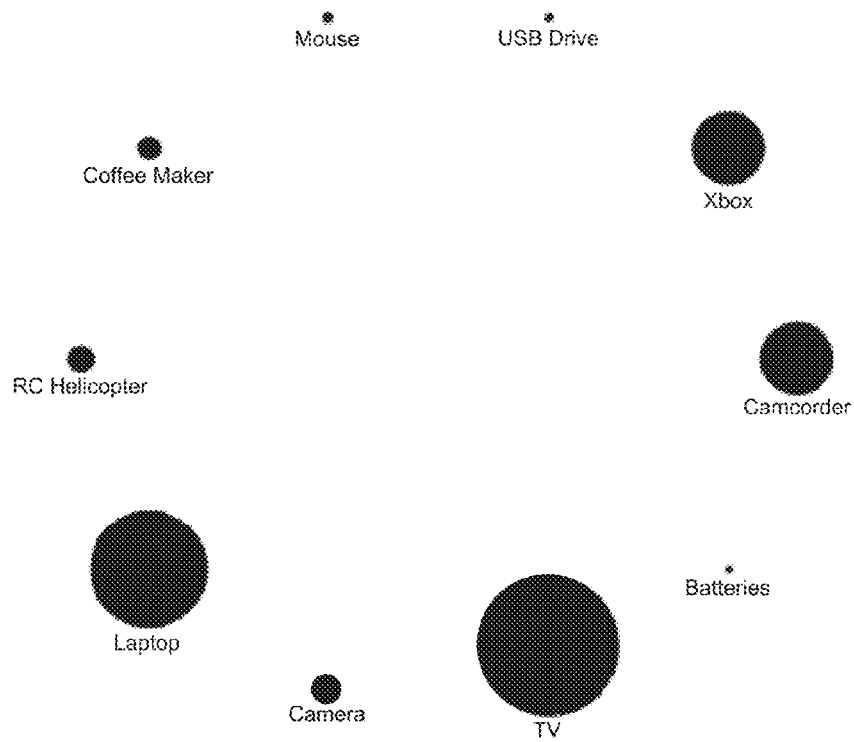

In FIG. 11E, the user switches from Text marks to Circle marks, selects [Product] as the label, and adds Price to the size shelf. In general, these operations do not alter the location of the products. In the illustration of FIG. 11E, the user has selected a different sort order as well.

Figure 11F:
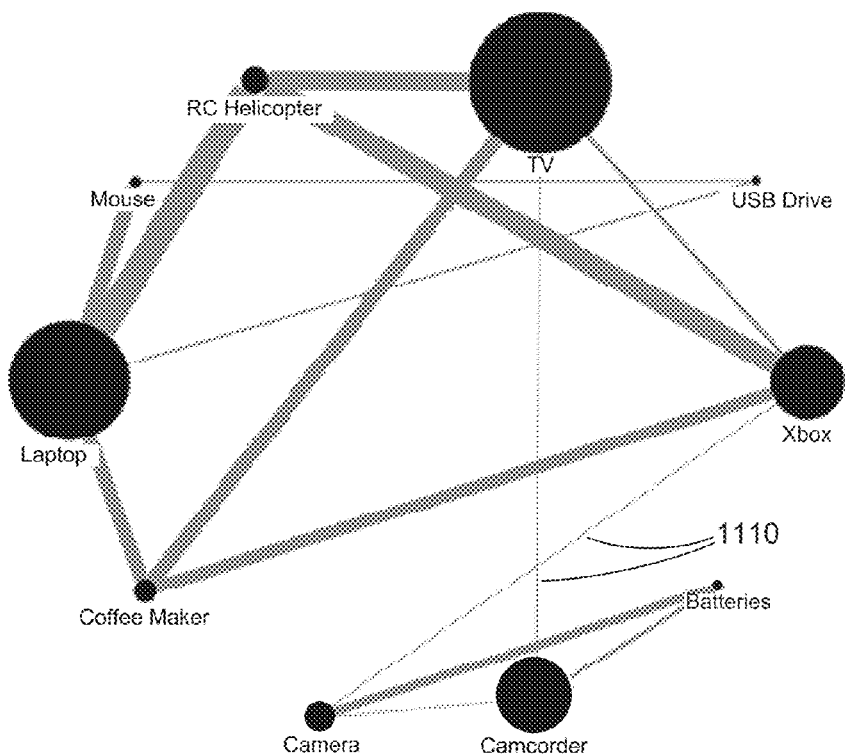

FIG. 11F illustrates adding connectors to the graph. In this case, the user wants edges to show which products are purchased together. This can be achieved by using an equivalence relationship 416. Two records from the data source 236 are "equivalent" if they have the same OrderID. The user can place the equivalence relationship on the connector shelf 536 to display the edges. Alternatively, the user could place the OrderID field on the connector shelf 536 to achieve the same result (i.e., resulting in using the OrderID field as an equivalence relationship).

In some implementations, an edge is added for each instance of the relationship by default. The user can use the connector level of detail shelf to specify the level of aggregation for the connectors. In this case, the user sets the level of detail for the connectors to be based on the two products that are being connected. In addition, the user uses size encoding 546 for the connectors so that the size of each connector is based on the aggregated number of relationship instances.

In some implementations, the aggregation of the tuples by product leads to aggregation of the connectors, or at least this is the default behavior. An edge is added for each pair of products that have a common [OrderID] and a single edge is defined by many tuples. Recall that the [Product] field was placed on the level of detail shelf, so the nodes are aggregated by product. Even with automatic aggregation of the connectors, the user would still need to select the size encoding of the connectors.

In FIG. 11F, the user has applied an alternative sort order to the nodes, displaying them in alphabetical order by product name. In this example, the nodes start alphabetically on the lower right and proceed clockwise around the circle. Because the items are arranged around the circle alphabetically, there are random clusters.

Figure 11G:
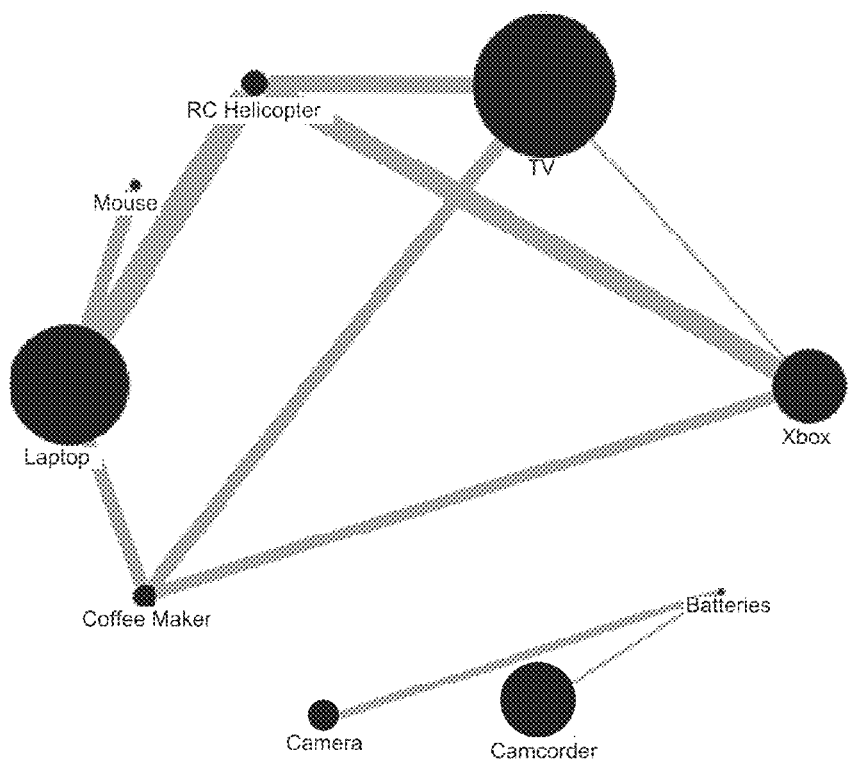

In FIG. 11G, the user has applied a filter to remove edges that occur less than 10 times, which removes some of the "noise" in the graph. For example, the edges 1110 are filtered out. In some implementations, this is accomplished by setting the formula SUM(Number of Records)>=10 as an aggregate connector filter.

Figure 11H:
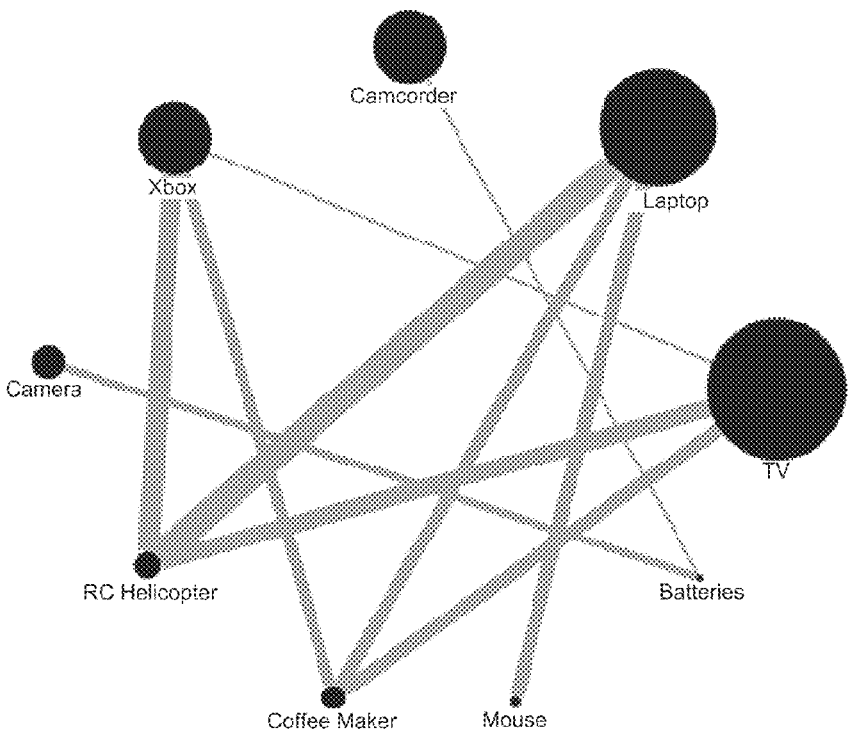

In FIG. 11H, the user experiments with a different sort order, now sorting the nodes by price to see if that exposes any patterns. Some implementations enable sorting a dimension using a corresponding measure.

The data visualization in FIG. 11H reveals some structure: high-priced items are rarely bought together except XBox and TVs, and that combination purchase does not occur often. The items in FIG. 11H are spaced equally around a circle, which is the default behavior. Some implementations allow a user to specify the spacing using a formula or field.

Figure 11I:
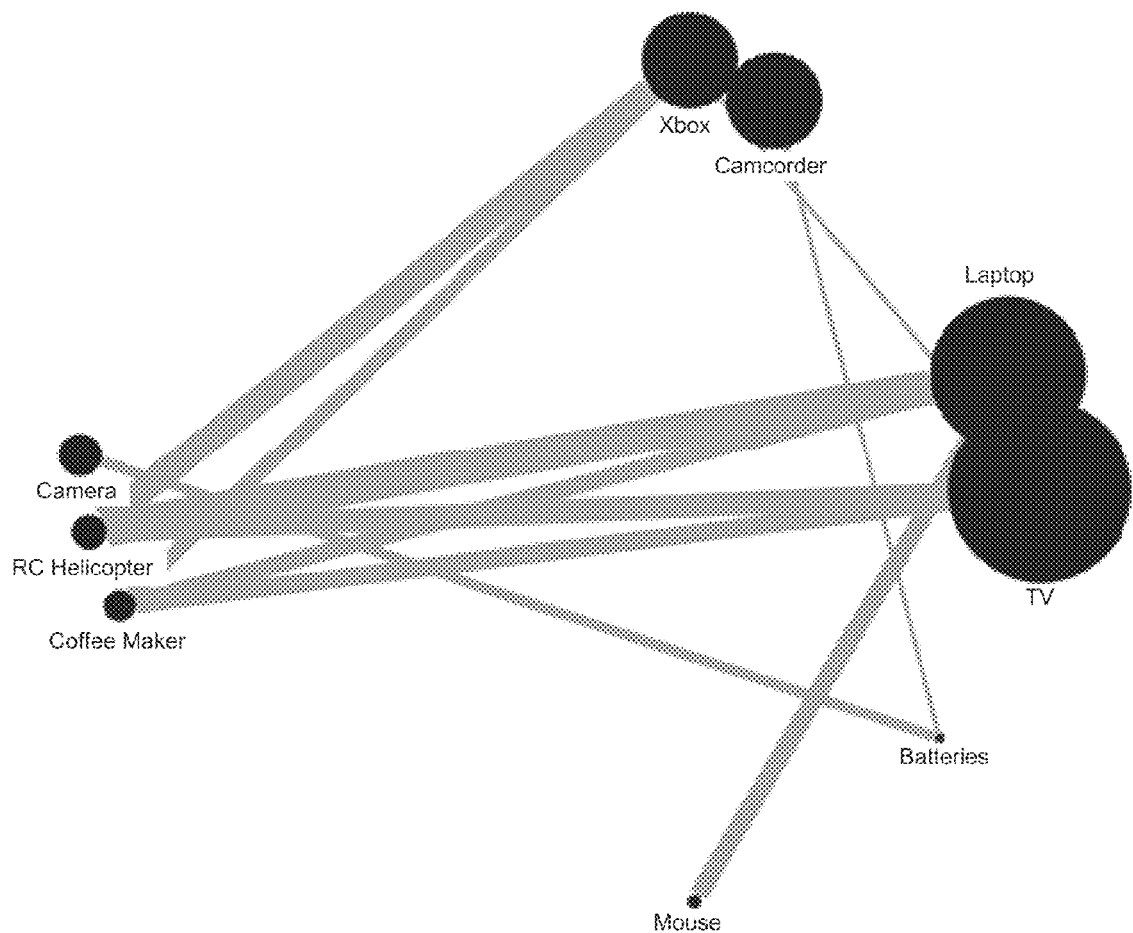

In FIG. 11I, the user has spaced the items by their price, which is accomplished by adding SUM(Price) to the Rows shelf 532 (which translates to the angle of the product around the circle in a Circular layout). In some implementations, the labels "rows" and "columns" are changed to reflect the actual usage in a Circular layout.

Here the user can see that the links between high-priced items and lower priced items are focused on a specific cluster of products which are currently offered on a promo of "50% off these items when included in orders >$200." The user also sees the expected links between products like a Camcorder and batteries.

Figure 11J:
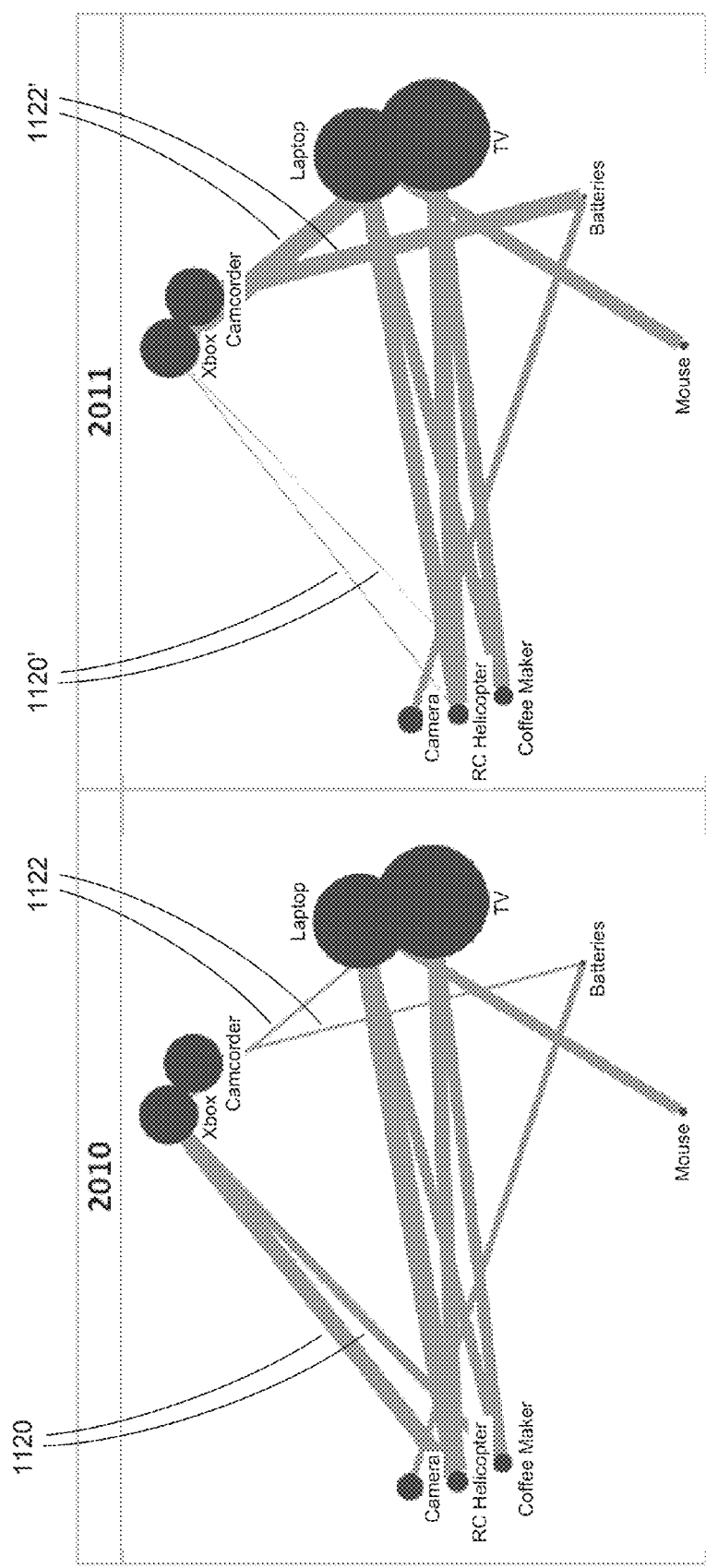

The user is interested in knowing whether the promo that ran last year ("2 for the price of 1") resulted in more high priced purchases at the same time. As illustrated in FIG. 11J, the user filters the data to include last year (which is 2010 in this example) and adds YEAR(Date) to the Columns shelf to split the data into two panes. As seen in FIG. 11J, some of the data is quite different between the two years. See, for example, connectors 1120 in 2010 versus connectors 1120' in 2011, and connectors 1122 in 2010 versus connectors 1122' in 2011.

FIGS. 11I and 11J also illustrate a difference in how ordinal and quantitative fields are interpreted when they are placed on the rows shelf 532 or the columns shelf 534. In FIG. 11I, the quantitative field SUM(Price) was added to the Rows shelf, and it was interpreted to specify the spacing. On the other hand, in FIG. 11J, the ordinal field YEAR(Date) was added to the columns shelf, and it resulted in splitting the data visualization into panes, each with a separate graphic.

FIGS. 12A-12F illustrate some features of a data visualization application 222 that may be applied to a social network. The source data 236 includes one table that represents people, and a second table that shows friendships between the people who play video games against each other. The Person table includes these data fields:
Name
ImageURL
Gender
Age
Income
Company The IsFriend table includes these data fields 238, where the Person1 and Person2 fields match the names of people in the Person table.
Person1
Person2
FriendSinceDate
GamesPlayedTogether In some implementations, these two tables are used directly. The Person table will be displayed as nodes in a graph, and the IsFriend table establishes a relationship, which can be used to create connectors for the graph. In some implementations, the data visualization application allows a user to join these two tables, denormalizing them into a single schema using a left outer join from the Person table to the IsFriend. In this case, the resulting single table may include the following data fields:
Name
ImageURL
Gender
Age
Income
Company
FriendName
FriendSinceDate
GamesPlayedTogether The user analyzing this data wants to create a community among the players of their video games. To do this, the user is interested in the characteristics of people who play together versus alone, and what characteristics go together for people who play against others. The user starts by creating a simple list of players by placing [Name] on the level of detail shelf, which results in a long wrapped and clipped list of player names as illustrated in FIG. 12A. By default, this is using a Cartesian layout type. Here, the marks are Text marks.

In FIG. 12B, the user changes the layout type to "Network." Because there are no edges displayed yet, the network layout places the Players into a packed layout. In the packed layout, the overall size is minimized, both vertically and horizontally.

In FIG. 12C, the user has used [Income] for size encoding (e.g., using shelf 544). This repositions items in the packed layout, somewhat like a tag cloud. except that in this case there are borders.

In FIG. 12D, the user has added connectors based on the relation provided by the IsFriend table (or from the denormalized table). This creates edges between people who have played video games against each other. In this case, the edges are undirected. In some implementations, the source data is directed (e.g., the denormalized table described above), so the user selects undirected in the user interface. When edges are added, the Network layout applies a force-directed layout algorithm to spread out the nodes, as seen in FIG. 12D.

Figure 12E:
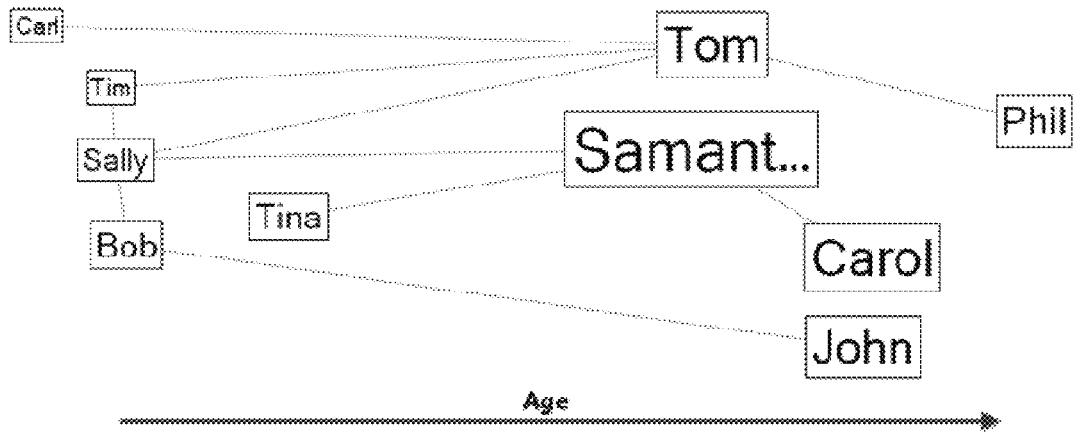

The data visualization in FIG. 12D does not yet provide enough structure to see any patterns in the data. The user wants to introduce more semantics into the placement of nodes within the graph. To investigate potential correlation by age, the user adds [Age] to the columns shelf 534. As shown in FIG. 12E, the Age field introduces an additional force into the force-directed layout, which pushes nodes corresponding to older people to the right and nodes for younger people to the left. One visible correlation is that the older people also have higher incomes, but that correlation is not helpful here.

Note that this behavior of the columns shelf 534 for a network layout is quite different from the usage of the columns shelf in a Cartesian layout. In a Cartesian layout, placing a quantitative field on the columns shelf creates a quantitative x-axis and encoding. In a network or packed layout, the fields on the rows and columns shelves are used as inputs to the layout algorithm, creating additional forces that affect the positioning of the nodes. In some implementations, for a network or packed layout, the screen labels "rows" and "columns" are replaced with alternative labels that express the usage as creating vertical or horizontal forces.

FIG. 12E shows that age is not a key factor in determining which people play against each other. In particular, there are many edges that stretch horizontally across the graph between older players to younger players.

Figure 12F:
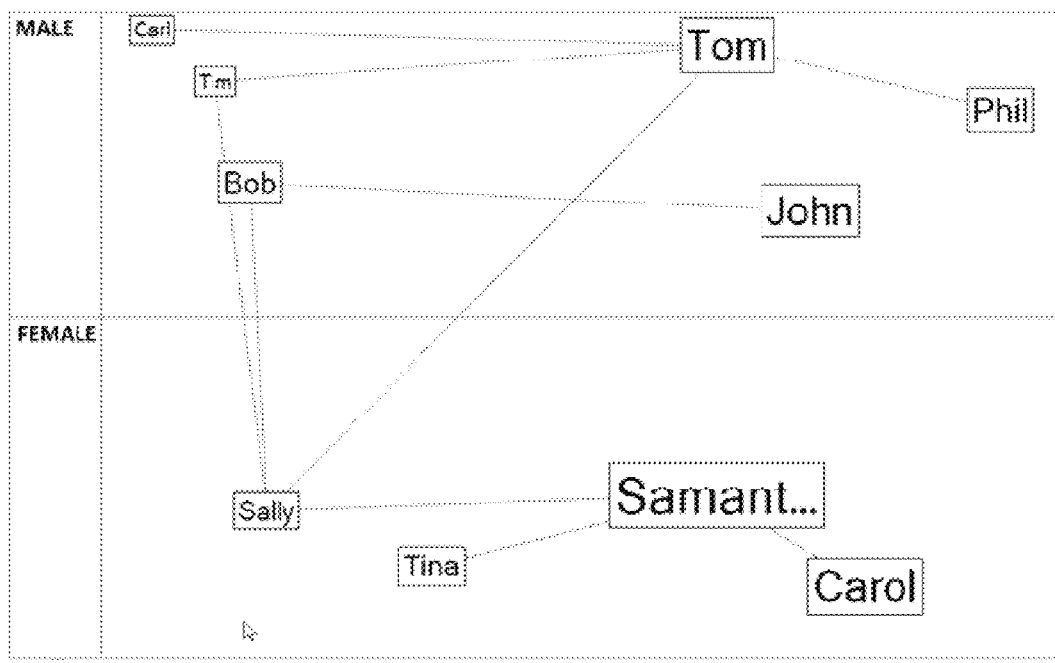

In FIG. 12F, the user investigates the role of gender by adding [Gender] to the rows shelf 532. The result is different from adding the Age field because of the different data type (Age is quantitative, whereas Gender is ordinal). As shown in FIG. 12E, the quantitative Age field can be used to apply numeric forces in the layout. But the Gender field has no quantitative interpretation. Instead, the ordinal Gender field splits the display into two panes vertically, with separate panes for "male" and "female."

In the absence of edges, each pane is a self-contained graphic, and in some instances edges are not permitted to cross pane boundaries. Here, however, all of the men are in one pane and the women are in a second pane, so the relationship requires edges that cross the pane boundary.

This view in FIG. 12F shows that Sally is the only female playing video games against male players. There are no other edges that cross pane boundaries. In some implementations, the user can replace the Text marks with images of the people. In some instances, the images are stored as part of the Person table, or the Person table includes links to stored image files (e.g., URL's or file names). Each node is re-rendered to show the corresponding profile picture.

FIGS. 13A-13D illustrate some interactive features that are available after a data visualization has been rendered. The data for these examples is for football games between college teams. FIG. 13A shows the structure of the Team table 562 and the Game table 1302, and some of the data in these tables. The Team table 562 was illustrated above in FIG. 4E, including the team field 570, the division field 572, and the subdivision field 574.

The game table 1302 provides information about individual games that have been played. Each row in the game table 1302 include the date 1304 the game was played, the home team 1306 (which corresponds to a team 570 in the team table), the home score 1308, the away team 1310 (which corresponds to a different team 570 in the team table 562), and the away score 1312. The game table 1302 creates a relationship between rows in the team table.

FIG. 13B illustrates the data visualization region 520 within user interface 500, including both the shelves 524 from the interface 500 and the graphic display region 530 displaying the data visualization. In this illustration, each of the teams is illustrated as a small circle with its corresponding team name displayed nearby, and the connectors represent games between the teams. The teams in each subdivision are laid out with a Circular layout, and the divisions and subdivisions are organized into rows and columns.

Some of the user selections are displayed on the shelves. In this illustration, the user has specified GROUP({Division}) 1320 for the rows, so each of the "rows" in the data visualization corresponds to a group of divisions. The top row 1336 in the data visualization includes the Atlantic Coast division.

For the columns, the user has specified WITHIN-GROUP ({Division}) 1322, which indicates that the columns are based on the divisions within each group of divisions. (See fields 784 and 790 in FIG. 7E.) For the connection shelf, the user has specified the relationship 1324, which is based on the game table 1302. In some implementations, the user can assign a more concise name for the relationship. In this case, the expression "Scores" in the relation name 1324 indicates that the team scores will be used for encoding the size of the connectors. In particular, this example uses tapered sizes, where the width of each connector at the endpoints is based on the scores of the teams, and gradually tapers between those two widths. In this example, the starting size (width) of each connector is specified as the home score 1330, and the ending size is specified as the away score 1334.

The text encoding for each node includes both the team name 1326 and the rank 1328 of the team if it has a ranking. In addition, each mark (the circles for each team) use size encoding based on the number of wins 1332 (e.g., the number of wins within the team's conference).

After the data visualization has been rendered, some implementations enable a user to interact with the data visualization to identify specific items of interest. For example, in this data visualization, the user has highlighted three specific connectors, including the connectors 1338. In some implementations, the user can highlight individual edges by clicking anywhere on the edge. In some cases, where many edges are tightly packed, the user may use a zoom feature first so that it is easier to identify the desired connector. The highlighted edges 1338 illustrate that the game between LSU and Kentucky was very close, and both teams had high scores. On the other hand, in the game between Kentucky and Kent State, Kentucky won by a large margin.

Some implementations also provide context popups to provide additional information about nodes or connectors. For example, in some implementations, a user may get further information about a team or a game by right-clicking on a node or an edge. In some implementations, the additional information is displayed in bubbles based on hovering the mouse cursor at a specific location for a designated length of time. In some implementations, bubble popups are not displayed unless it is clear which item the user would want (e.g., when there 10 different edges around the location of the mouse cursor, there is no clear choice).

In some implementations, selecting a mark automatically highlights all of the connectors associated with the mark. In some implementations, selecting a connector highlights the marks associated with the relationship.

In some implementations, when the x and/or y position of a mark was arbitrarily chosen by the data visualization generation module, dragging a mark moves the mark to a new position.

In some implementations, when an indented list is used for the labels corresponding to a relationship (e.g., a tree), the "+" and "−" buttons enable a user to expand or collapse portions of the hierarchy, effectively filtering the display. In some implementations, expand and collapse buttons are provided on the data visualization itself for certain graphs.

FIGS. 13C and 13D illustrate schematically how some implementations provide information detail that is based on the magnification level. (Implementations provide ordinary zoom-in and zoom out as well.) This is another example of post-rendering interactive behavior. In FIG. 13C, the data shown in FIG. 13B is displayed at a level of detail appropriate for a high level view. At this magnification, each division is shown as a single mark 1350, such as a disc. The games played between teams within each division are not depicted here, but some implementations provide some high level information, such as the number of connectors that are "inside" each mark, or other designated information. The high level connectors, such as connectors 1352 and 1354 indicate the games played between teams from the different divisions. In some implementations, the connectors 1352 and 1354 are encoded in various ways. For example, the size may encode the number of games each connector represents, or tapering may be used to show the relative ranking of the divisions (e.g., in the aggregate).

FIG. 13D illustrates schematically the display after the user has zoomed in on a specific division. In FIG. 13D, games played against teams in other divisions are not displayed, but all of the games against other teams in the same division are displayed. (In this illustration, not all of the games are depicted.) A zoom in view such as shown in FIG. 13D typically retains the encoding selected by the user, including the encodings of the nodes (e.g., size based on the number of wins and the team ranking) and the encodings of the connectors (e.g., the tapering). As described above with respect to FIG. 13B, some implementations provide additional information about teams or games by clicking, hovering, or otherwise selecting a displayed element.

FIG. 13D also illustrates a layout in which the labels are placed to avoid overlap with the connectors. Here, the names of each team are placed away from the connectors. For example, at the Boston College node 1370, the connectors are all directed toward other team nodes in a circular layout, whereas the team name is located outside the circle. Some implementations apply this technique in other diagrams as well when possible.

Diagrams with connected relationships can get very large and complex. This can make it difficult to see anything specific, and can make the visualization slow to draw. There are many ways to improve both the speed and comprehension of the graphics that take advantage of the interactivity of a computer. Some implementations provide one or more of these features, some of which are implemented as part of the post-generation options 650:

filters on the marks and separate filters on the connectors;
    color highlighting of particular connectors (like color legend highlighting);
    expand/collapse/prune portions of a tree (up or down) or relationships from a node;
    aggregation of relationships;
    show a single node in the center surrounded by the nodes that it is directly related to but no other nodes. Click on a node to make it the center and reveal the new connections;
    overview window with a zoom box;
    during the generation of a data visualization, first show a minimal network, then expand as work is fully generated;
    animating changes in position and encoding to show how things change;

zoom and pan, including interactive techniques such as fish-eye displays;

user adjustment of the positions of points and the routing of edges.

Many naturally occurring networks (such as human networks or computer networks) tend to have hubs with a large number of connections rather than being pseudo-random. Some implementations identify these hubs by setting a range filter on the number of connections per node, making it easy to see nodes with large numbers of connections.

Figure 14:
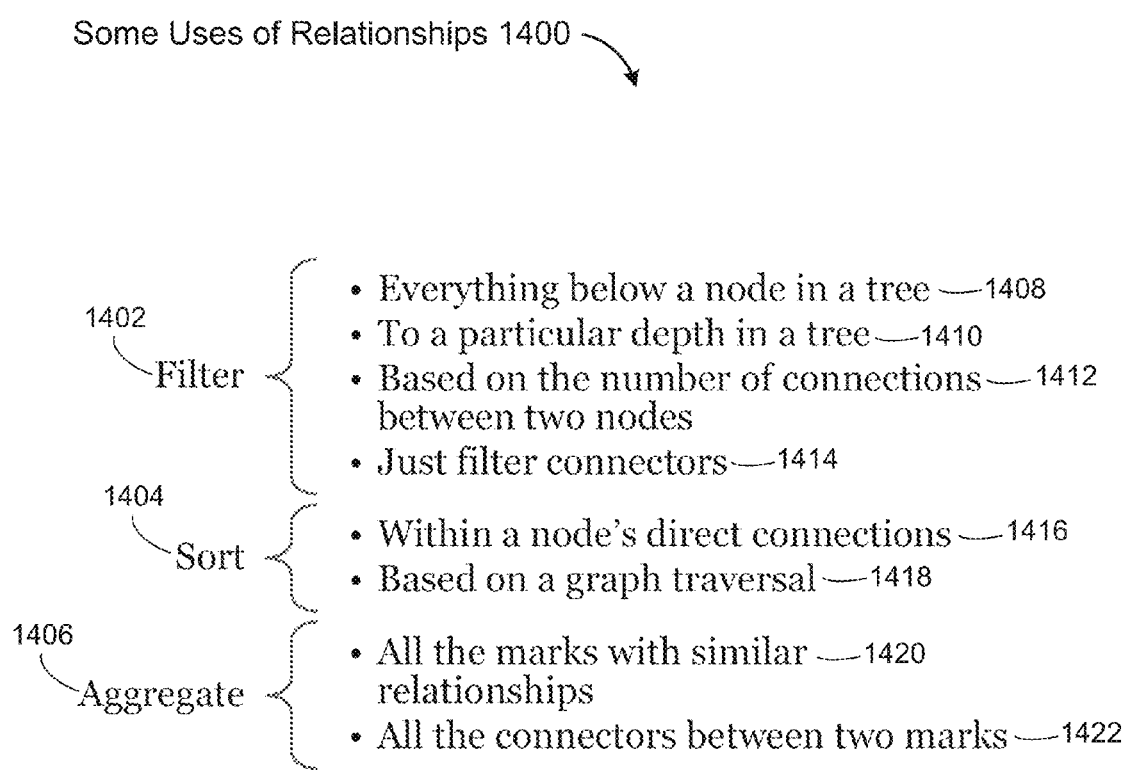
FIG. 14 identifies some of the ways that relationships can be used within a data visualization in accordance with some implementations.

FIG. 14 lists some uses 1400 of relationships within data visualizations.

Relationships 240 provide many new ways to filter 1402 data in a data visualization, even when the relationship is not displayed using connectors. In many cases, the relationship is a tree, or can be used to build a tree using a depth first search or breadth first search, as described above with respect to FIG. 7E. (As illustrated in FIG. 7E, a relationship can be used to construct various quantitative fields.)

Using a tree relationship, the nodes in a data visualization can be filtered in various ways. Some implementations enable a user to specify a node, and filter (1408) the display to include just that node and the nodes below it in the tree. Some implementations expand this in various ways, such as allowing a user to select multiple nodes and filtering to just the subtrees below those nodes.

Some implementations allow a user to filter (1410) the nodes to a particular depth in the tree. For example, the specified depth may be 3, in which case nodes with depth of 0 (the root node), 1, 2, or 3 are kept, and all lower nodes in the tree are filtered out. Note that the term "tree" in this context is not necessarily fully connected, so there may be multiple root nodes.

Some implementations allow filters that combine the two preceding concepts, limiting the set of nodes to just those within a certain depth below a specified node. In some implementations, a relationship may be combined with an ordinary filter based on node properties to create a more complex filter. For example, consider a very large family tree hierarchy, using data similar to that shown in FIG. 4E. Now, suppose that a set of people is identified by some set of criteria related to health, and a user wants to investigate the health of the related parents and children. In this case, the data is filtered to those individuals satisfying the criteria as well as those who are related by birth to a person satisfying the criteria. In general, implementations allow filter expressions based on any number of properties of the nodes as well as on relationships and relationship properties.

Implementations allow users to filter connectors as well. For example, a user may filter (1414) connectors based on any connector properties. In addition, when a relationship is directed, a connector filter may use properties of either the source or destination nodes. In addition, a user may filter (1412) connectors based on aggregate properties, such as the number of connections between two nodes (i.e., the number of individual relationship instances between tuples).

Whereas nodes can exist by themselves, connectors need to connect something. Therefore, if the two nodes that would be the endpoints of a connector are filtered out, the connector is implicitly filtered out as well. When only one endpoint of a connector is filtered out, there is some ambiguity about whether the connector should be filtered out. In some implementations, such a connector is always filtered out. In some implementations, ghost nodes, such as node 1010 in FIG. 10D are allowed, so the connector remains in the display. In some implementations, the handling of ghost nodes is configurable by the user, either for individual data visualizations or for a user (e.g., as a user preference 242).

A relationship can also be used to sort (1404) data within a data visualization. As noted with respect to FIG. 7E, once a relationship is defined, it creates a graph, and the graph can be traversed (1418). In some instances, the traversal includes some arbitrary decisions, but the result is a well-defined order of the entire set of nodes. Not only does this create an ordering of the whole graph, it creates an ordering within any subset, such as the nodes that are directly connected (1416) to a specified node. If the relationship is directed, and a selected node is not a root, the direct connections may include both a parent and children.

In some instances, a relationship 240 can be used to aggregate (1406) tuples that create the visual marks or aggregate (1406) the visual marks themselves. For example, in a tree with a single root, all tuples at the same depth from the root may be aggregated. In another example, a relationship may partition the tuples into a plurality of groups (disconnected "islands"), so the relationship can be used to aggregate the data for each of those groups. As a further example, nodes can be categorized based on the other nodes to which they are related (the node's neighbors), and nodes with the same set of neighbors are grouped together. (Sometimes this aggregation is applied iteratively.) In general, nodes can be aggregated (1420) when the tuples have similar relationships.

In some implementations, visual marks can be aggregated in a consolidation process, where nodes placed at the same location are grouped together. This may occur in a network layout when the nodes are placed according to their relationships with other nodes.

In addition, connectors can be aggregated based on the nodes they are connecting. In particular, a user may choose to aggregate (1422) all connectors that connect the same pair of marks (or the tuples they represent).

Some implementations use an alternative user interface to create connectors for data visualizations. This alternative user interface is described with respect to some specific examples illustrated in FIGS. 15A, 15B, 16A, 16B, and 17A-17E. Although the user interface illustrated above in FIG. 5A and the interface described below may be implemented as distinct alternatives, one of skill in the art will recognize that various features and aspects of the alternatives may be combined.

In some implementations, connectors are created as a connector layer using a connector layout region of the user interface. In some implementations, a user can select one of three classes of edges based on the relationship that defines the edges.

A first class of edges is based on groups. In this scenario, the source data defines the nodes. All nodes sharing a value for a specified field (or set of fields) form a group and are all connected to each other. This is another way of referring to an equivalence relationship 416. An example is Market-Basket analysis, where a relationship is defined by items having the same value for an Order ID, as illustrated above in FIGS. 11A-11J.

A second class of edges is based on paths. In this scenario, the source data defines the nodes and all nodes sharing a value for a specified field (or set of fields) form a group. Within a group, the nodes are ordered and connections only exist between adjacent nodes in that ordering. For example, in web analytics the data represents page visits. All pages with the same session ID form a group and within that group they are ordered by their time stamps.

A third class of edges is based on using a directed relationship. In this scenario, the data defines the edges and each tuple contains a "to" field and "from" field. The flights and social networking examples in FIGS. 10A-10H and 12A-12F, where each row defines a flight or a game played together, are examples. A user needs to create marks to represent the nodes and then specify the edges. In general the edges are directed (from one node to another node), but some implementations expand this to cover scenarios that are undirected. This can be complicated when the nodes are defined by multiple dimensions (e.g., Year, Player, and Gender) and only some of those fields matter for matching edges to nodes (e.g., Year and Player). This scenario is also complicated because the set of vertices (the nodes) is derived from multiple fields (e.g., OrigAirport and DestAirport in the example of FIGS. 10A-10H). As illustrated in FIG. 10D, this is also the case where you can get ghost nodes.

FIGS. 15A and 15B illustrate creating a data visualization with "group" edges. FIG. 15A illustrates the source data 236, which is an order table 1500. Each record in the order table 1500 specifies a single line item, and multiple line items may be included in the same order. This simplified table includes the Date 1502 of the transaction and an Order ID 1504 for the transaction, which uniquely identifies the order. The LineItem field 1506 uniquely identifies specific items within a single order. Each transaction also includes the Product 1508, the Price 1510, and the Quantity 1512.

To define the vertices for a node-link diagram, a user selects Circle marks with [Product] on the level of detail shelf and a circular layout. Because the [Product] is on the level of detail shelf, only one node is created for each product. To create edges, the user adds a connector layer with edges of the type "Group." This type of edge supports the following properties and encodings:

Group. The user can select which data fields define the grouping. This can be one or more fields. This is an alternative way of describing an equivalence relationship 416;

Color. The user can select a data field that will determine the color of each edge; and Size (width). The user can select a data field that will determine the width of each edge.

To define the edges, the user simply puts [OrderID] on the Group shelf. The data visualization application 222 then generates edge tuples 1520, as illustrated in FIG. 15B. Each edge tuple includes Product1 1522, Product2 1524, and the Number of records 1526. The number of records 1526 is the number of instances where each product pair occurs as line items in the same order. The edges connect the appropriate nodes.

The nature of the group edges limits the set of choices for encodings of those edges. As noted above, implementations typically support encodings for color and size of the edges, but there are a limited number of choices for the fields that may be used. One available field is Number of Records 1526, which is commonly used for Size encoding. In addition, the fields used in the grouping may be used in the encoding, because there is no ambiguity about their field values. Specifically, because all of the nodes within a group have the same values for the grouping fields, edges between two nodes can refer to the value of those fields.

On the other hand, other field values are inherently ambiguous because an edge connects together two nodes with potentially different field values. In some implementations, when a user selects a quantitative field (e.g., price) for edge encoding, and the quantitative field is not one of the grouping fields, the data visualization application computes the average for the quantitative field (either the average for the entire group or the average for the pair or nodes that each edge connects). In the specific example illustrated in FIGS. 15A and 15B, this average works well because the prices for the products do not change during the time interval of interest.

FIGS. 16A and 16B illustrate creating a data visualization with path edges. FIG. 16A provides a table 1600 that is the data source 236 for this example. Each row in the table 1600 represents a visit to a web page, and multiple web page visits may be part of the same session. The SessionID 1604 is a unique identifier for a browsing session. Within each session, each web page visit has a unique timestamp 1602, which may represent an actual time, or may be a sequential number within the session. (The only requirement is that the values are monotonically increasing within each session.) The URL 1606 specifies the web page visited. For this example, the URL names have been simplified. This table 1600 also includes a field 1608 that specifies the TypeOfPage and the field SizeOfPage 1610, which indicates the size of the page (e.g., in bytes or kilobytes).

To define the vertices of a node-link diagram, the user selects a visualization using the Text mark, puts [URL] on the Text shelf, and selects a circular layout. To create edges, the user adds a connector layer of the type "Path Edge." This type of edge supports the following encodings:

Group. The user can select which data fields define the grouping. This can be one or more fields;

Ordering. The user can select which data fields define the ordering. This can be one or more fields;

Color. The user can select a data field that will determine the color of each edge; and Size (width). The user can select a data field that will determine the width of each edge.

To define the edges, the user places the [SessionID] field 1604 on the Group shelf and [Timestamp] 1602 on the Ordering shelf. The data visualization generation module 228 generates edge tuples 1620 as illustrated in FIG. 16B. The SessionID1 field 1622 corresponds to the shared SessionID 1604 of the tuples grouped together. The Timestamp1 field 1624 and URL1 field 1626 correspond to the Timestamp 1602 and URL 1606 of a first tuple. The Timestamp2 field 1628 and URL2 field 1630 correspond to the Timestamp 1602 and URL 1606 of a second tuple. For each record in the edge tuples table 1620, the Timestamp1 field 1624 is less than the Timestamp2 field 1628. In addition, the value of the Timestamp2 field 1628 follows the value of the Timestamp1 field 1624 according to the timestamps 1602 in the base data. For example, if a web user went from web page A to page B then to page C, there will be records in the edge table 1620 to show the transitions from A to B and from B to C, but there is no record from A to C. Because edges are based on the ordering, the Number of Records 1632 in the edge tuples 1620 is always 1. A user cannot transition from one web page to two different web pages simultaneously.

Using the edge tuples 1620, the data visualization generation module 228 displays edges that correspond to the edge tuples. Unlike the example above with respect to FIGS. 15A and 15B, the edges created here are directed, having a specific source and destination.

Path edges provide greater flexibility for encoding because the ordering allows a user to specify whether to get data from the source node tuple or the destination node tuple. For example, if the user wanted to encode color based on the TypeOfPage 1608 or the SizeOfPage 1610, the user could drop the field onto the appropriate shelf, and select which end of each edge to use. In some implementations, the user interface prompts the user to make the selection, which may be displayed on a shelf to indicate the selection. For example, "TypeOfPage (source)" is used in some implementations to indicate that an encoding is based on the TypeOfPage of the source node. In some implementations, the suffixes "(from)" or "(to)" are used to indicate whether to use the source node or the destination node, such as "SizeOfPage (to)."

This additional flexibility means that Path edges can be encoded using any fields defining the groups (just like group edges), the [Number of Records] (just like group edges), and any other fields in the node tuples as long as the user specifies which node to use.

Because of the similarities between group edges and path edges, some user interfaces combine these two concepts, and include an optional ordering encoding.

FIGS. 17A-17E illustrate creating a data visualization with to/from edges. FIG. 17A provides a table 1700 of source data 236 used in this example. The table represents people playing video games against online opponents. The table 1700 includes a Person field 1702, which is the name of one of the players. The table 1700 also includes the Gender 1704 corresponding to the Person 1702. The Table 1700 specifies the DatePlayed 1706, the name of the Opponent 1708, and the duration of the video game (DurationMinutes 1710).

In this scenario, the data represents edges, not vertices. In some instances, this table 1700 has been constructed by the user (either using the data visualization application 222 or another application). For example, there may be a normalized table that represents people (the vertices) and a separate normalized table that represents games (the edges). The user may have denormalized these tables into a single table using a left (inner) join.

Although the data in table 1700 specifies a direction (a Person and an Opponent), the edges are treated as undirected because a video game is mutual. In some implementations, the user specifies whether an edge is directed (and the direction) by specifying the edge type. This may be specified either in a user interface region for defining marks or using an option on the edge (e.g., right clicking on an edge and specifying the selection in a popup window).

In this scenario, it is easy to identify the edges because they correspond to rows in the table 1700. However, identifying the node tuples is more difficult because of the way the data is structured. For example, Sally is identified in the table 1700 only as an Opponent 1708, and has no gender specified in the table.

A user wants to construct a node-link diagram of the players who have played against each other. The user places [Person] on the level of detail shelf, selects a Circular layout, and then selects to/from edges for the connectors layer. The user specifies that the edges are undirected and indicates how to identify the other endpoint for each edge. In some implementations, the interface for the connector layer provides an endpoint shelf when to/from edges are selected. Using the table 1700, the user places [Opponent] 1708 on the endpoint shelf.

To compute the set of nodes to display, the data visualization generation module 228 takes the union of the [Person] field 1702 and [Opponent] field 1708, as illustrated in FIG. 17B, creating a Person table 1720. The union is required in order to get all of the players (including Sally).

The union, however, only includes the player names. Consider a user who wants to use [Gender] 1704 as the color encoding of the nodes. The source data table 1700 does not specify the gender for Sally, so the union generates a NULL value for her gender. This is illustrated by the modified table 1720' in FIG. 17C, which has the NULL value 1722 for Sally's gender. Because of this, the color encoding would encode as expected for the other players, but have no color encoding for Sally. A user viewing the source data would generally be able to understand the missing data. In some implementations, the user interface provides information to explain the missing encoding.

In some cases, the user may be able to modify the source data in order to get the desired encoding, as illustrated in FIGS. 17D and 17E. In some instances, the user could add data to the source table 1700 to create an extended source table 1740, as illustrated in FIG. 17D. If the table 1700 was created by a left inner join between a person table and a game table, the user could create table 1740 by using a left outer join instead.

As an alternative, the user could construct an original source table 1760 that includes OpponentGender 1762, as illustrated in FIG. 17E. However, this would create additional complexity for the user, because the user would need to specify that [Gender] 1704 and [OpponentGender] 1762 are related fields, and this creates the opportunity to have inconsistent data (e.g., does the Gender of a person when identified as a Person match the OpponentGender of the same person when identified as an Opponent).

An additional complexity arises when two or more fields define the relationship. Consider a data visualization that a user has created with YEAR(DatePlayed) on the Columns shelf, [Gender] for Color encoding, and Person as the level of detail. Note that placing YEAR(DatePlayed) on the Columns shelf splits the data visualization into multiple panes based on year (spread out horizontally into different columns). In this example, the source data 1700 has data for 2011 and 2012, so there will be two panes. The user has created edges using the Person field 1702 and Opponent field 1708.

Consider the relationship defined by (Tim, Male, 2011, Sally). The Tim vertex appears in both panes in the visualization so the application 222 must determine which node to connect to the Sally vertex. Based on looking at the source data 1700, it should be the Tim node in 2011. But this means that the relationship is not defined by [Person] 1702 and [Opponent] 1708 alone, but also by [Year]. On the other hand, [Gender]1704 is not part of the relationship when determining which nodes to connect. Some implementations recognize the difference because [Gender] 1704 is a property of the nodes, whereas [Year] is a property of the relationship.

In some implementations, the user interface for a To/From edge displays all of the dimensions in play as "drop spots." The user places fields on top of the drop spots to establish mappings. In this case the shelf has a user interface showing Person, YEAR(DatePlayed), and Gender. The user places [Opponent] 1708 in a drop spot corresponding to the Person field 1702 to indicate it is part of the relationship. At this point, the relationship is determined by just these two fields, and does not involve any other fields. In particular, all instances of Tim would be connected to all instances of Sally. If the user wants YEAR to be included, the user can add YEAR(DatePlayed) to a drop spot to be included in the relationship. In this way, edges are defined by projection onto these fields. Any field can be encoded as color or size properties of an edge because these fields are added to the projection of the edge table.

In some implementations, data visualizations with To/From edges are based on different data sources 236 for nodes and edges. That is, one data source to create all of the nodes and a distinct data source to define the edges. In some implementations, a single visual specification 234 is used to specify both the node data and link data. In some instances, the data sources for the nodes or edges are blended from two or more data sources.

As described with respect to FIGS. 15A, 15B, 16A, 16B, and 17A-17E, some implementations add edges using layers. In these implementations, edge marks are distinct marks on layers above the marks defining the nodes in a graph. Edges can be drawn between any two marks, even if those marks are not within the same pane.

Some implementations support one or more of these features:
- filters that only apply to certain sets of marks (e.g., a layer or pane). This will apply to all views with multiple layers (e.g., dual axes, etc.);
- tooltip definitions are specified "per pane" so that different tooltips can be defined for edges versus nodes. In some implementations the tooltips are editable by end users; and
- multiple fields may be selected by a user for "Label" or "Text" encoding and the user may edit the label. For example, a user may place both [State] and [Airport] on the Text shelf and format to get a data label like "WA: SEA."

It is common in areas such as social network analysis to visualize and filter data based on properties of a graph. For example, nodes are often sized by their degree or the size of their subgraph. Other more sophisticated metrics such as betweenness centrality, closeness centrality, and clustering coefficients are common. Some implementations allow users to define these type of metrics and enable use of these metrics in calculations or in filters.

Some implementations provide a set of Quick Graph Calculations. When a user has constructed a node-link diagram, the user can select from a menu of these predefined formulas and expressions, or use one of these predefined formulas or expressions to build a more complex expression. In some implementations, the Quick Graph Calculations are available with a toolbar icon or from a Data Window, making it easy to drag an expression onto the canvas as an encoding.

For node-link diagrams and dual axes views, the marks are at different levels of detail. This can be problematic, because weights assigned to edges will generally be smaller than weights assigned to nodes. Filters can be scoped to a single layer or pane. In some implementations, setting up filters uses a user interface region for the marks (e.g., the "Marks Card"). The user may designate a filter by placing it on a drop spot for filtering.

Node-link graphs often have many labels, so label placement is important. A high priority for the data visualization generation module 228 is avoiding label-label occlusion, making labels readable, and placing as many labels as possible on the display. It is not as important to avoid label-mark or label-edge collisions. In some implementations, label placement wraps text in order to better fit the natural placement of the label.

Figure 18:
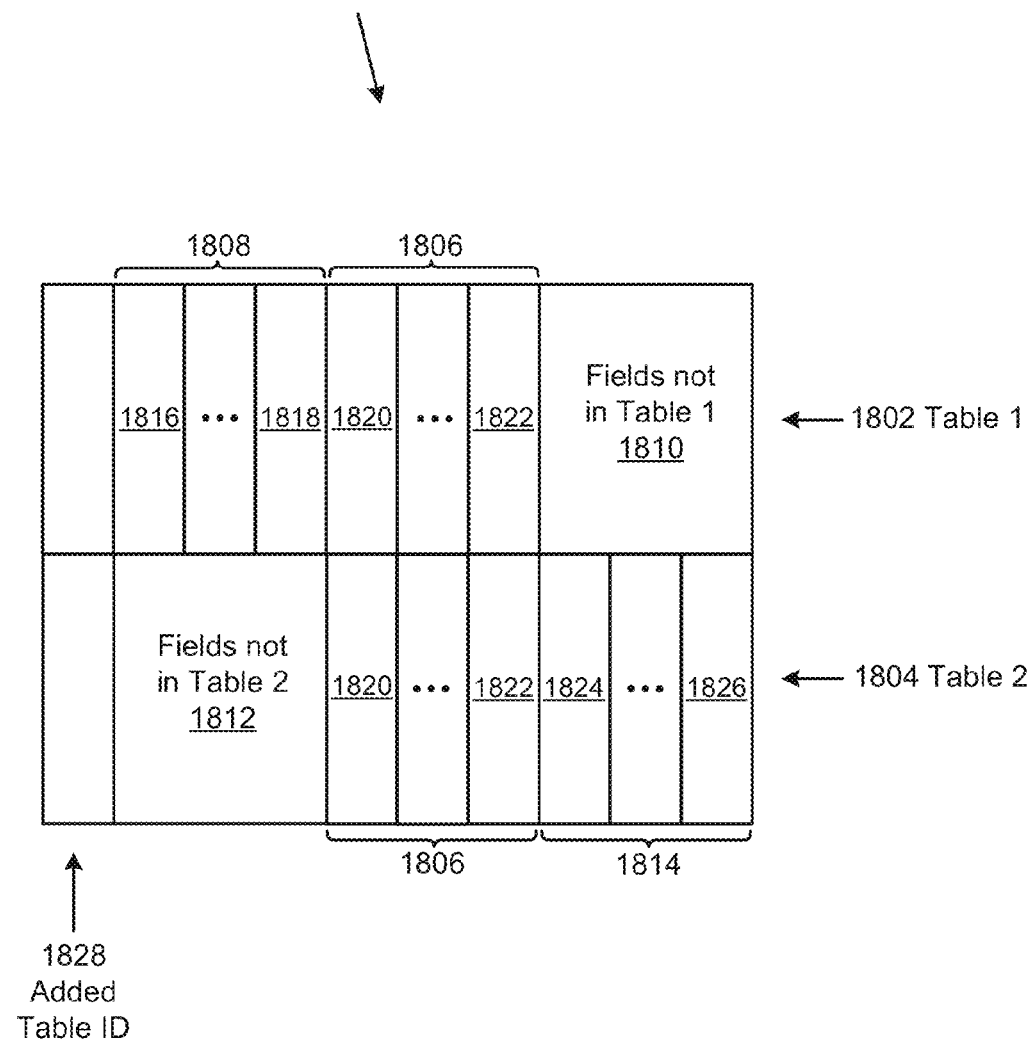
FIG. 18 illustrates blending data from two or more non-homogeneous data sources, which may be used as marks or connectors in data visualization in accordance with some implementations.

FIG. 18 illustrates how data from two non-homogeneous data sources may be blended together. The blended data may be subsequently used as the source data for creating visual marks, connectors, or both.

In FIG. 18, there are two source tables 1802 and 1804, which have some corresponding data fields 1806. The two source tables need not be stored at the same location or in the same format. For example, one of the tables may be in a SQL database on a server and the other table may be stored as a spreadsheet or CSV file on a local computing device. The corresponding data fields 1806 between the two tables 1802 and 1804 may have the same field names, but that is not required. Some implementations provide a mapping tool so that a user may identify how the fields are matched. In some instances, the data types of the shared fields 1806 are identical between the two tables, but that is not required. Here, they must be compatible data types. For example, if one of the tables uses a 25 character fixed length string to store a name and the other table uses variable length strings to specify names, the two fields are compatible (e.g., using a variable length string whose maximum length is at least 25 characters). Similarly, many different numeric types are compatible by converting to the data type with higher precision. The blended table that combines tables 1802 and 1804 thus includes fields 1820, . . . , 1822, with appropriate field names and data types.

In addition to the shared fields 1806, the first table 1802 may include some fields 1808 (e.g., fields 1816, . . . , 1818) that are not present (1812) in the second table 1804. These fields are included in the blended table, using the field names and data types as specified in the first table 1802. Conversely, the second table 1804 may include some data fields 1814 (e.g., fields 1824, . . . , 1826) that are not present (1810) in the first table 1802. These fields are included in the blended table, using the field names and data types as specified in the second table 1804. For the data that is "missing," null or blank values are used.

In addition to the shared fields 1806, the fields 1808 that are only in the first table 1802, and the fields 1814 that are only in the second table 1804, a table ID field 1828 is added, so that the source of each row in the blended table is identified. For example, when blending two tables, the Table ID values may be "1" and "2." In some implementations, the Table ID values are in a user friendly format, such as values specified by the user.

Once two or more tables have been blended, the data may be used almost like any other data source, keeping in mind that some data is missing. If a user is only interested in the fields 1806 that are shared between the two tables, then there is no problem at all. The resulting table has data just like any other table. In some implementations, relationships are limited to using the shared data fields 1806. Other implementations allow any relationship using any of the fields in the blended table. If a relationship uses a field that comes from only one of the tables, the connectors will involve only nodes from that one table. Note that the user can use two or more relationships in a single data visualization (see, e.g., FIG. 8K), so one relationship may connect nodes from a single table while a second relationship connects nodes that may involve both tables.

A blended table as illustrated in FIG. 18 may also be used to construct a graph with non-homogeneous nodes. For example, the first table 1802 may represent people and the second table 1804 may represent business entities. They may share certain characteristics, such as having a name, an address, and a tax ID.

Figure 19A:
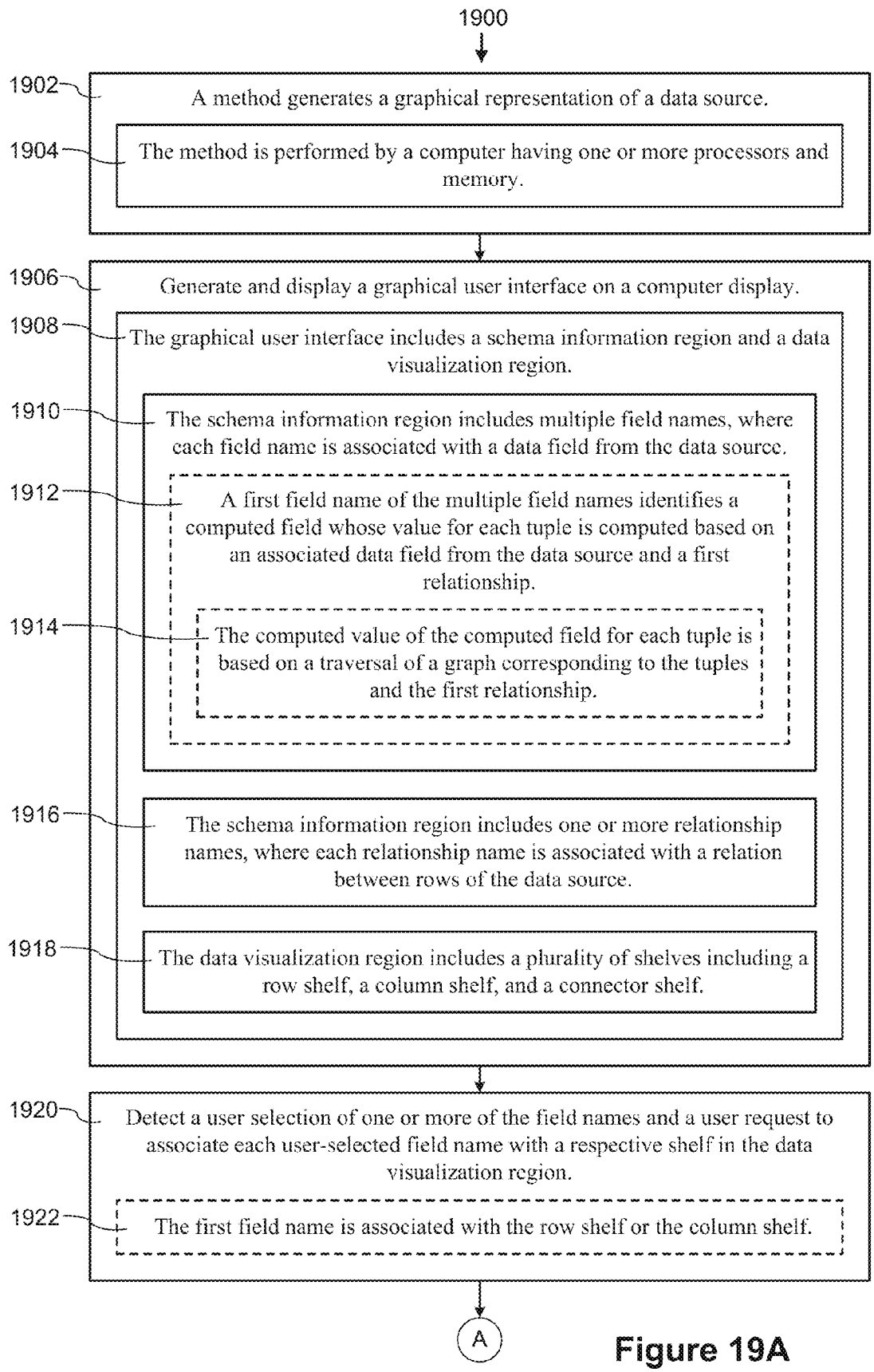
FIGS. 19A-19B provide a flowchart of a process, performed at a computer, for generating a graphical representation of a data source in accordance with some implementations.
Figure 19B:
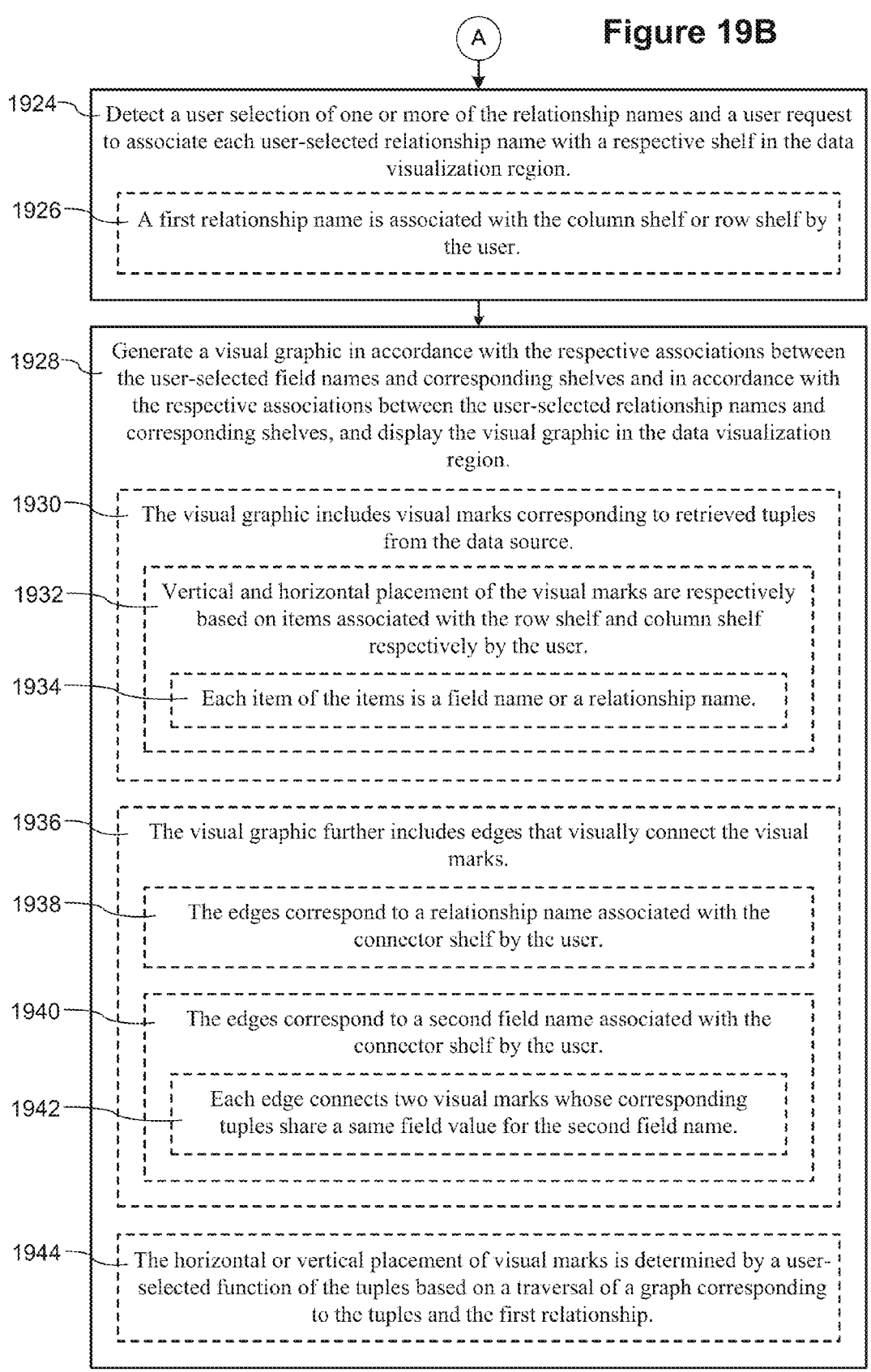

FIGS. 19A and 19B provide a flowchart for a process 1900 of generating (1902) a graphical representation of one or more data sources. The process is performed (1904) by a computer having one or more processors and memory. The process begins by generating (1906) and displaying (1906) a graphical user interface on a computer display, such as the user interface 500 illustrated in FIG. 5A.

The graphical user interface 500 includes (1908) a schema information region 510 and a data visualization region 520.

The schema information region includes (1910) multiple field names, where each field name is associated with a data field from the data source. In the example user interface 500 in FIG. 5A, the field names are displayed in a dimensions section 502 and a measures section 504 of the schema information region 510. As illustrated in FIG. 5A, the field names may include a computed field (such as OVERALL ({ID=father_id}). This example illustrates that in some instances, a first field name (of the multiple field names) identifies (1912) a computed field whose value for each tuple is computed based on an associated data field from the data source and a first relationship. In the specific example of OVERALL({ID=father_id}), it is associated with the data fields ID and father_id, as well as the relationship {ID=father_id}. As explained above with respect to FIG. 7E, the computed values for OVERALL({ID=father_id}) are based on (1914) a traversal of a graph corresponding to the tuples and the first relationship.

In addition to the field names, the schema information region 510 includes (1916) one or more relationship names, where each relationship name is associated with a relation between rows of the data source. In the example in FIG. 5A, the relationship names are {ID=father_id} and {ID=mother_id}, which correspond to father-child and mother-child relations between rows in the data source (e.g., rows in the family tree data 438, illustrated in FIG. 4C).

As illustrated in FIG. 5A, the data visualization region 520 includes (1918) a plurality of shelves, including a row shelf 532, a column shelf 534, and a connector shelf 536. Although these shelves are depicted in FIG. 5A at specific locations and in a specific arrangement, one of skill in the art will recognize that many other configurations are possible. To accommodate some smaller display screens, some implementations display only portions of the user interface, with popups or other windows provided as needed.

In addition to the row shelf 532, column shelf 534, and connector shelf 536, the data visualization region 520 typically includes other shelves to specify properties of the visual marks (e.g., text shelf 542, color shelf 552, size shelf 544, and shape shelf 554) and properties of the connectors (e.g, size shelf 546 and color shelf 556).

To define a data visualization, a user associates data field and/or relationships with various shelves that control various aspects of a data visualization. Commonly, this is performed by dragging and dropping the data fields or relationships onto the shelves. One of skill in the art will recognize that a graphical user interface can provide various ways to associate a field or relationship with a shelf.

The process 1900 detects (1920) a user selection of one or more of the field names and a user request to associate each user selected field name with a respective shelf in the data visualization region. Typically a user associates a field name with a shelf one at a time (e.g., using drag and drop). A user can also disassociate a field name from a shelf (e.g., by selecting the field name on a shelf and pressing the delete button on the keyboard). In some instances, one of the field names is associated with the row shelf of the column shelf. In particular, a first computed data field may be associated with the row shelf or column shelf (see., e.g., row shelf 532 and column shelf 534 in FIG. 5A).

The process 1900 also detects (1924) a user selection of one or more of the relationship names and a user request to associate each user-selected relationship name with a respective shelf in the data visualization region. Like data fields, relationship names are typically placed one at a time, and commonly associated with shelves using drag and drop. As explained above with respect to FIG. 5A, both data fields 238 and relationship 240 can generally be associated with any of the shelves (with only a few limitations). In some instances, a first relationship name is associated with (1926) the column shelf or row shelf by the user (see, e.g., FIG. 8H).

The process generates (1928) a visual graphic in accordance with the respective associations between the user-selected field names and corresponding shelves and in accordance with the respective associations between the user-selected relationship names and corresponding shelves, and displays the visual graphic in the data visualization region. That is, the user selections determine what data is displayed and how it is displayed. In some instances, the visual graphic includes (1930) visual marks corresponding to retrieved tuples from the data source. The visual marks can take many different forms, including dots, bars, text, boxes, shapes, and so on based on user selection. In some instances, vertical and horizontal placement of the visual marks is based on (1932) items associated with the row shelf or column shelf by the user (the row shelf determining the vertical placement and the column shelf determining horizontal placement). In some instances, each of the items is a field name or relationship name.

In some implementations, the visual graphic includes (1936) edges that connect the visual marks. This has been illustrated in many of the figures above, including the data visualizations in FIGS. 8A-8E and 8F-8K. In some instances, the edges correspond to (1938) a relationship name associated with the connector shelf by the user. For example, in FIG. 5A, the relationship name {ID=father_id} on the connector shelf 536 creates the connectors 560.

In some implementations, the edges correspond to a field name associated with the connector shelf by the user. In this case, the field name is treated as an equivalence relationship 416, connecting all marks whose corresponding tuples have the same value for that field. In particular, each edge connects (1942) two visual marks whose corresponding tuples share a same field value for the field name.

In some implementations, the horizontal or vertical placement of visual marks is determined (1944) by a user-selected function of the tuples based on a traversal of a graph corresponding to the tuples and the first relationship. This is illustrated in FIG. 5A, where the horizontal placement (corresponding to the column shelf 534) uses the expression Depth({ID=father_id}). The Depth function computes the depth for each tuple in a tree formed by the hierarchy data. The depth is based on a traversal of a graph corresponding to the relationship.

In some implementations, the data visualization region includes one or more connector property shelves. In some instances, the process detects a user selection of a relationship name or a field name and a user request to associate the user-selected relationship name or field name with a first connector property shelf. In this case, generating the visual graphic includes visually formatting the connectors in accordance with the user selected relationship name or field name for the first connector property shelf. For example, using the data from FIG. 4D, the color or size of the connectors may be encoded based on the size of each shipment, the item shipped, or the carrier.

Figure 20A:
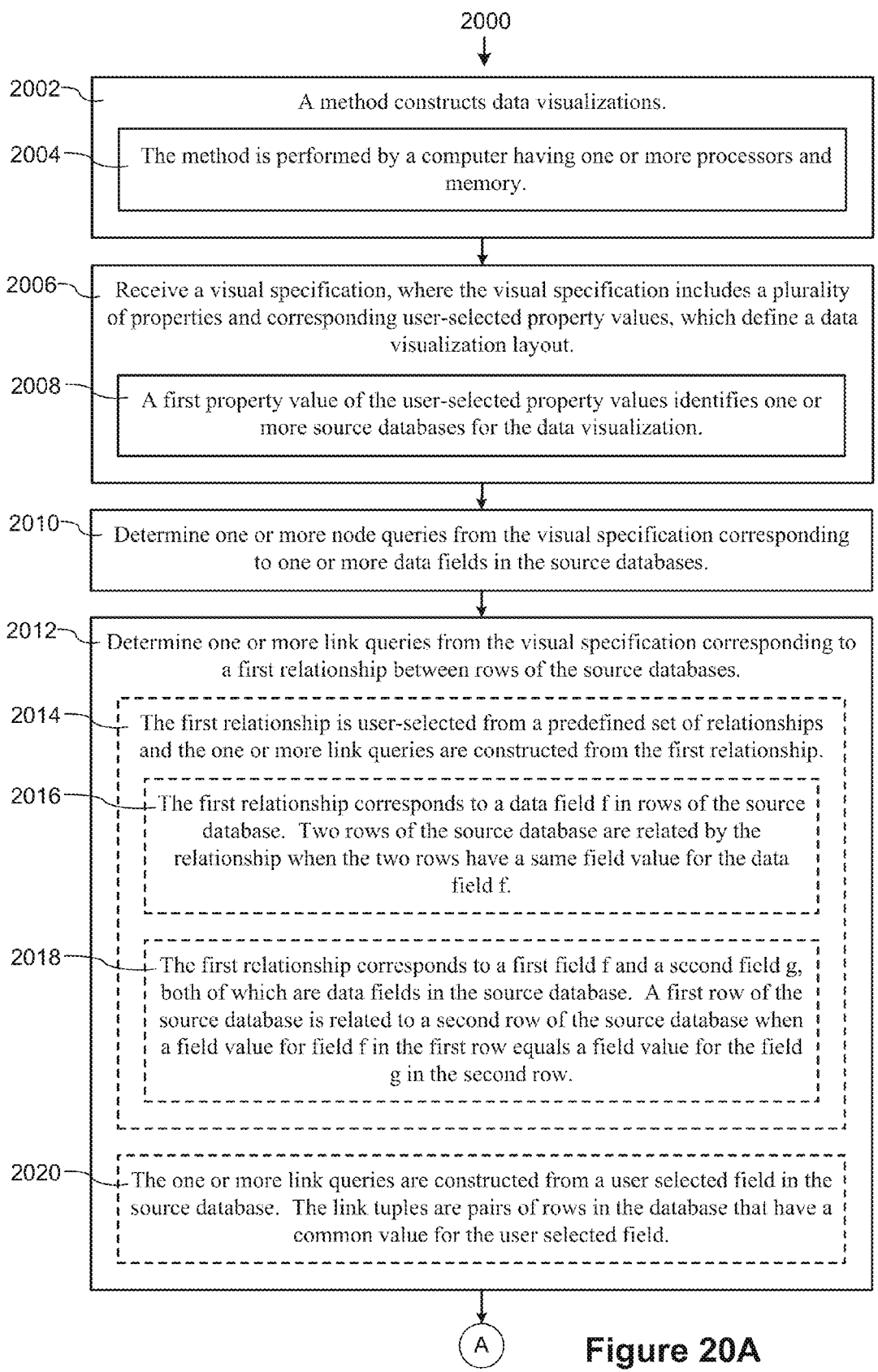
FIGS. 20A-20B provide a flowchart of a process, performed at a computer, for generating a graphical representation of a data source in accordance with some implementations.
Figure 20B:
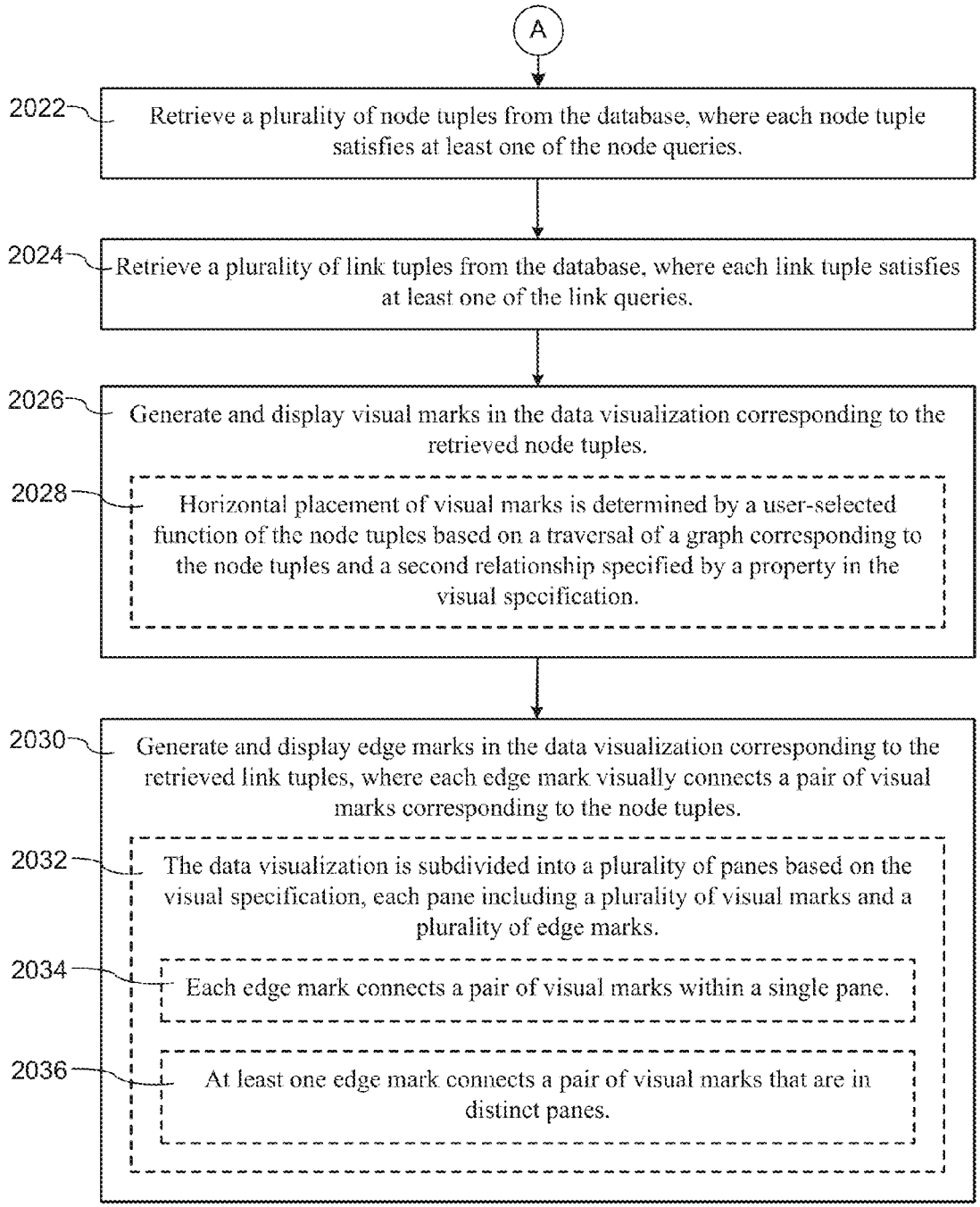

FIGS. 20A and 20B provide a flowchart for a process 2000 for constructing (2002) data visualizations using data from one or more data sources. Some aspects of this process are illustrated above with respect to FIGS. 6A and 6B. For example, the user interactions 622 implicitly create a visual specification 234, which is used by the data visualization generation module 228 to generate and display (646) the desired data visualization. The process is performed (2004)

by a computer having one or more processors and memory. The process begins by receiving (2006) a visual specification 234, where the visual specification includes a plurality of properties and corresponding user-selected property values, which define a data visualization layout. In some implementations, the visual specification is received from a user interface, such as the one illustrated in FIG. 5A. A first property value of the user selected property values identifies (2008) one or more source databases for the data visualization to be generated and displayed. In some instances, two or more source databases are combined, as illustrated above with respect to FIG. 18. In some instances, one database is specified for retrieval of node data and a distinct database (or a distinct table in the same database) is specified for retrieval of link data, which will be used to generate edges or connectors between the nodes.

Using the visual specification, the process determines (2010) one or more node queries corresponding to one or more data fields in the source databases. In some instances, the retrieval process constructs data fields based on raw data in the data source. For example, if an OrderDate field exists in the data source, the visual specification may specify YEAR(OrderDate) as a data field to retrieve. In some instances, the construction of the data field YEAR(OrderDate) is performed by the data source as part of the retrieval (e.g., using an SQL query to a relational database). In other instances, the data field OrderDate is retrieved from the data source, and the new data field YEAR(OrderDate) is computed locally by the data visualization application when needed.

The process 2000 also determines (2012) one or more link queries from the visual specification. The link queries correspond to (2012) a first relationship between rows of the source databases. In some instances, the first relationship is user-selected from a predefined set of relationships. In some instances, the first relationship is inferred based on user selection of a data field (e.g., automatically building an equivalence relationship). In some instances, the first relationship is constructed and saved by a user, in which case it behaves essentially the same as a predefined relationship. In some instances, a user constructs a relationship that is stored only with an individual visual specification. Even though it is a "single-use" relationship, the relationship in known in the visual specification, and thus behaves like a predefined relationship.

In some instances, the first relationship is user-selected (2014) from a predefined set of relationships, and the one or more of the link queries are constructed (2014) from the first relationship. In some instances, the first relationship is an equivalence relationship 416. The first relationship corresponds (2016) to a specific data field in the source database. Two rows of the source database are related (2016) by the relationship when the two rows have the same field value for the specific data field. In some instances, the first relationship is a first-order relationship 410. In this case, the first relationship corresponds (2018) to a first field f and a second field g, both of which are data fields in the source database. A first row of the source database is related (2018) to a second row of the source database when a field value for field f in the first row equals a field value for the field g in the second row. Equivalence relationships 416 and first order relationships 410 are two types of relationships that may be identified or defined for a given data source, but there are many other types of relationships as well, as described above. For example, FIG. 4B describes many types of relationships, and FIG. 4E illustrates a specific example of a category tree relationship.

In some instances, the one or more link queries are constructed (2020) from a user selected field in the source database. The link tuples are pairs of rows in the database that have a common value for the user selected field. In this case, the selected field has created an implicit equivalence relationship.

Using the node queries, the process retrieves (2022) a plurality of node tuples from the database. Each node tuple satisfies (2022) at least one of the node queries. Similarly, using the link queries, the process retrieves (2024) a plurality of link tuples from the database. Each link tuple satisfies (2024) at least one of the link queries. The node tuples correspond to visual marks and the link tuples correspond to connectors between the visible marks.

The process 2000 generates (2026) and displays (2026) visual marks in the data visualization corresponding to the retrieved node tuples. As illustrated in FIGS. 7B-7D, for example, the visible marks may be drawn in many different forms. Typically, the x and y positions of the visible marks are specified in the visual specification (e.g., originating from a user's selection on the rows shelf 532 and the columns shelf 534). In some instances, the horizontal placement of visual marks is determined (2028) by a user-selected function of the node tuples based on a traversal of a graph corresponding to the node tuples and a second relationship specified by a property in the visual specification. This was illustrated above in FIG. 5A, where the horizontal location of the marks is specified by the Depth( ) function and the relationship {ID=father_id}. In the example of FIG. 5A, the depth within the family tree hierarchy determines the horizontal positions of the marks (the boxes for each person) in the data visualization 540. Determining placement based on a function and a relationship can be applied to vertical placement as well. In some instances, the first relationship is the same as the second relationship.

In addition to the vertical marks, the process 2000 generates (2030) and displays (2030) edge marks (connectors) in the data visualization corresponding to the retrieved link tuples. Each edge mark visually connects (2030) a pair of visual marks corresponding to the node tuples. This is illustrated, for example, by FIGS. 11E and 11F. The data visualization in FIG. 11E is based on a visual specification that specifies only the nodes, and in FIG. 11F connectors have been added.

In some instances, the data visualization is subdivided (2032) into a plurality of panes based on the visual specification. Each pane includes (2032) a plurality of visual marks and a plurality of edge marks. This is illustrated above, for example, in FIGS. 11I and 11J. In FIG. 11I there is a single pane, with all of the nodes and connectors in that one pane. In FIG. 11J, however, the visual specification has split the data into two panes based on the year (a pane for 2010 and a separate pane for 2011). In the example of FIG. 11J, each edge mark connects (2034) a pair of visual marks within a single pane. In other instances, at least one edge mark connects (2036) a pair of visual marks that are in distinct panes. This is illustrated above in FIG. 12F, where there are separate panes for male and female players, and some of the connectors cross a pane boundary to show a video game played between a male player and a female player.

Figure 21A:
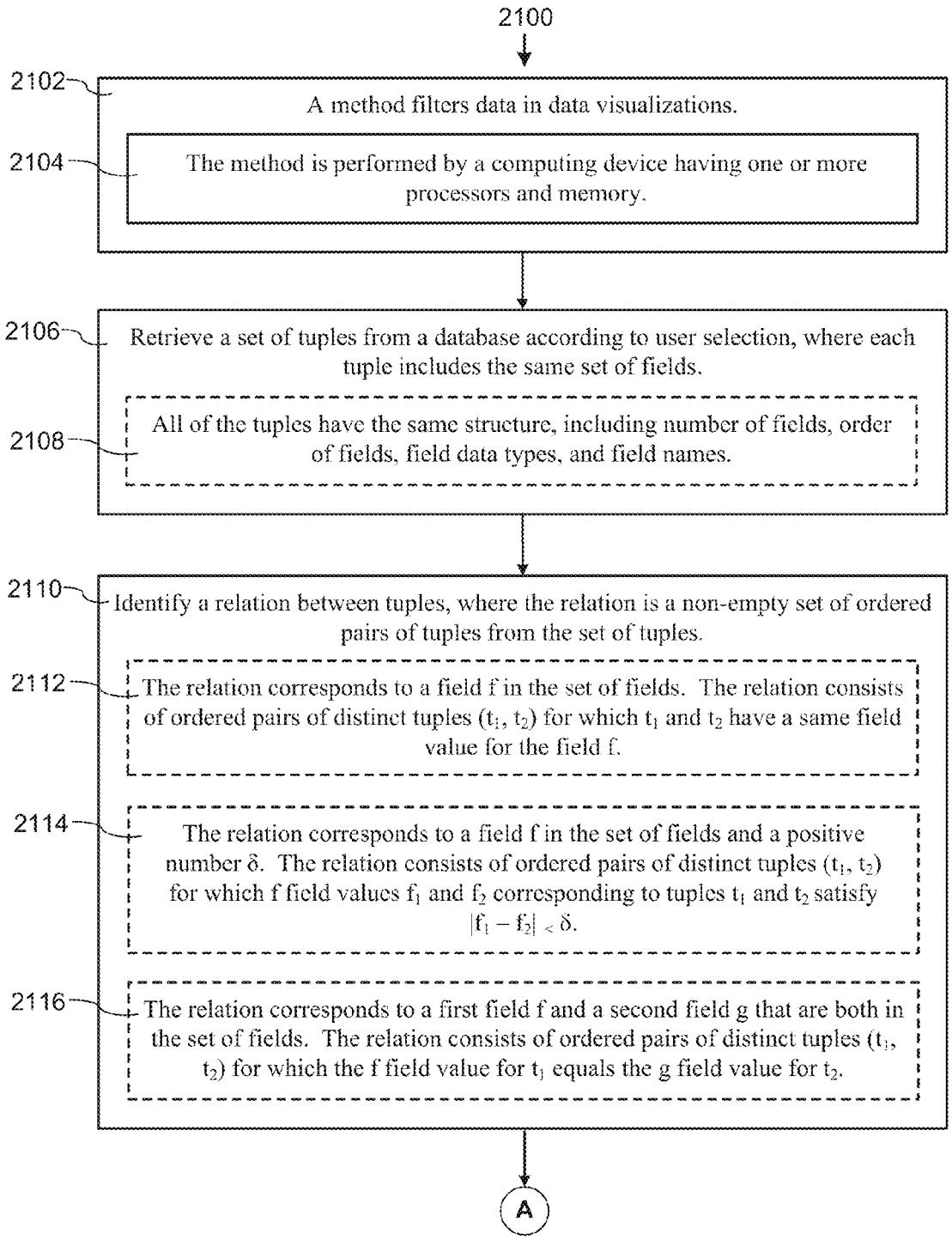
FIGS. 21A-21C provide a flowchart of a process, performed at a computer, for filtering data in data visualizations based on a relation in accordance with some implementations.
Figure 21B:
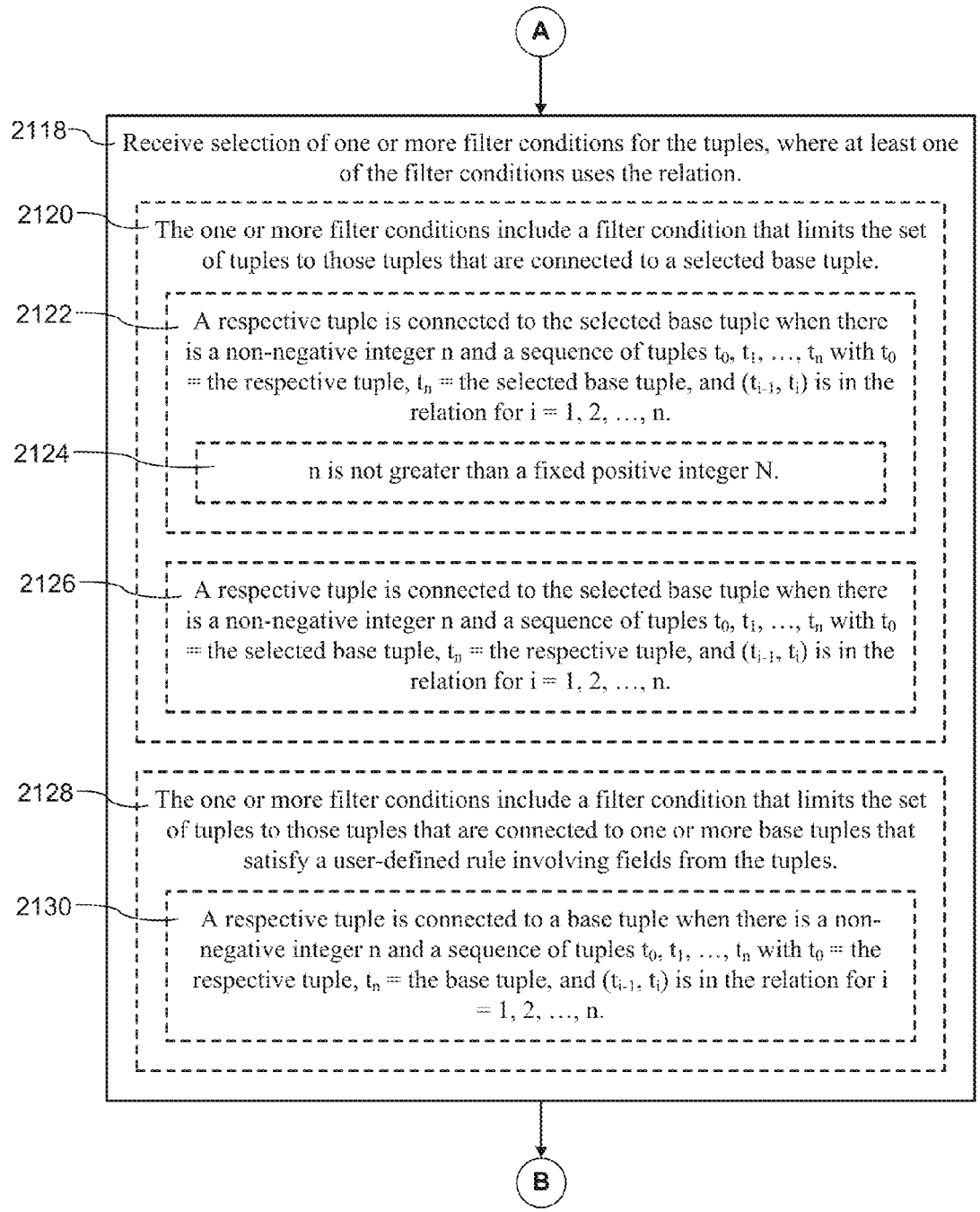
Figure 21C:
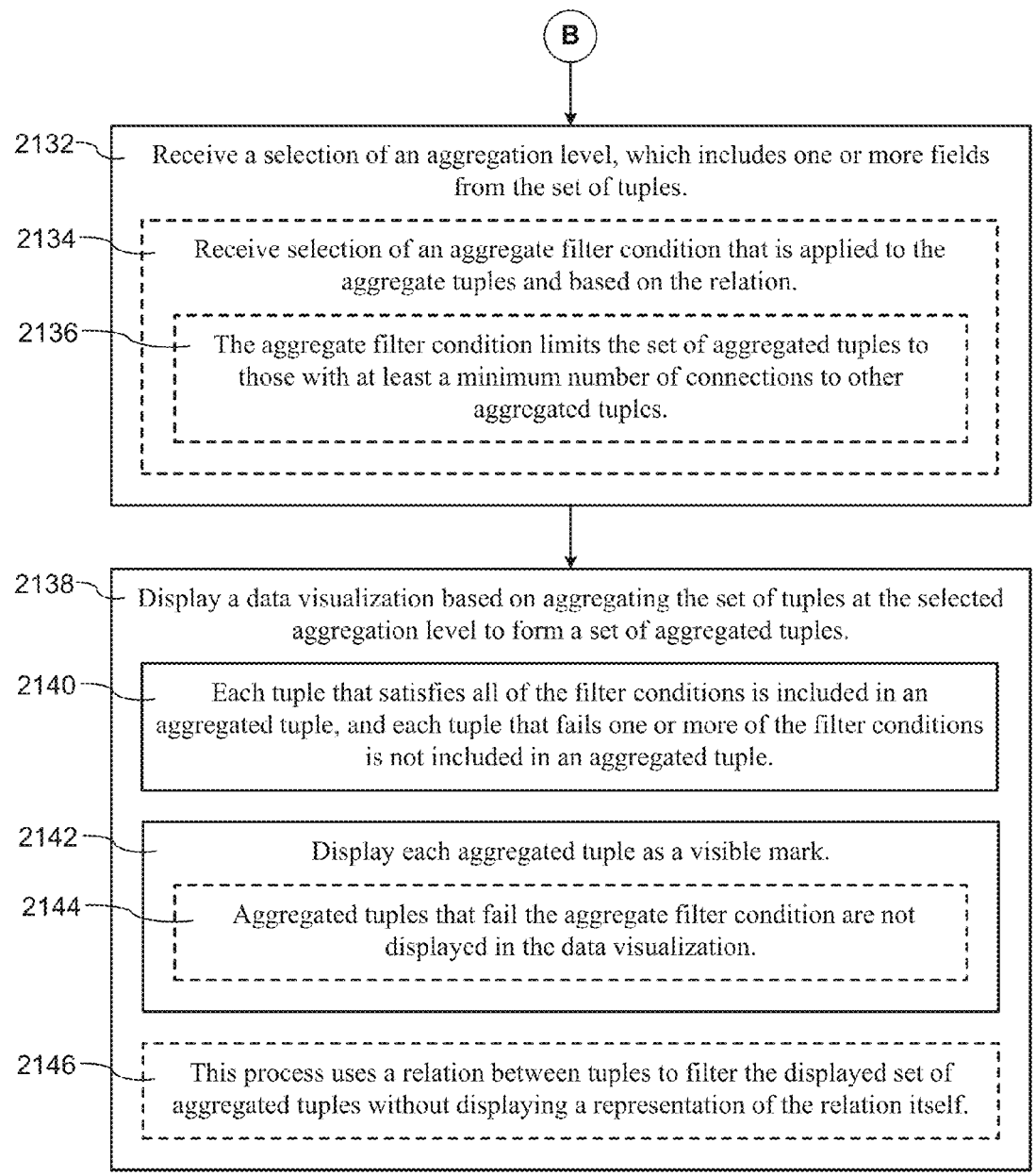

FIGS. 21A-21C provide a flowchart for a process 2100 for filtering (2102) data in data visualizations. Some aspects of this process are illustrated above with respect to FIGS. 6A, 6B, 8I, 10B-10G, 11B-11G, and 14. The process 2100 is performed (2104) by a computing device 102 having one or more processors and memory.

The process 2100 retrieves (2106) a set of tuples from a database according to user selection, where each tuple includes the same set of fields. In some implementations, all of the tuples have (2108) the same structure, including the number of fields in each tuple, the order of fields in each tuple, the data types of the fields, and the field names. In some implementations, some of the tuples include additional fields, or have the fields arranged in a different order. In some implementations, the fields in the tuples do not have field names, and are identified based on their order within the tuples (e.g., the first element of each tuple corresponds to the same data field from the data source). In some implementations, the data types of corresponding fields in the tuples are identical (e.g., the first field in every tuple is a double precision floating point number). In some implementations, the data types of corresponding fields in the tuples are not necessarily identical, but are instead required to be compatible (e.g., the second element in every tuple is either a 32-bit integer or a 64-bit integer).

The process 2100 identifies (2110) a relation between tuples. A relation is a well-defined rule that specifies whether a pair of tuples is related. For an ordered relation, the order of the two tuples in a pair can make a difference. A relation can also be considered (2110) a non-empty set of ordered pairs of tuples from the set of tuples. The set of ordered pairs identifies the tuples that are related. FIG. 4B identifies some types of relations and how relations can be classified. As noted previously, the terms "relation" and "relationship" may be used interchangeably.

In some instances, the relation is (2112) an equivalence relation 416. In this case, the relation corresponds to (2112) a field f in the set of fields. The relation consists of ordered pairs of distinct tuples $(t_1, t_2)$ for which $t_1$ and $t_2$ have a same field value for the field f.

In some instances, the relation is a delta-tolerance relation 418. In this case, the relation corresponds to (2114) a field f in the set of fields and a positive number $\delta$. The relation consists of ordered pairs of distinct tuples $(t_1, t_2)$ for which f field values $f_1$ and $f_2$ corresponding to tuples $t_1$ and $t_2$ satisfy $|f_1 - f_2| < \delta$.

In some instances, the relation is a first-order relation 410. In this case, the relation corresponds to (2116) a first field f and a second field g that are both in the set of fields. The relation consists of ordered pairs of distinct tuples $(t_1, t_2)$ for which the f field value for $t_1$ equals the g field value for $t_2$.

The process receives (2118) selection of one or more filter conditions for the tuples, where at least one of the filter conditions uses the relation. In some instances, the filter conditions use one or more "base" tuples, and filter the remaining tuples to those that are within a certain "distance" of one of the base tuples based on the relation. The distance is the number of "edges" or links that must be traversed in a hypothetical node-link diagram where the tuples correspond to nodes and each edge corresponds to a relation between a pair of tuples. Note that the data visualization to be displayed is not necessarily a node-link diagram.

In some instances, the one or more filter conditions include (2120) a filter condition that limits the set of tuples to those tuples that are connected to a selected base tuple. In some instances, a respective tuple is connected to the selected base tuple when (2122) there is a non-negative integer n and a sequence of tuples $t_0, t_1, \ldots, t_n$ with $t_0$=the respective tuple, $t_n$=the selected base tuple, and $(t_{i-1}, t_i)$ is in the relation for i=1, 2, . . . , n. In this scenario, there is a path from the respective tuple to the base tuple. In this case, the base tuple itself is considered connected to the base tuple using a path of length 0 (n=0).

In some instances, a respective tuple is connected to the selected base tuple when (2126) there is a non-negative integer n and a sequence of tuples $t_0, t_1, \ldots, t_n$ with $t_0$=the selected base tuple, $t_n$=the respective tuple, and $(t_{i-1}, t_i)$ is in the relation for i=1, 2, . . . , n. As above, the base tuple is connected to itself using a path of length 0. In this scenario, there is a path from the base tuple to the respective tuple.

In some instances, there are multiple base tuples, and the one or more filter conditions include (2128) a filter condition that limits the set of tuples to those tuples that are connected to one or more base tuples. The tuples in the set of base tuples are (2128) those that satisfy a user-defined rule involving fields from the tuples. For example, FIGS. 11A-11J provide a data visualization for items purchased at a store. In this scenario, the base tuples could be designated as those items with a price greater than $500. The tuples for the data visualization could then be limited to those that are connected to one of those base tuples by a single link (plus the base tuples themselves).

In some instances, a respective tuple is connected to a base tuple when (2130) there is a non-negative integer n and a sequence of tuples $t_0, t_1, \ldots, t_n$ with $t_0$=the respective tuple, $t_n$=the base tuple, and $(t_{i-1}, t_i)$ is in the relation for i=1, 2, . . . , n. In other instances, a respective tuple is connected to a base tuple when there is a path in the opposite direction (from a base tuple to the respective tuple).

In each of the cases identified above, the number n may be limited (2124) by a fixed positive integer N. For example, the set of tuples may be limited to those that are within 2 links of a base tuple.

These examples may be combined in various ways. In particular, the set of base tuples may be limited to a single tuple, or there may be a plurality of base tuples; the paths of connectedness may go from a base tuple to a respective tuple, or may go from a respective tuple to a base tuple; and the number of links between base tuples and respective tuples may be limited to a fixed positive integer N (i.e., number of links ≤N), or the path lengths may be unlimited. In general, each base tuple is considered connected to itself.

The process 2100 receives (2132) a selection of an aggregation level, which includes one or more fields from the set of tuples. The fields included in the aggregation level effectively act like the fields in a GROUP BY clause of an SQL query.

Some implementations support receiving (2134) selection of an aggregate filter condition that is applied to the aggregated tuples and based on the relation. Whereas the filter conditions described above for the process 2100 apply to individual rows or records from the data source, an aggregate filter condition applies after the data has been aggregated. An aggregate filter condition is similar to a HAVING clause in an SQL query. Here, however, the aggregate filter condition is based on the relation. In some instances, the aggregate filter condition limits (2136) the set of aggregated tuples to those with at least a minimum number of connections to other aggregated tuples. This is illustrated above with respect to FIGS. 10A-10H.

The process 2100 displays (2138) a data visualization based on aggregating the set of tuples at the selected aggregation level to form a set of aggregated tuples. When one or more filter conditions is applied, each tuple that satisfies all of the filter conditions is included (2140) in an aggregated tuple, and each tuple that fails one or more of the filter conditions is not included (2140) in an aggregated tuple. The process 2100 displays (2142) each aggregated tuple as a visible mark, such as a bar in a bar graph, text in a text table, dots in a scatter plot, and so on. When one or more aggregate filter conditions are applied, aggregated tuples that fail the aggregate filter conditions are not displayed (2144) in the data visualization.

Although a filter condition may use a relation, the relation itself is not necessarily displayed in the selected data visualization. Therefore, in some instances, the process 2100 uses (2146) a relation between tuples to filter the displayed set of aggregated tuples without displaying a representation of the relation itself.

Figure 22A:
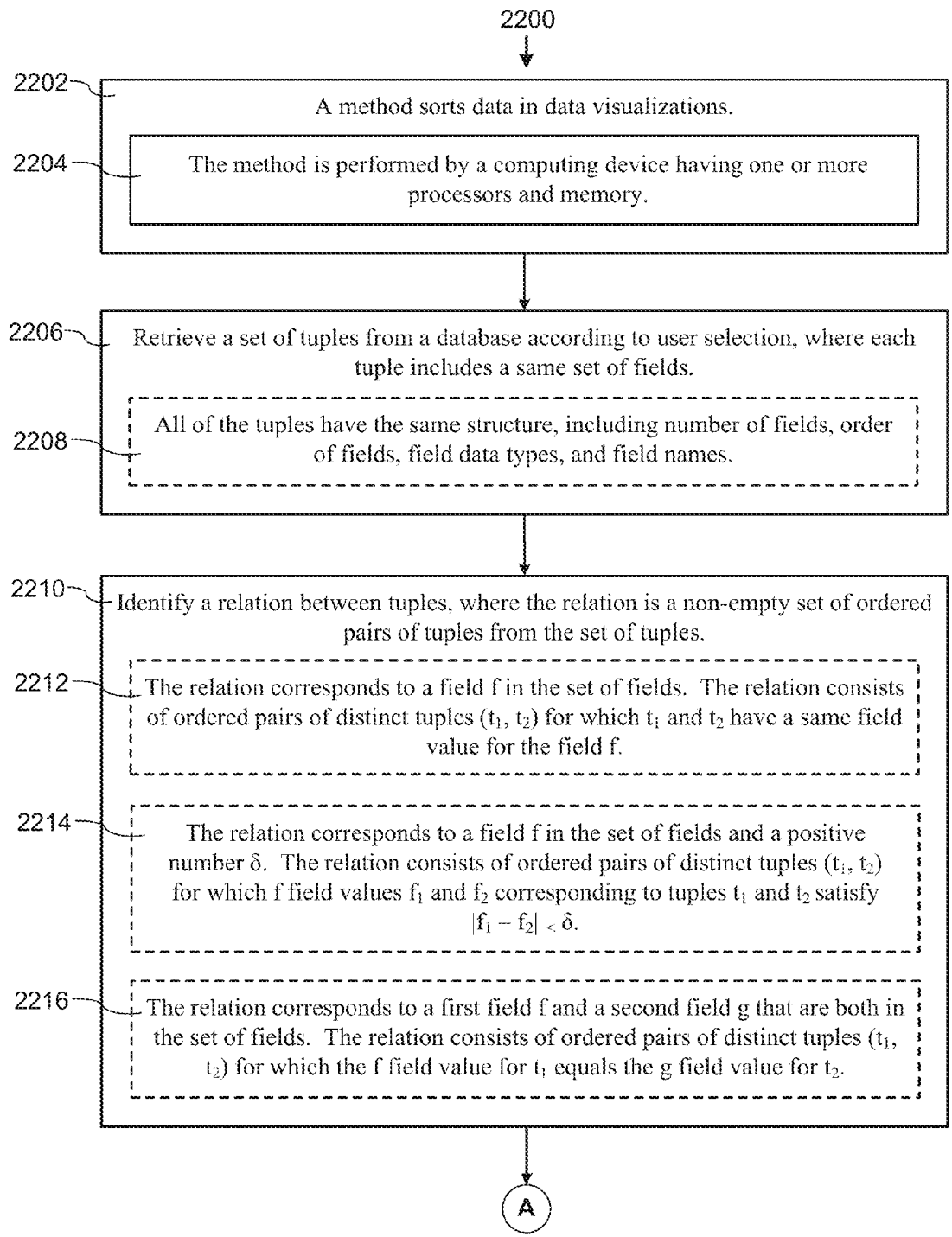
FIGS. 22A-22B provide a flowchart of a process, performed by a computer, for sorting data in data visualizations in accordance with some implementations.
Figure 22B:
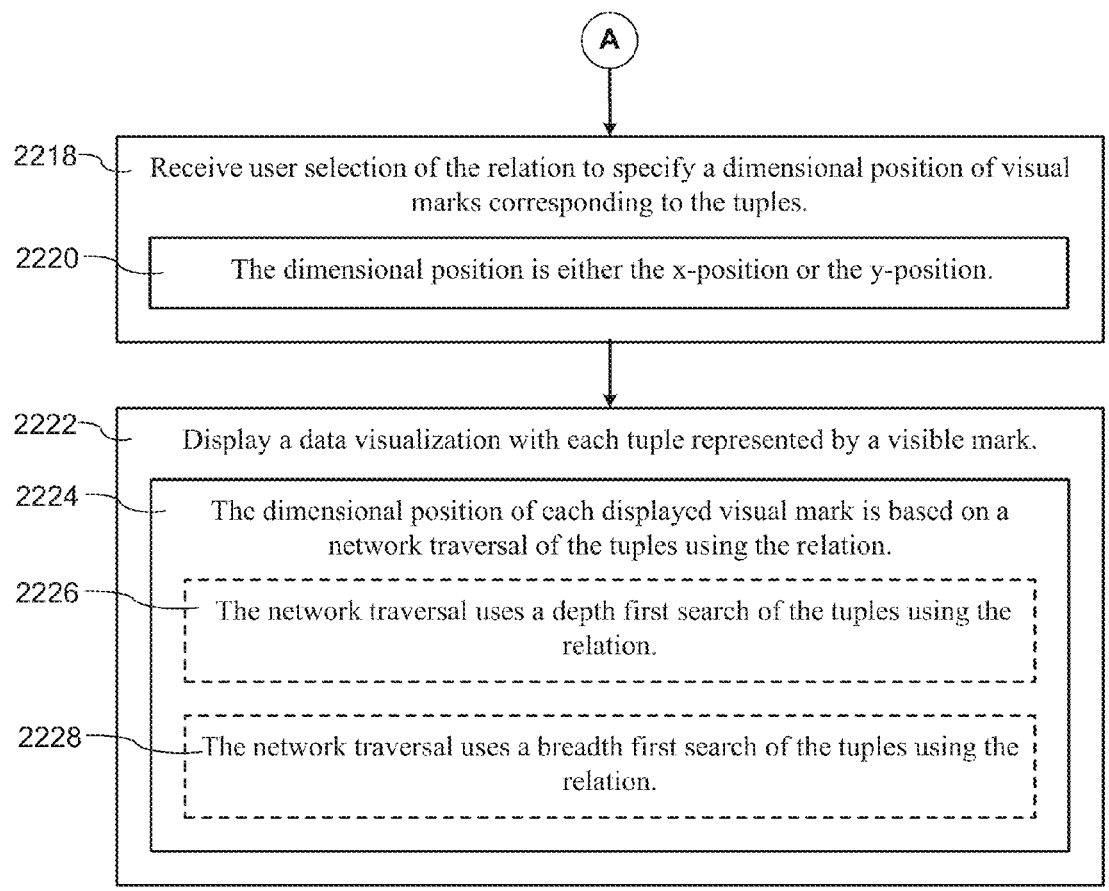

FIGS. 22A-22B provide a flowchart for a process 2200 for sorting (2202) data in data visualizations. Some aspects of this process are illustrated above with respect to FIGS. 7D, 8F, 8M, and 14. The process 2200 is performed (2104) by a computing device 102 having one or more processors and memory.

The process 2200 retrieves (2206) a set of tuples from a database according to user selection, where each tuple includes a same set of fields. In some implementations, all of the tuples have (2208) the same structure, including the number of fields in each tuple, the order of fields in each tuple, the data types of the fields, and the field names. In some implementations, some of the tuples include additional fields, or have the fields arranged in a different order. In some implementations, the fields in the tuples do not have field names, and are identified based on the order within the tuples (e.g., the first element of each tuple corresponds to the same data field from the data source). In some implementations, the data types of corresponding fields in the tuples are identical (e.g., the first field in every tuple is a double precision floating point number). In some implementations, the data types of corresponding fields in the tuples are not necessarily identical, but are instead required to be compatible (e.g., the second element in every tuple is either a 32-bit integer or a 64-bit integer).

The process 2200 identifies (2210) a relation 240 between tuples. A relation is a well-defined rule that specifies whether a pair of tuples is related. A relation can also be considered (2210) a non-empty set of ordered pairs of tuples from the set of tuples. The set of ordered pairs identifies the tuples that are related. FIG. 4B identifies some types of relations and how relations can be classified. As noted previously, the terms "relation" and "relationship" may be used interchangeably.

In some instances, the relation 240 is (2212) an equivalence relation 416. In this case, the relation corresponds to (2212) a field f in the set of fields. The relation consists of ordered pairs of distinct tuples $(t_1, t_2)$ for which $t_1$ and $t_2$ have a same field value for the field f.

In some instances, the relation 240 is a delta-tolerance relation 418. In this case, the relation corresponds to (2214) a field f in the set of fields and a positive number $\delta$. The relation consists of ordered pairs of distinct tuples $(t_1, t_2)$ for which f field values $f_1$ and $f_2$ corresponding to tuples $t_1$ and $t_2$ satisfy $|f_1-f_2|<\delta$.

In some instances, the relation 240 is a first-order relation 410. In this case, the relation corresponds to (2216) a first field f and a second field g that are both in the set of fields. The relation consists of ordered pairs of distinct tuples $(t_1, t_2)$ for which the f field value for $t_1$ equals the g field value for $t_2$.

The process receives (2218) user selection of the relation 240 to specify a dimensional position of visual marks corresponding to the tuples. Typically, the dimensional position is (2220) either the x-position or the y-position. For example, as illustrated in FIG. 8M, the user has selected the relation {ID=father_id} to specify the y-position of vertical marks (in the rows field 952). In some instances, the dimensional position is the angular position in a circular layout.

The process 2200 displays (2222) a data visualization with each tuple represented by a visible mark. Many examples have been provided above, including FIGS. 5A, 7B-7D, 8A-8M, 9, 10A-10H, 11A-11J, 12A-12F, and 13B.

The dimensional position of each displayed visual mark is (2224) based on a network traversal of the tuples using the relation. As explained above, the relation 240 creates a graph, where each tuple is a node and each pair of nodes that are related corresponds to an edge. If the relation is symmetric, the resulting graph may be considered undirected. There are many options for traversing the created graph, but two specific traversal techniques are commonly used. Some implementations use (2226) a depth first traversal of the tuples using the relation. Some implementations use (2228) a breadth first traversal of the tuples using the relation. In some implementations, a user may specify fields in tuples or functions of those tuples to use when a traversal has to make an arbitrary decision (e.g., which child to traverse next). In this way the user can impose some additional order on the traversal process, which may determine how the data is ultimately displayed in a data visualization.

Although the processes 1900, 2000, 2100, and 2200 have been described separately, one of skill in the art recognizes that the processes represent inventive aspects that can be applied together.

The terminology used in the description of the invention herein is for the purpose of describing particular implementations only and is not intended to be limiting of the invention. As used in the description and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of generating a graphical representation of a data source, comprising:
   at a computer having one or more processors and memory:
   generating and displaying a graphical user interface on a computer display, wherein the graphical user interface includes a schema information region and a data visualization region, wherein the schema information region includes multiple field names, each field name associated with a data field from the data source and includes one or more relationship names, each relationship name associated with a relation between rows of the data source, and wherein the data visualization region includes a plurality of shelves including a row shelf, a column shelf, and a connector shelf;

for each of the row shelf, column shelf, and the connector shelf, detecting a user selection of a respective field name or relationship name and a request to associate the respective field name or relationship name with the respective shelf; and generating a visual graphic in accordance with the respective associations between the user-selected field names and corresponding shelves and in accordance with the respective associations between the user-selected relationship names and corresponding shelves, and displaying the visual graphic in the data visualization region.

2. The method of claim 1, wherein the visual graphic includes visual marks corresponding to retrieved tuples from the data source, wherein vertical and horizontal placement of the visual marks are respectively based on items associated with the row shelf and column shelf respectively by the user, and wherein each item of the items comprises a field name or a relationship name.

3. The method of claim 2, wherein the visual graphic further includes edges that visually connect the visual marks, wherein the edges correspond to a relationship name associated with the connector shelf by the user.

4. The method of claim 2, wherein the visual graphic further includes edges that visually connect the visual marks, wherein the edges correspond to a first field name associated with the connector shelf by the user, and wherein each edge connects two visual marks whose corresponding tuples share a same field value for the first field name.

5. The method of claim 2, wherein a first relationship name is associated with the column shelf or row shelf by the user, and wherein the corresponding horizontal or vertical placement of visual marks is determined by a user-selected function of the tuples based on a traversal of a graph corresponding to the tuples and the first relationship.

6. The method of claim 1, wherein a first field name of the multiple field names identifies a computed field whose value for each tuple is computed based on an associated data field from the data source and a first relationship, and wherein the first field name is associated with the row shelf or the column shelf.

7. The method of claim 6, wherein the computed value of the computed field for each tuple is based on a traversal of a graph corresponding to the tuples and the first relationship.

8. The method of claim 1, wherein the data visualization region further includes one or more connector property shelves, the method further comprising:

detecting a user selection of a relationship name or a field name and a user request to associate the user-selected relationship name or field name with a first connector property shelf, wherein generating the visual graphic includes visually formatting the connectors in accordance with the user selected relationship name or field name for the first connector property shelf.

9. The method of claim 8, wherein the first connector property shelf specifies the color or width of connectors.

10. A computer, comprising:
one or more processors;
memory; and
one or more programs stored in the memory configured for execution by the one or more processors, the one or more programs comprising instructions for:

generating and displaying a graphical user interface on a computer display, wherein the graphical user interface includes a schema information region and a data visualization region, wherein the schema information region includes multiple field names, each field name associated with a data field from the data source and includes one or more relationship names, each relationship name associated with a relation between rows of the data source, and wherein the data visualization region includes a plurality of shelves including a row shelf, a column shelf, and a connector shelf;

for each of the row shelf, column shelf, and the connector shelf, detecting a user selection of a respective field name or relationship name and a request to associate the respective field name or relationship name with the respective shelf; and generating a visual graphic in accordance with the respective associations between the user-selected field names and corresponding shelves and in accordance with the respective associations between the user-selected relationship names and corresponding shelves, and displaying the visual graphic in the data visualization region.

11. The computer of claim 10, wherein the visual graphic includes visual marks corresponding to retrieved tuples from the data source, wherein vertical and horizontal placement of the visual marks are respectively based on items associated with the row shelf and column shelf respectively by the user, and wherein each item of the items comprises a field name or a relationship name.

12. The computer of claim 11, wherein the visual graphic further includes edges that visually connect the visual marks, wherein the edges correspond to a relationship name associated with the connector shelf by the user.

13. The computer of claim 11, wherein the visual graphic further includes edges that visually connect the visual marks, wherein the edges correspond to a first field name associated with the connector shelf by the user, and wherein each edge connects two visual marks whose corresponding tuples share a same field value for the first field name.

14. The computer of claim 11, wherein a first relationship name is associated with the column shelf or row shelf by the user, and wherein the corresponding horizontal or vertical placement of visual marks is determined by a user-selected function of the tuples based on a traversal of a graph corresponding to the tuples and the first relationship.

15. The computer of claim 10, wherein a first field name identifies a computed field whose value for each tuple is computed based on the associated data field from the data source and a first relationship, and wherein the first field name is associated with the row shelf or the column shelf.

16. The computer of claim 15, wherein the computed value of the computed field for each tuple is based on a traversal of a graph corresponding to the tuples and the first relationship.

17. The computer of claim 10, wherein the data visualization region further includes one or more connector property shelves, the one or more programs further comprising instructions for:

detecting a user selection of a relationship name or a field name and a user request to associate the user-selected relationship name or field name with a first connector property shelf, wherein generating the visual graphic includes visually formatting the connectors in accordance with the user selected relationship name or field name for the first connector property shelf.

18. A non-transitory computer readable storage medium storing one or more programs configured for execution by a computer having one or more processors and memory, the one or more programs comprising instructions for:
- generating and displaying a graphical user interface on a computer display, wherein the graphical user interface includes a schema information region and a data visualization region, wherein the schema information region includes multiple field names, each field name associated with a data field from the data source and includes one or more relationship names, each relationship name associated with a relation between rows of the data source, and wherein the data visualization region includes a plurality of shelves including a row shelf, a column shelf, and a connector shelf;
- for each of the row shelf, column shelf, and the connector shelf, detecting a user selection of a respective field name or relationship name and a request to associate the respective field name or relationship name with the respective shelf; and
- generating a visual graphic in accordance with the respective associations between the user-selected field names and corresponding shelves and in accordance with the respective associations between the user-selected relationship names and corresponding shelves, and displaying the visual graphic in the data visualization region.

19. The non-transitory computer readable storage medium of claim 18, wherein the visual graphic includes visual marks corresponding to retrieved tuples from the data source, wherein vertical and horizontal placement of the visual marks are respectively based on items associated with the row shelf and column shelf respectively by the user, and wherein each item of the items comprises a field name or a relationship name.

20. The non-transitory computer readable storage medium of claim 19, wherein the visual graphic further includes edges that visually connect the visual marks, wherein the edges correspond to a relationship name associated with the connector shelf by the user.

21. The non-transitory computer readable storage medium of claim 19, wherein the visual graphic further includes edges that visually connect the visual marks, wherein the edges correspond to a first field name associated with the connector shelf by the user, and wherein each edge connects two visual marks whose corresponding tuples share a same field value for the first field name.

22. The non-transitory computer readable storage medium of claim 19, wherein a first relationship name is associated with the column shelf or row shelf by the user, and wherein the corresponding horizontal or vertical placement of visual marks is determined by a user-selected function of the tuples based on a traversal of a graph corresponding to the tuples and the first relationship.

23. The non-transitory computer readable storage medium of claim 18, wherein a first field name identifies a computed field whose value for each tuple is computed based on the associated data field from the data source and a first relationship, and wherein the first field name is associated with the row shelf or the column shelf.

24. The non-transitory computer readable storage medium of claim 23, wherein the computed value of the computed field for each tuple is based on a traversal of a graph corresponding to the tuples and the first relationship.

25. The non-transitory computer readable storage medium of claim 18, wherein the data visualization region further includes one or more connector property shelves, the one or more programs further comprising instructions for:
- detecting a user selection of a relationship name or a field name and a user request to associate the user-selected relationship name or field name with a first connector property shelf, wherein generating the visual graphic includes visually formatting the connectors in accordance with the user selected relationship name or field name for the first connector property shelf.

* * * * *